(12) United States Patent
Na et al.

(10) Patent No.: US 10,628,014 B2
(45) Date of Patent: Apr. 21, 2020

(54) MOBILE TERMINAL AND CONTROL METHOD THEREFOR

(71) Applicant: LG ELECTRONICS INC., Seoul (KR)

(72) Inventors: Yeonsuk Na, Seoul (KR); Hongjo Shim, Seoul (KR); Yunmi Kwon, Seoul (KR); Sungjin Kang, Seoul (KR); Mihyun Park, Seoul (KR); Gukchan Lim, Seoul (KR); Seonghyok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 182 days.

(21) Appl. No.: 15/741,142

(22) PCT Filed: Nov. 12, 2015

(86) PCT No.: PCT/KR2015/012155
§ 371 (c)(1),
(2) Date: Dec. 29, 2017

(87) PCT Pub. No.: WO2017/003043
PCT Pub. Date: Jan. 5, 2017

(65) Prior Publication Data
US 2018/0188925 A1 Jul. 5, 2018

(30) Foreign Application Priority Data

Jul. 1, 2015 (KR) .......................... 10-2015-0094137
Jul. 9, 2015 (KR) .......................... 10-2015-0097904

(51) Int. Cl.
*G06F 3/0484* (2013.01)
*G04G 5/04* (2006.01)
(Continued)

(52) U.S. Cl.
CPC ......... *G06F 3/04845* (2013.01); *G04C 3/001* (2013.01); *G04G 5/04* (2013.01);
(Continued)

(58) Field of Classification Search
CPC .... G06F 3/04845; G06F 1/163; G06F 3/0482; G06F 3/04847; G06F 3/04883;
(Continued)

(56) References Cited

U.S. PATENT DOCUMENTS 6,477,117 B1 * 11/2002 Narayanaswami .. G04G 13/026
368/224
6,944,472 B1 * 9/2005 Ishigami ............... G06F 1/1626
455/550.1
(Continued)

FOREIGN PATENT DOCUMENTS

JP          2004072496          3/2004
KR       1020080073871          8/2008
(Continued)

OTHER PUBLICATIONS

PCT International Application No. PCT/KR2015/012155, Written Opinion of the International Searching Authority dated Mar. 29, 2016, 24 pages.

*Primary Examiner* — Stella Higgs
(74) *Attorney, Agent, or Firm* — Lee, Hong, Degerman, Kang & Waimey

(57) ABSTRACT

The present invention relates to a mobile terminal capable of utilizing, as a control use, an hour hand and a minute hand, and a control method therefor. To this end, the mobile terminal can comprise a display unit for outputting information, and a control unit for controlling the outputting, through the display unit, of information corresponding to a time indicated by the hour hand and the minute hand, if a first touch input for outputting the hour hand the minute
(Continued)

hand through the display unit is received or if a second touch input for dragging any one of the hour hand and the minute hand outputted through the display unit is received.

19 Claims, 48 Drawing Sheets

(51) Int. Cl.
```
G06F 1/16       (2006.01)
H04M 1/725      (2006.01)
G04C 3/00       (2006.01)
G04G 9/00       (2006.01)
G04G 21/08      (2010.01)
G06F 3/0488     (2013.01)
G04G 13/02      (2006.01)
```
(52) U.S. Cl.
CPC ........... *G04G 9/0064* (2013.01); *G04G 21/08* (2013.01); *G06F 1/163* (2013.01); *G06F 3/04847* (2013.01); *G06F 3/04883* (2013.01); *H04M 1/7253* (2013.01); *H04M 1/72522* (2013.01); *G04G 13/02* (2013.01); *G06F 2203/04808* (2013.01); *H04M 2250/22* (2013.01)

(58) Field of Classification Search
CPC .......... G06F 2203/04808; G04C 3/001; G04G 5/04; G04G 9/0064; G04G 21/08; G04G 13/02; H04M 1/72522; H04M 1/7253; H04M 2250/22
See application file for complete search history.

(56) References Cited

U.S. PATENT DOCUMENTS

| | | | | |
|---|---|---|---|---|
| 7,907,476 B2* | 3/2011 | Lee | ............... | G04G 5/04 345/173 |
| 8,522,163 B2* | 8/2013 | Relyea | ............... | G04G 9/0082 715/834 |
| 8,902,715 B2* | 12/2014 | Tu | ............... | G04G 21/08 368/223 |
| 9,176,480 B2* | 11/2015 | Sadilek | ............... | G06F 3/04886 |
| 9,405,397 B2* | 8/2016 | Kuge | ............... | G06F 3/0412 |
| 9,778,839 B2* | 10/2017 | Wen | ............... | G06F 3/04883 |
| 2001/0055244 A1* | 12/2001 | Kim | ............... | G04G 9/0082 368/73 |
| 2002/0131331 A1* | 9/2002 | Molander | ............... | G04G 21/00 368/82 |
| 2004/0218472 A1* | 11/2004 | Narayanaswami | .. | G04G 9/0082 368/10 |
| 2004/0225966 A1* | 11/2004 | Besharat | ............... | G06Q 10/109 715/705 |
| 2006/0007785 A1* | 1/2006 | Fernandez | ............... | G04G 11/00 368/10 |
| 2007/0060205 A1* | 3/2007 | Kim | ............... | G06Q 10/02 455/566 |
| 2008/0065758 A1* | 3/2008 | Narayanaswami | .. | G06Q 10/107 709/224 |
| 2008/0109718 A1* | 5/2008 | Narayanaswami | .. | G06Q 10/109 715/262 |
| 2009/0287531 A1* | 11/2009 | Yang | ............... | G04G 9/0064 705/7.13 |
| 2010/0157742 A1* | 6/2010 | Relyea | ............... | G04G 9/0082 368/28 |
| 2010/0162170 A1* | 6/2010 | Johns | ............... | G04G 9/06 715/834 |
| 2012/0066629 A1* | 3/2012 | Lee | ............... | G06F 3/04847 715/769 |
| 2013/0139084 A1* | 5/2013 | Han | ............... | G06F 3/0488 715/765 |
| 2014/0219066 A1* | 8/2014 | Sadilek | ............... | G06F 3/04886 368/82 |
| 2015/0105125 A1* | 4/2015 | Min | ............... | G04G 21/04 455/566 |
| 2017/0160898 A1* | 6/2017 | Lee | ............... | H04M 1/7253 |

FOREIGN PATENT DOCUMENTS

| KR | 1020100088858 | 8/2010 |
|---|---|---|
| KR | 1020150019875 | 2/2015 |
| KR | 1020150062761 | 6/2015 |

\* cited by examiner (a) (b)

(a) (b)

(a)          (b)

(a)  (b)

(a)                            (b)

(a)            (b)

FIG. 33
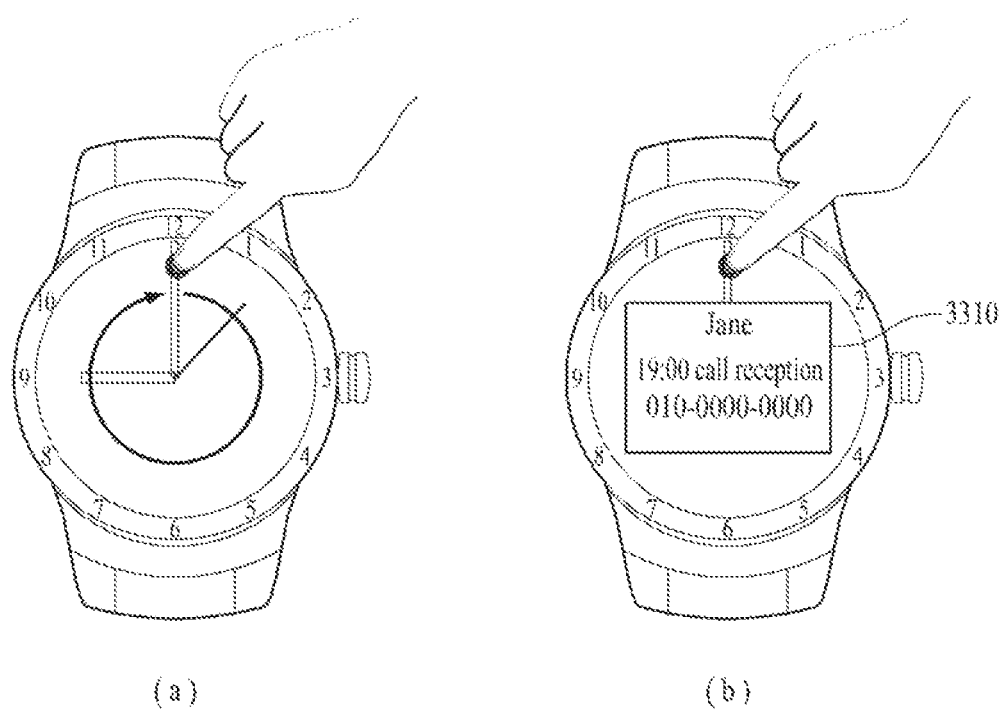
(a)   (b)
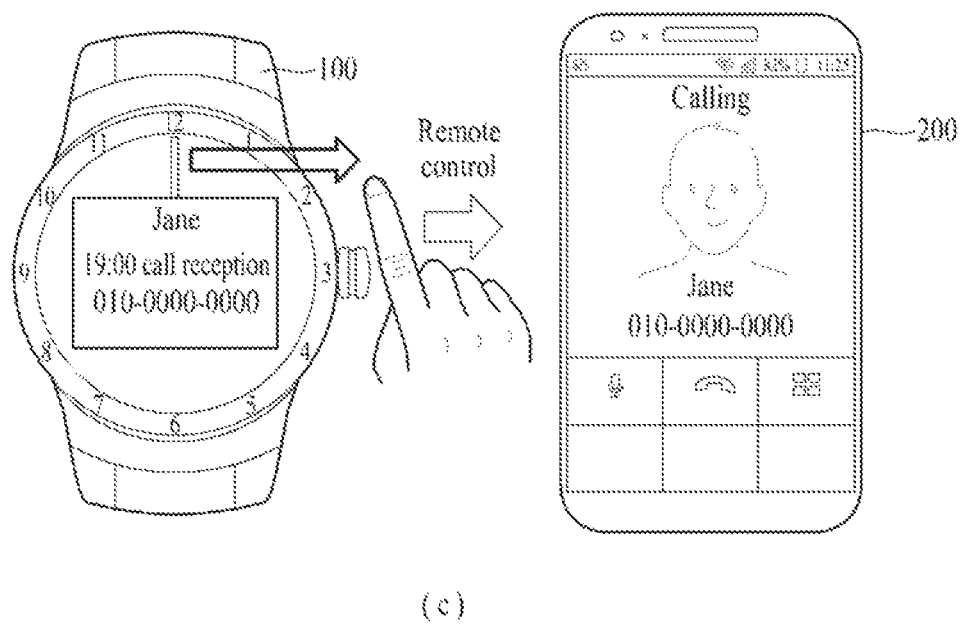
(c)

FIG. 35
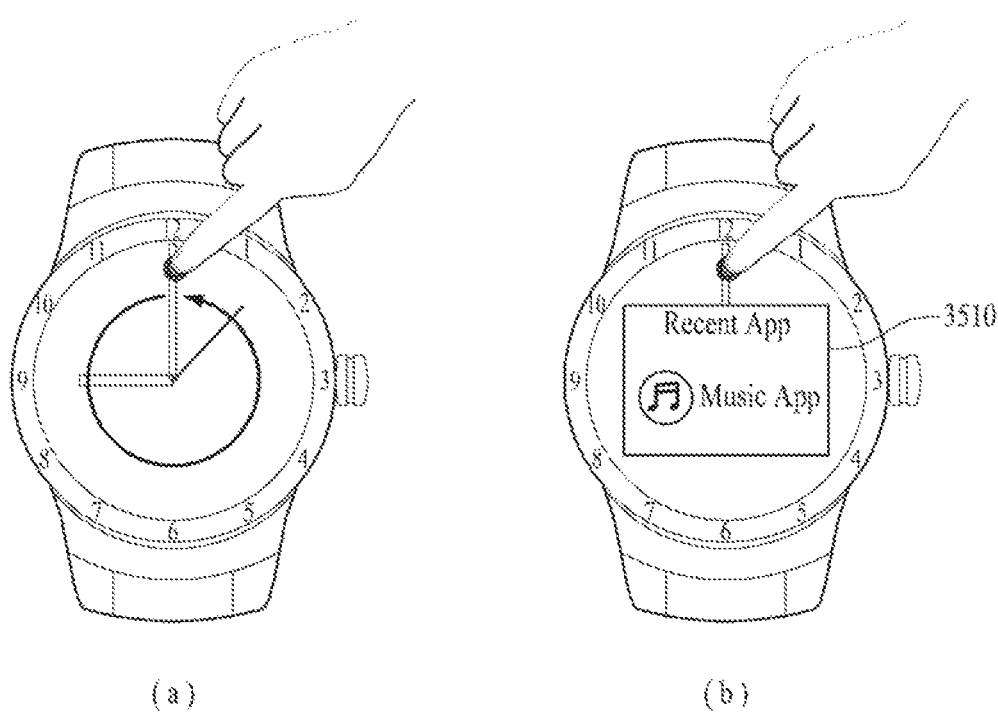
(a)  (b)
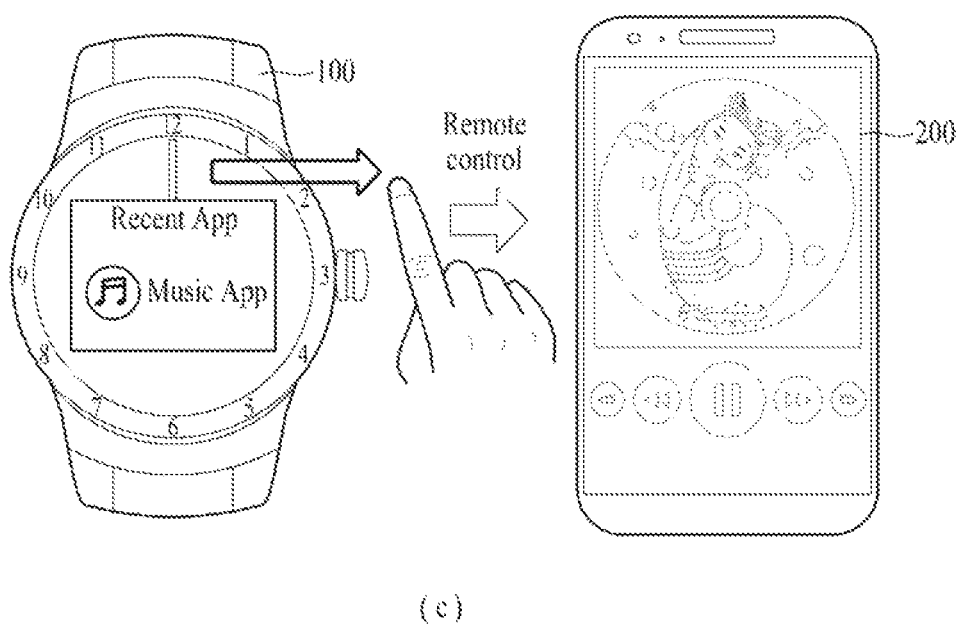
(c)

(a)  (b)

FIG. 45
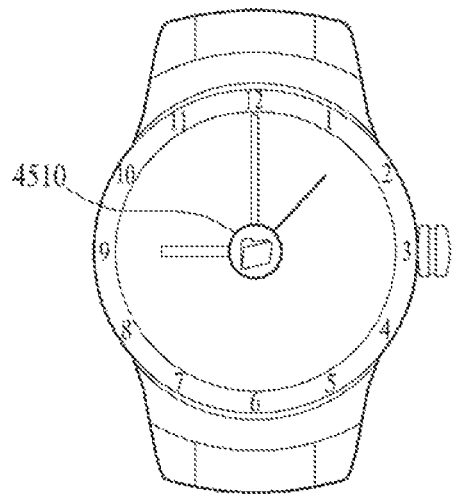
<in case of company>
(a)
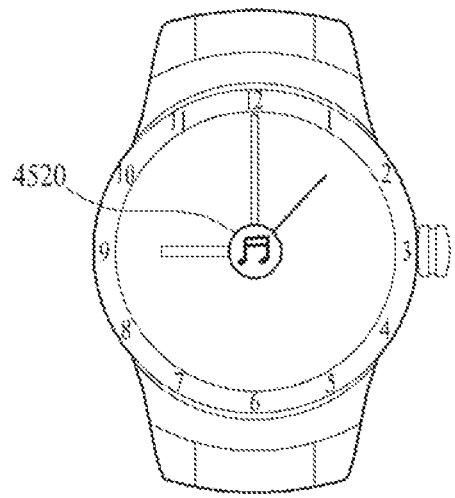
<in case of fast moving speed>
(b)
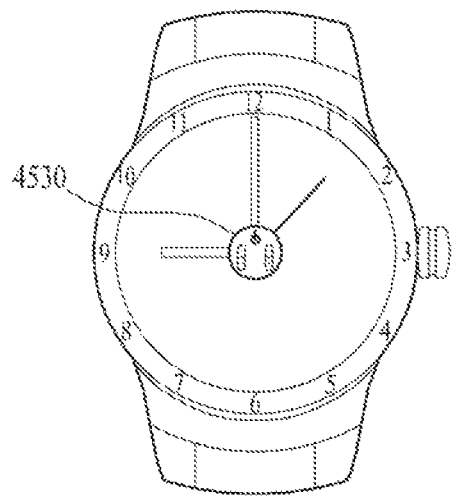
<in case of home>
(c)
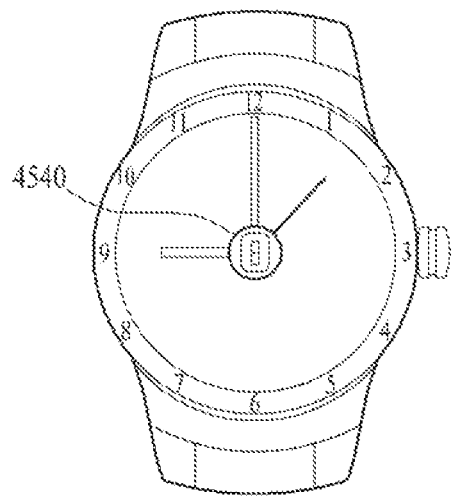
<in case of midnight>
(d)

FIG. 48
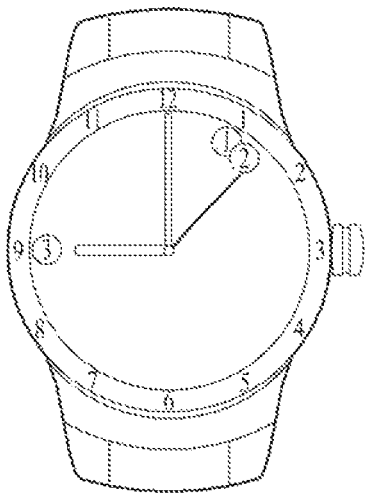
(a)
(b)
FIG. 49
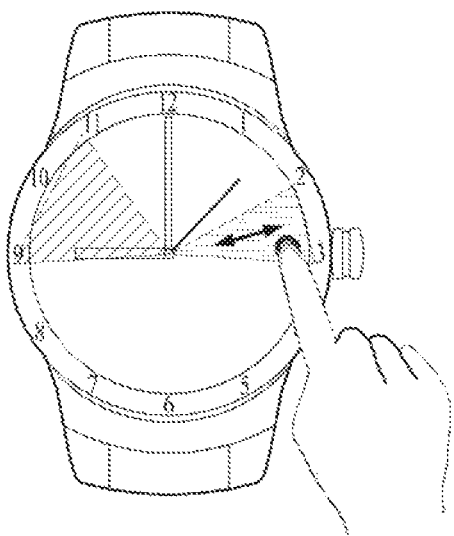
(a)
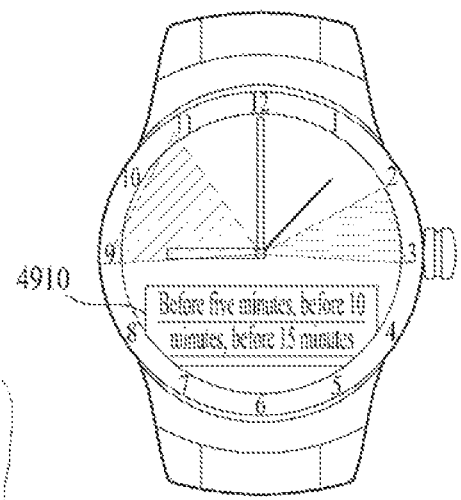
(b)

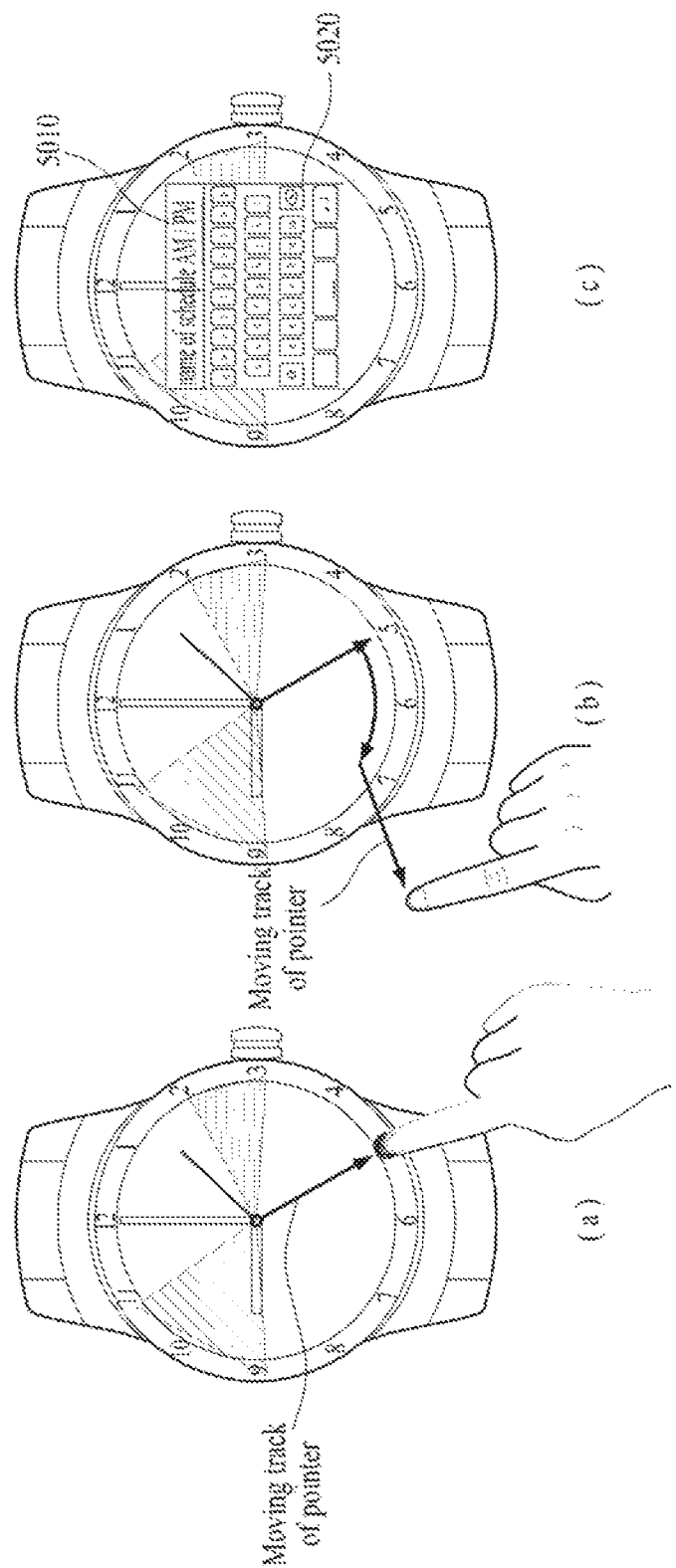

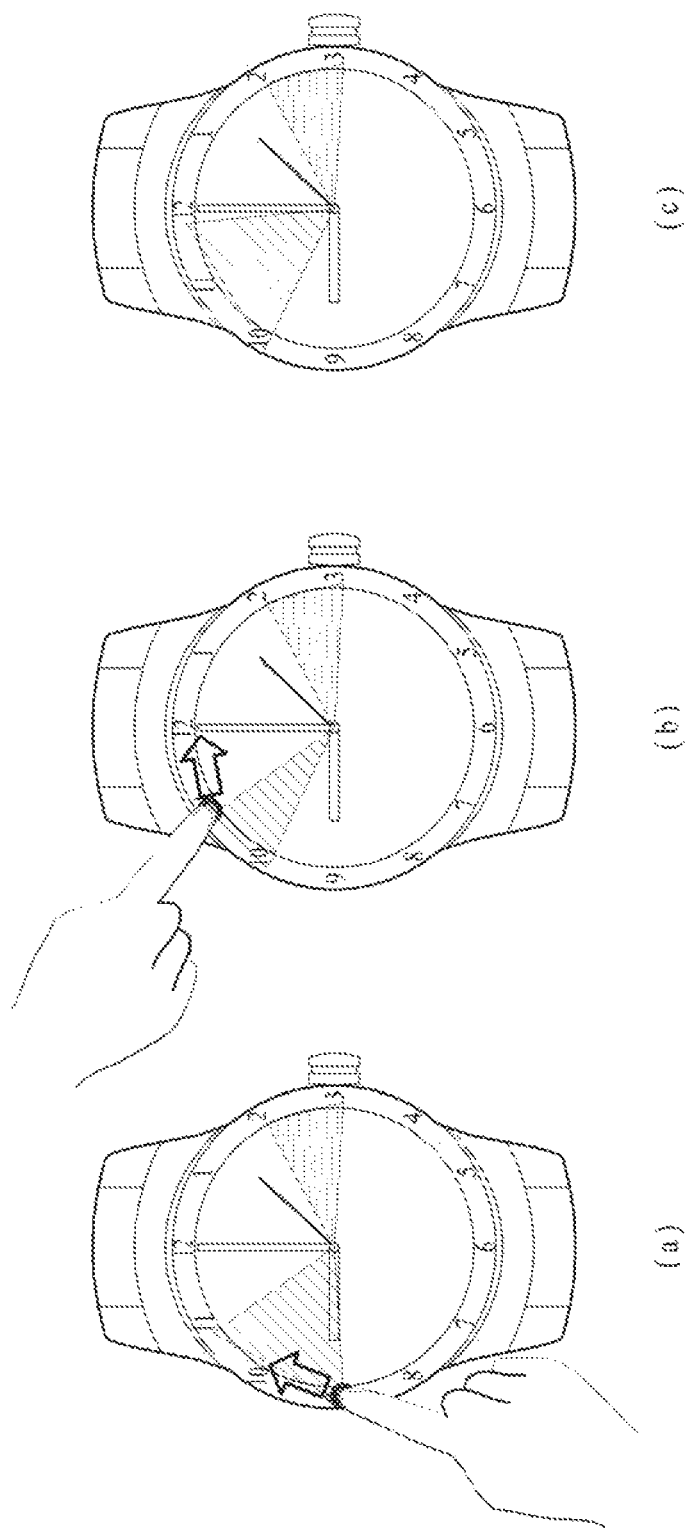

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/012155, filed on Nov. 12, 2015, which claims the benefit of earlier filing date and right of priority to Korean Application Nos. 10-2015-0094137, filed on Jul. 1, 2015, and 10-2015-0097904, filed on Jul. 9, 2015, the contents of which are all hereby incorporated by reference herein in their entirety.

TECHNICAL FIELD

The present invention relates to a mobile terminal capable of utilizing, as a control use, an hour hand and a minute hand, and a control method therefor.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to increase portability of a mobile terminal, a mobile terminal of a watch type that may be worn on a wrist of a user has been developed. Unlike a typical mobile terminal, a wearable type mobile terminal has an advantage in that a user always carries it on the body. A typical bar type or folder type mobile terminal has inconvenience in that a user carries it in a pocket or bag and should take out it if necessary, whereas the wearable device has an advantage in that a user may always check contents of the mobile terminal because the user always carries it on the body.

Among the wearable devices, the watch type terminal may also notify the user of time. As a general method for indicating time, an hour hand and a minute hand are displayed on a clock face. However, the hour hand and the minute hand have been restrictively used to simply indicate time information.

DISCLOSURE

Technical Problem

An object of the present invention is to provide a mobile terminal and a control method therefor, in which user convenience is improved.

Specifically, an object of the present invention is to provide a mobile terminal that may output information related to the time indicated by an hour hand and a minute hand.

Also, another object of the present invention is to provide a mobile terminal that may add a setup value related to the time indicated by an hour hand and a minute hand.

Moreover, other object of the present invention is to provide a mobile terminal that may control an application by using an hour hand and a minute hand.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve the above or other objects, according to one aspect of the present invention, a mobile terminal comprises a display unit for outputting information; and controller for controlling the display unit to output information corresponding to a time indicated by an hour hand and a minute hand, if a first touch input for outputting the hour hand the minute hand through the display unit is received or if a second touch input for dragging any one of the hour hand and the minute hand is received.

Also, in another aspect of the present invention, a control method for a mobile terminal comprises the steps of receiving a first touch input for outputting an hour hand and a minute hand or a second touch input for moving any one of the hour hand and the minute hand; displaying the hour hand and the minute hand on a display unit in response to the first touch input or the second touch input; and displaying the hour hand and the minute hand on the display unit; and outputting information corresponding to the time indicated by the hour hand and the minute hand through the display unit.

It will be appreciated by persons skilled in the art that that the technical solutions that could be achieved with the present invention are not limited to what has been particularly described hereinabove and other technical solutions of the present invention will be more clearly understood from the following detailed description.

Advantageous Effects

Advantageous effects of a mobile terminal and a control method therefor according to the present invention are as follows.

According to at least one of the embodiments of the present invention, it is advantageous that a mobile terminal having improved user convenience may be provided.

Specifically, a mobile terminal that may output information related to the time indicated by an hour hand and a minute hand may be provided.

Also, a mobile terminal that may add a setup value related to the time indicated by an hour hand and a minute hand may be provided.

Moreover, a mobile terminal that may control an application by using an hour hand and a minute hand may be provided.

It will be appreciated by persons skilled in the art that that the effects that could be achieved with the present invention are not limited to what has been particularly described

BRIEF DESCRIPTION OF THE DRAWINGS

FIG. 33 is a view illustrating an example that call record information is output.

FIG. 35 is a view illustrating an example that application execution information is output.

FIG. 45 is a view illustrating an example that a control target is changed depending on a status.

FIG. 48 is a view illustrating an example that a schedule corresponding to a number input by a user is output.

FIG. 49 is a view illustrating an example that an alarm is set.

FIG. 50 is a view illustrating an example that a new schedule is added.

FIG. 51 is a view illustrating an example that a starting time and an ending time of a schedule are changed.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
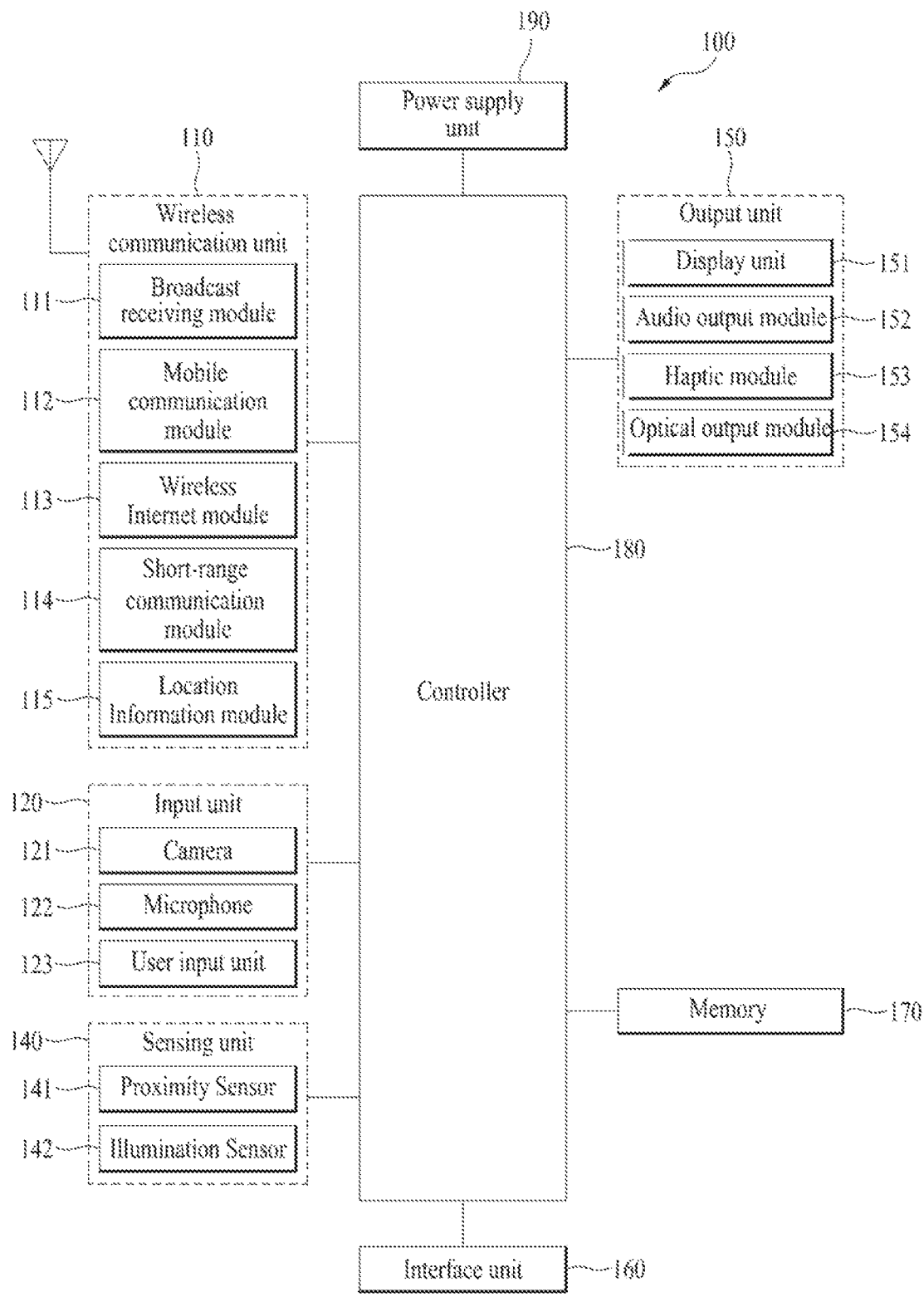
FIG. 1a is a block diagram of a mobile terminal according to the present invention.
Figure 1B:
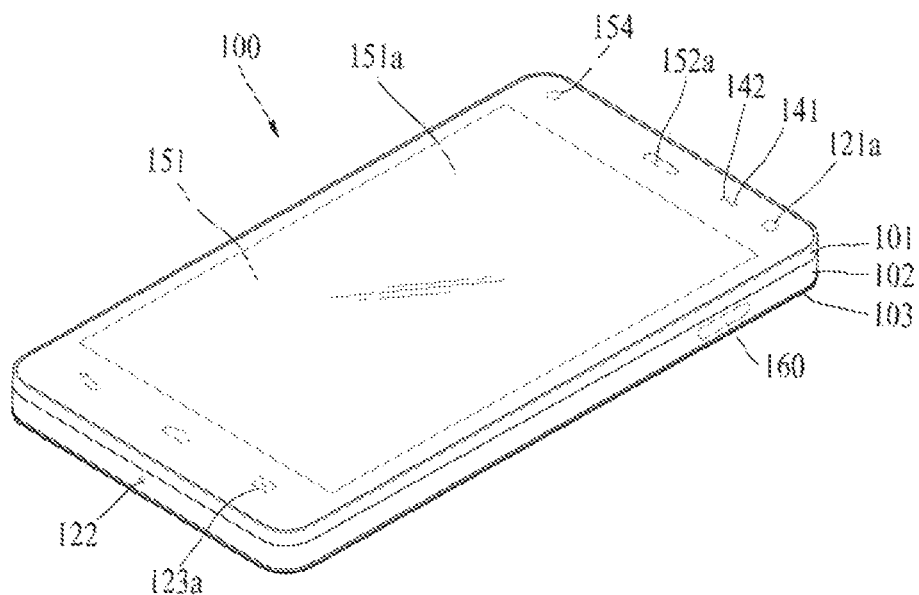
FIGS. 1b and 1c are conceptual views of one example of the mobile terminal, viewed from different directions.
Figure 1C:
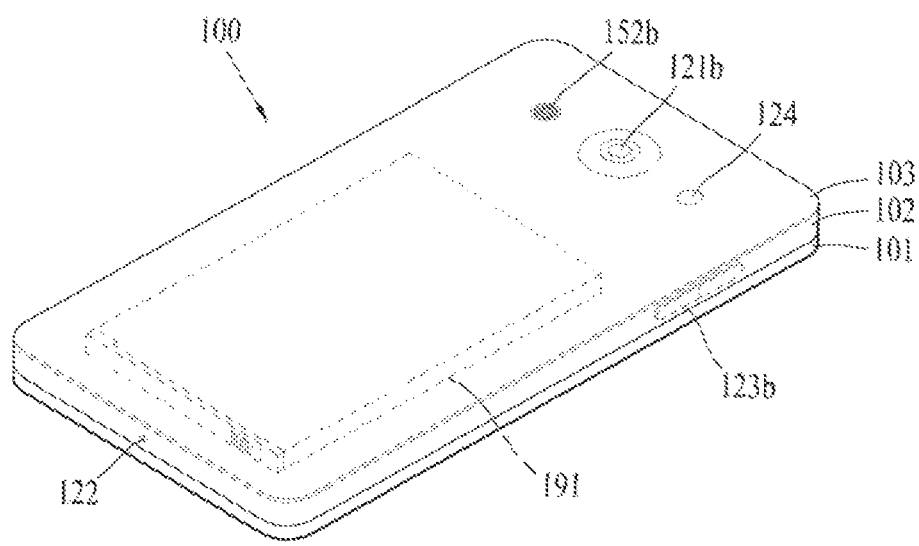

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned components, or activating application programs stored in the memory 170.

Also, the controller 180 may control some or all of the components illustrated in FIG. 1A to drive the application programs stored in the memory 170. Moreover, the controller 180 may operate at least two or more of the components included in the mobile terminal 100 in combination to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the aforementioned components may be operated in cooperation with one another to implement operation, control or control method of the mobile terminal according to various embodiments which will be described below. Also, the operation, control or control method of the mobile terminal may be implemented on the mobile terminal by driving of at least one application program stored in the memory 170.

Prior to the various embodiments implemented through the mobile terminal 100, the various components depicted as above will now be described in more detail with reference to FIG. 1a.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). Meanwhile, the controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In this case, since the mobile terminal 100 is regarded as at least one assembly, the terminal body may be understood as the mobile terminal 100.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 may be located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output units 152a and 152b, a proximity sensor 141, an illumination sensor 142, an optical output unit 154, first and second cameras 121a and 121b, first and second manipulation units 123a and 123b, a microphone 122, and an interface unit 160.

Hereinafter, as shown in FIGS. 1B and 1C, the display unit 151, the first audio output unit 152a, the proximity sensor 141, the illumination sensor 142, the optical output unit 154, the first cameras 121a, and the first manipulation unit 123a are arranged on the front surface of the terminal body, and the second manipulation unit 123b, the microphone 122 and the interface unit 160 are arranged on the side of the terminal body, and the second audio output unit 152b and the second camera 121b area arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. In this case, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 may be arranged to be adjacent to the second camera 121b. When an image of a subject is captured with the camera 121b, the flash 124 may illuminate the subject.

The second audio output module 152b may additionally be arranged on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 (see FIG. 1A) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is coupled to the rear case 102 to cover the battery 191, thereby restricting detachment of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
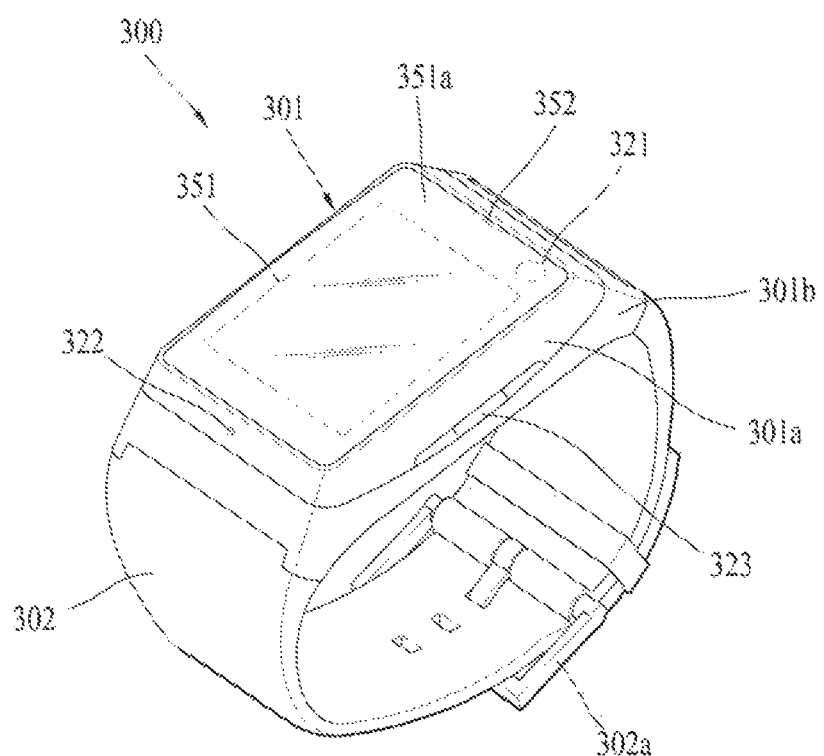
FIG. 2 is a perspective view illustrating a watch type mobile terminal according to another embodiment of the present invention.

FIG. 2 is a perspective view illustrating a watch type mobile terminal 200 according to another embodiment of the present invention.

Referring to FIG. 2, the watch type mobile terminal 200 includes a main body 201 having a display unit 251, and a band 202 connected to the main body 201 and configured to be worn on a wrist of a user. Generally, the mobile terminal 200 may include characteristics of the mobile terminal shown in FIGS. 1A to 1C or characteristics similar to those of the mobile terminal shown in FIGS. 1A to 1C.

The main body 201 includes a case forming an external appearance. As shown, the case may include first and second cases 201a and 201b that provide an inner space for receiving various electronic components. However, the present invention is not limited to this case, and one case may be configured to provide the inner space, whereby the mobile terminal 200 of a uni-body may be implemented.

The watch type mobile terminal 200 may be configured to enable wireless communication, and an antenna for the wireless communication may be installed in the main body 201. Meanwhile, throughput of the antenna may be enlarged using the case. For example, the case including a conductive material may be configured to be electrically connected with the antenna to enlarge a ground area or a radiation area.

The display unit 251 may be arranged on the front surface of the main body 201 to output information. The display unit 251 may include a touch sensor to be implemented as a touch screen. As illustrated, a window 251a of the display unit 251 may be mounted to a front case 201a to form the front surface of the terminal body together with the front case 201a.

The main body 201 may include an audio output unit 252, a camera 221, a microphone 222, and a user input unit 223. When the display unit 251 is implemented as a touch screen, the display unit 251 may serve as the user input unit 223, whereby a separate key may not be provided in the main body 201.

The band 202 may be configured to be worn on a wrist of a user to surround the wrist, and may be formed of a flexible material to allow the user to easily wear the band. As examples of the flexible material, the band 202 may be formed of leather, rubber, silicon, synthetic resin, etc. Also, the band 202 may be configured to be detachably provided in the main body 201, whereby the user may exchange the band with various shapes in accordance with a taste.

Meanwhile, the band 202 may be used to enlarge throughput of the antenna. For example, a ground extension portion (not shown) electrically connected with the antenna, extending the ground area may be embedded in the band.

The band 202 may be provided with a fastener 202a. The fastener 202a may be implemented into a buckle type, a snap-fit hook structure, a Velcro™ type, or the like, and may include a flexible section or material. The drawing illustrates an example that the fastener 202a is implemented using a buckle.

For convenience of description, the mobile terminal according to the present invention is a watch type as shown in FIG. 2. Also, it is assumed that the watch type mobile terminal (hereinafter, referred to as watch type terminal) according to the present invention includes at least a part of the components shown in FIGS. 1A to 1C. For example, it is assumed that the watch type terminal according to the present invention includes the wireless communication unit 110, the display unit 151, the memory 170 and the controller 180 among the components shown in FIGS. 1A to 1C.

It is general that the watch type terminal currently on the market is used together with other terminal (for example, bar type smart phone) in pairs. For example, if the watch type terminal and the bar type smart phone are paired based on Bluetooth communication, the watch type terminal may output data (for example, weather information, schedule information or call record) received from the smart phone or transmit a control signal for remotely controlling the smart phone to the smart phone. Also, if an event such as incoming call or an event that a current time is an alarm time recorded in the smart phone occurs in the smart phone, the watch type terminal may output a feedback for notifying the bar type smart phone that the event has occurred.

However, it is not required the watch type terminal should be used to interwork with other terminal. The watch type terminal may be used independently without interworking with other terminal. For example, the watch type terminal may directly output data transmitted and received through communication with a server or the like, or may output a feedback in response to an event (for example, incoming call received in the watch type terminal or an event that a current time is an alarm time recorded in the watch type terminal) occurring in the watch type terminal.

An hour hand and a minute hand for basically indicating a current time may be displayed through the display unit 151 of the watch type terminal. In addition to the hour hand and the minute hand, a second hand indicating time of second unit may further be displayed. The hour hand, the minute hand and the second hand may be identified from one another by each length and each width.

Figure 3:
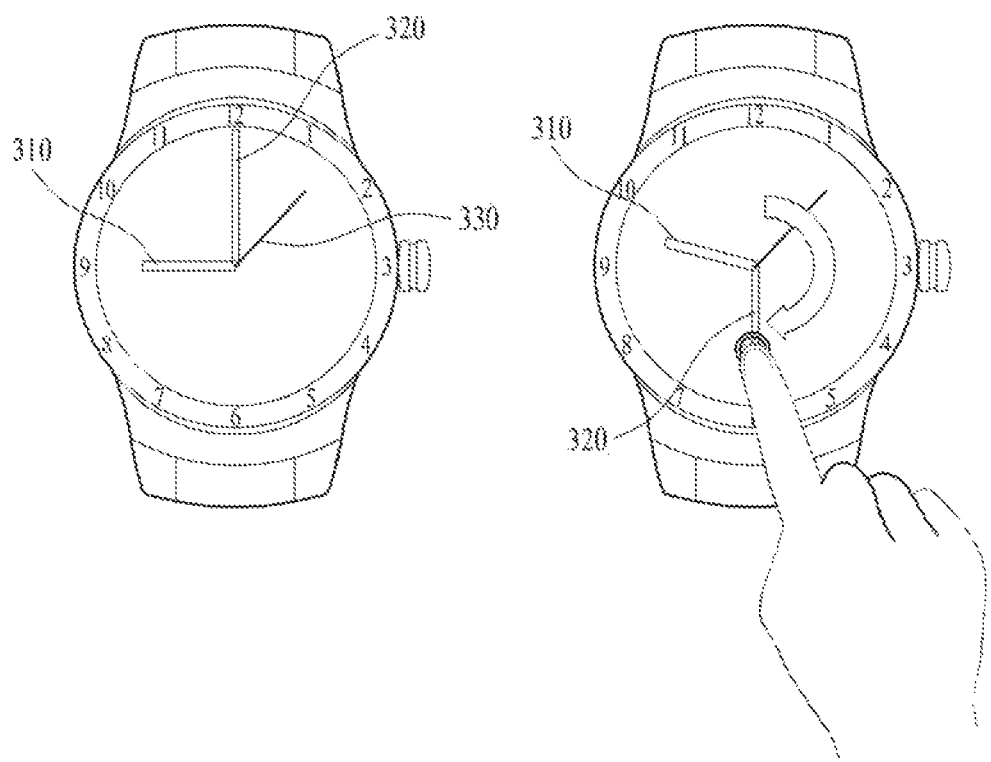
FIG. 3 is a view illustrating an example that an hour hand, a minute hand and a second hand are output through a display unit.

For example, FIG. 3 is a view illustrating an example that an hour hand, a minute hand and a second hand are output through a display unit 151. As shown in FIG. 3(*a*), a bar 310 corresponding to the hour hand may be set to have a length shorter than a bar 320 corresponding to the minute hand. Also, a bar 330 corresponding to the second band may be set to have a width narrower than the bar 310 corresponding to the hour hand and the bar 320 corresponding to the minute hand.

The controller 180 may control a position of the hand hour 310 or the minute hand 320 on the basis of a touch input obtained by drag movement of a pointer which touches the hour hand 310 or the minute hand 320. For example, as shown in FIG. 3(*b*), if a touch input obtained by drag movement of a pointer which touches the minute hand 320 clockwise is received, the controller 180 may control the position of the minute hand 320 along a drag movement track of the pointer.

If the position of the minute hand 320 is changed by a drag input of a user, the position of the hour hand 310 may be changed automatically. For example, if the minute hand 320 is rotated clockwise by the drag input of the user, the hour hand 310 will slowly be rotated clockwise. In FIG. 3(*b*), as the minute hand 320 is rotated clockwise for 30 minutes, the hour hand 310 moves to a middle area between 9 o'clock and 10 o'clock by rotation. That is, the position of the hour hand 310 may be controlled automatically in conjunction with movement of the minute hand 320 in accordance with a moving mechanism of the hour hand 310 and the minute hand 320 in an actual watch.

The controller may simultaneously move the hour hand and the minute hand clockwise or counterclockwise. For example, if two pointers that respectively touch the hour hand and minute hand drag-move clockwise or counterclockwise, the controller 180 may control the position of the hour hand on the basis of movement of the pointer that has touched the hour hand and control the position of the minute hand on the basis of movement of the pointer that has touches the minute hand.

The watch type terminal according to the present invention may display the hour hand and the minute hand on the display unit 151 on the basis of a touch input of a user or change a display position of the hour hand and the minute hand.

Figure 4:
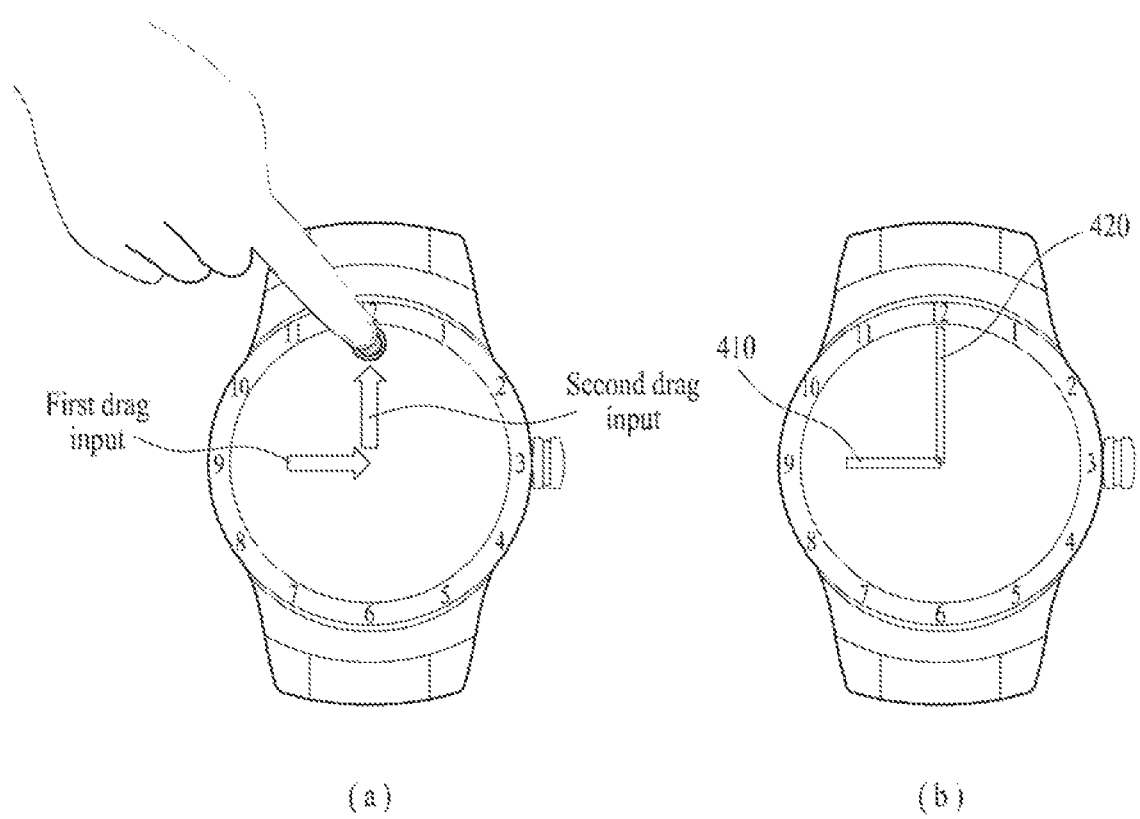
FIG. 4 is a view illustrating an example that an hour hand and a minute hand are displayed based on a touch input of a user.

For example, FIG. 4 is a view illustrating an example that an hour hand and a minute hand are displayed based on a touch input of a user.

If a first drag input of a pointer that has touched a random position of the display unit 151 and drag-moves toward the center of the display unit 151 and a second drag input of a pointer that has moved to the center of the display unit 151 and drag-moves to the outside of the display unit 151 are received in a state that the display unit 151 is set to an off-state, the controller 180 may display the hour hand on the basis of a moving path of the first drag input and display the minute hand on the basis of a moving path of the second drag, while turning on the display unit 151.

In this case, the off-state of the display unit 151 means an off-state of a lamp illuminating the display unit 151. Any information or graphic image is not output to the display unit 151 in the off-state of the display unit 151. On the contrary, an on-state (or active state) of the display unit 151 may mean an on-state of the lamp illuminating the display unit 151. Information or graphic image may be output under the control of the controller 180 in the on-state of the display unit 151.

As shown in FIG. 4(*a*), if a first drag input of a pointer that has touched a direction of a 9 o'clock and drag-moves toward the center of the display unit 151 and a second drag input of a pointer that moves from the center of the display unit 151 toward a 12 o'clock are received, the controller 180 may display the hour hand 410 headed for 9 o'clock along a track of the first drag input and display the minute hand 420 headed for 12 o'clock as shown in FIG. 4(*b*).

Even in the case that the first drag input and the second drag input are received at the on-state of the display unit 151, the controller 180 may output the hour hand 410 and the minute hand 420 on the basis of the first drag input and the second drag input. In this case, the hour hand 410 and the minute hand 420 may be output by being overlaid on information output through the display unit 151.

The position of the hour hand may not be exactly matched with the moving path of the first drag input. For example, even though the track of the first drag input connects a first point of a 9 o'clock direction with a second point of the center of the display unit 151, if the second drag input connects a third point of a 6 o'clock direction to the second point, the position of the hour hand may be arranged at a center portion of 9 o'clock and 10 o'clock. That is, the position of the hour hand may be controlled automatically in accordance with a moving mechanism of the hour hand and the minute hand.

In the shown example, the first drag input and the second drag input may be input continuously. That is, if a drag input for connecting the first point arranged in the 9 o'clock direction, the second point at the center portion of the display unit 151, and the third point arranged in the 12 o'clock direction with one another is received, the hour hand may be output by drag movement of the pointer from the first point to the second point, and the minute hand may be output by drag movement of the pointer from the second point to the third point.

On the contrary to the shown example, the controller 180 may display the minute hand on the basis of the moving path of the first drag input and output the hour hand on the basis of the moving path of the second drag input.

In the aforementioned example, the hour hand and the minute hand are displayed in response to the touch input (for example, the first drag input and the second drag input) received when the display unit 151 is in the off-state.

In a state that the hour hand and the minute hand are displayed through the display unit 151, if the touch input (for example, the first drag input and the second drag input) is received, the controller 180 may change the positions of the hour hand and the minute hand in response to the touch input.

For example, when the hour hand and the minute hand indicate 10 o'clock and 30 minutes, if a first drag input of a pointer that has touched a direction of a 9 o'clock and drag-moves toward the center of the display unit 151 and a second drag input of a pointer that moves from the center of the display unit 151 toward a 12 o'clock are received, the controller 180 may control the position of the hour hand to indicate the 9 o'clock direction and control the position of the minute hand to indicate the 12 o'clock direction.

If the hour hand and the minute hand are displayed based on the touch input of the user, the controller 180 may control the hour hand and the minute hand, which indicate the current time, to be additionally output such that the time indicated by the hour hand and the minute hand may be compared with the current time, as shown in FIG. 4(*c*). In this case, the hour hand and the minute hand, which indicate the current time, may be set to be visually identified from the hour hand and the minute hand output by the touch input of the user. For example, the hour hand and the minute hand, which indicate the current time, may be set differently from the hour hand and the minute hand output by the touch input of the user in color, transparency or length. Therefore, the user may easily identify two pair of hour hands and minute hands on the display unit 151.

However, for convenience of drawing drafting, display of the hour hand and the minute hand, which indicate the current time, will be omitted from the drawings which will be disclosed later.

If the track of the first drag input indicate a boundary of a specific hour, the controller 180 may output a menu for identifying a time slot selected by the user to clarify a direction of the track of the first drag input.

Figure 5:
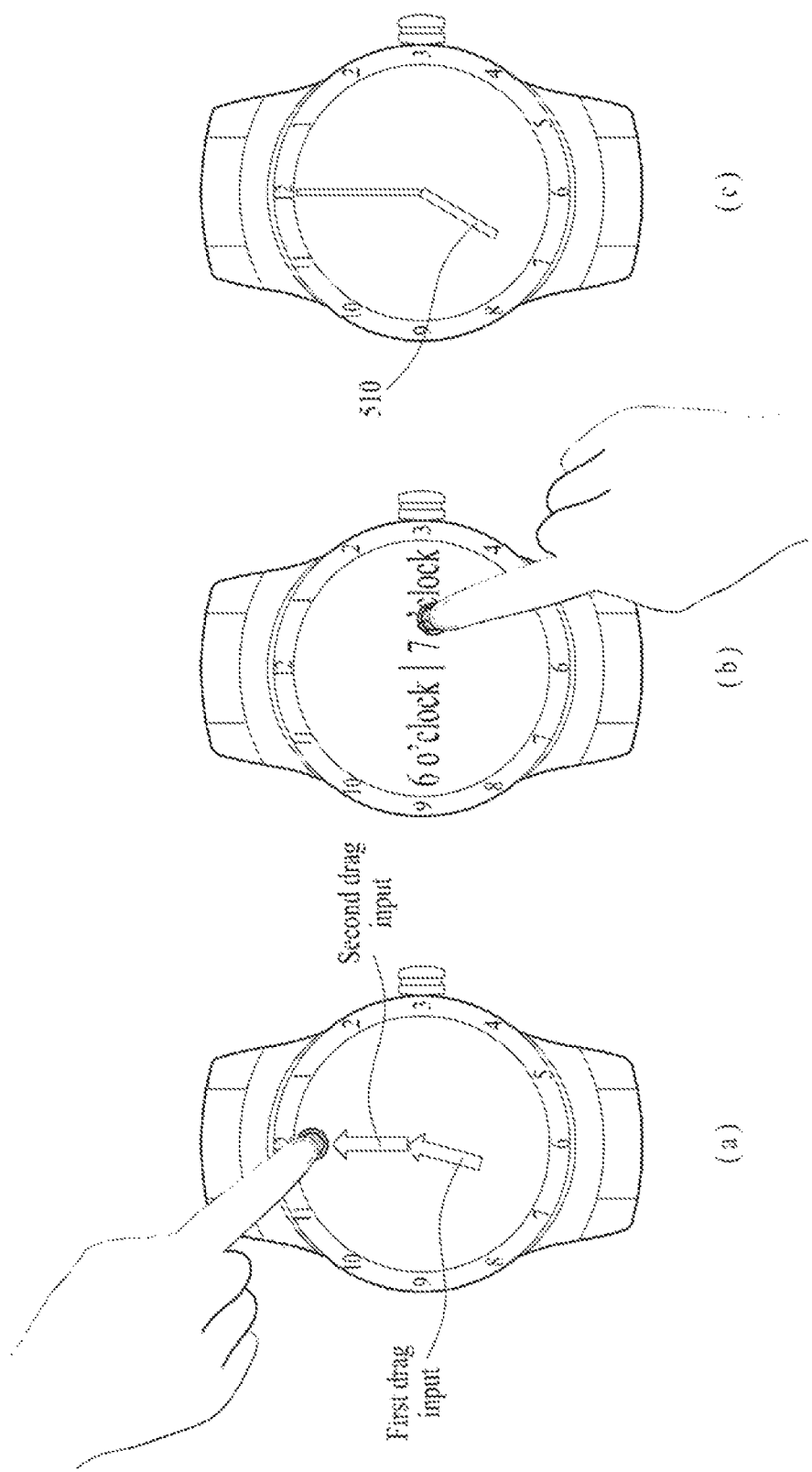
FIG. 5 is a view illustrating an example that a menu for selecting time is output.

For example, FIG. 5 is a view illustrating an example that a menu for selecting time is output.

As illustrated in FIG. 5(*a*), if a first drag input of a pointer that drag-moves from a boundary of 7 o'clock to the center of the display unit 151 is received, the controller 180 may output a menu for clarifying whether the time selected by the user is 7 o'clock or 6 o'clock as shown in FIG. 5(*b*).

If 6 o'clock is selected from the shown menu, the controller 180 may control the position of the hour hand to indicate 6 o'clock. Unlike this case, if 7 o'clock is selected from the menu, the controller 180 may control the position of the hour hand to indicate 7 o'clock.

FIG. 5(*c*) illustrates that an hour hand 510 indicating 7 o'clock is displayed as a touch input that touches 7 o'clock on the menu is received.

If a track of the second drag input is headed for a boundary between numbers from the center of the display unit 151, the controller 180 may control the minute hand to indicate a specific number.

Figure 6:
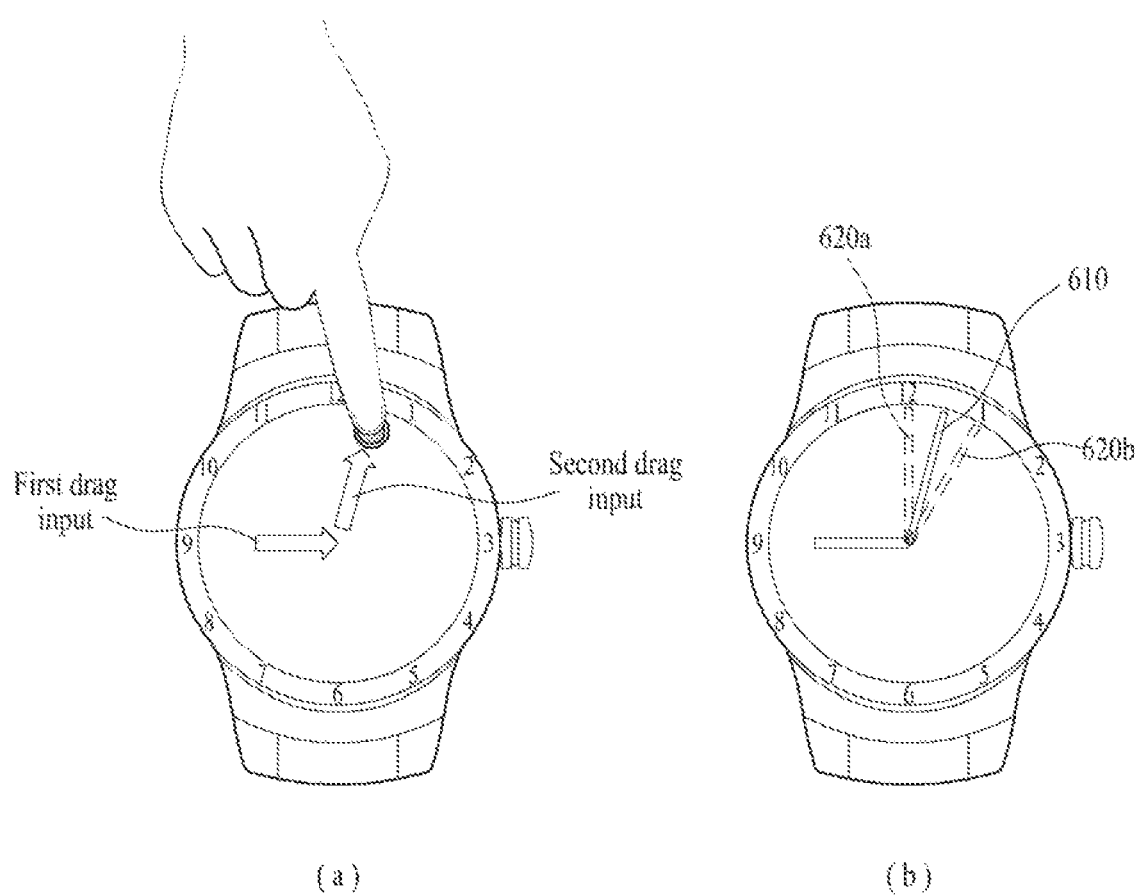
FIG. 6 is a view illustrating an example that a minute hand moves to indicate a specific number.

For example, FIG. 6 is a view illustrating an example that a minute hand moves to indicate a specific number.

As illustrated in FIG. 6(*a*), if a second drag input of a pointer that drag-moves from the center of the display unit 151 to a boundary between 12 o'clock and 1 o'clock is received, the controller 180 may output candidate minute hands 620*a* and 620*b* headed for 12 o'clock and 1 o'clock as shown in FIG. 6(*b*).

If any one of the candidate minute hands is selected, the controller 180 may control the minute hand 610 to move to the position of the selected candidate minute hand. For example, if a touch input of a pointer, which has touched the minute hand and drag-moves toward 1 o'clock, is received, the controller 180 may display the minute hand headed for 12 o'clock. In this way, as the minute hand is set to be headed for a specific number, the time may be selected in a unit of 5 minutes.

In addition to the minute hand, the hour hand may be set to move to a specific number on a clock face.

In the aforementioned example, the hour hand and the minute hand are output by, but not limited to, the drag input. For another example, the controller 180 may output the hour hand and the minute hand through a touch input for touching the display unit 151 or a voice of the user.

Figure 7:
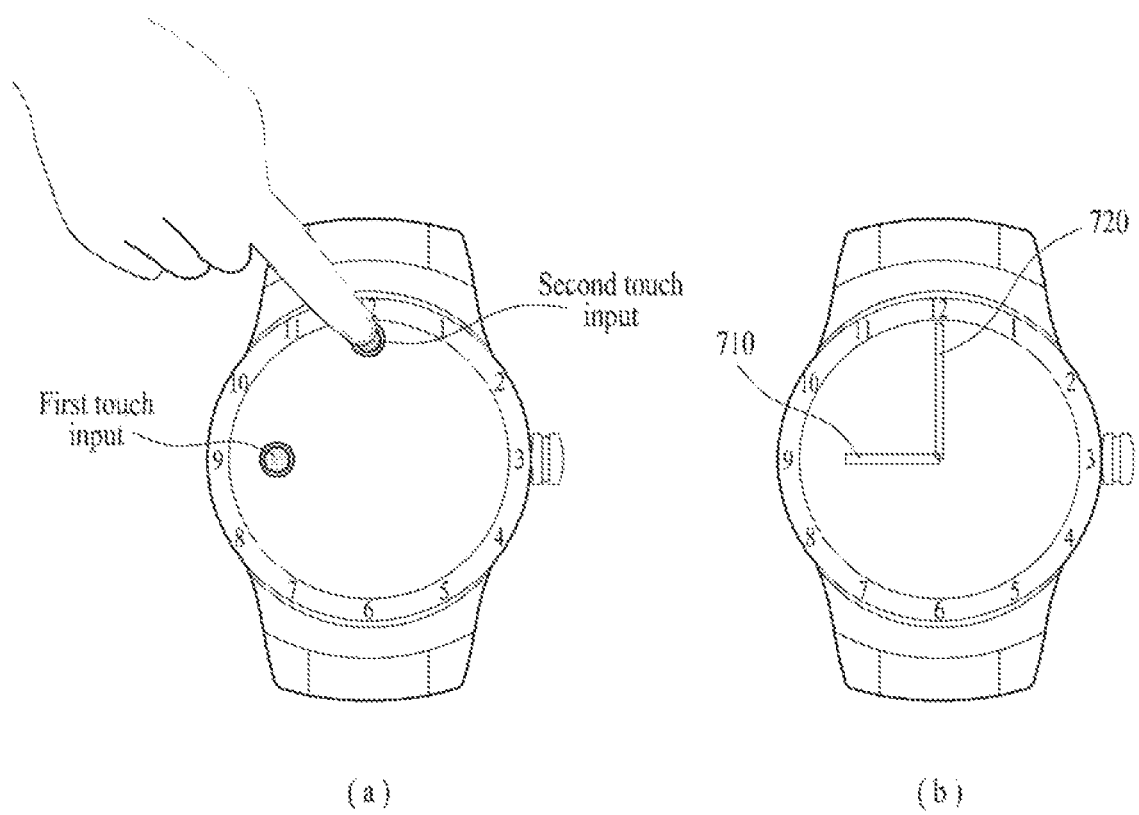
FIG. 7 is a view illustrating another example that an hour hand and a minute hand are displayed.

For example, FIG. 7 is a view illustrating another example that an hour hand and a minute hand are displayed.

As illustrated in FIG. 7(*a*), if a first touch input for touching a first point of a 9 o'clock direction and a second touch input for touching a second point of a 12 o'clock direction are received, as illustrated in FIG. 7(*b*), the controller 180 may display an hour hand 710 headed for 9 o'clock from the center of the display unit 151 in response to the first touch input and display a minute hand 720 headed for 12 o'clock from the center of the display unit 151 in response to the second touch input.

Based on the aforementioned description, the watch type terminal according to the present invention will be described in detail.

<Display of Information Related to Time>

If change details of output of the hour hand and the minute hand occur, the controller 180 may output information related to the time indicated by the hour hand and the minute hand.

Figure 8:
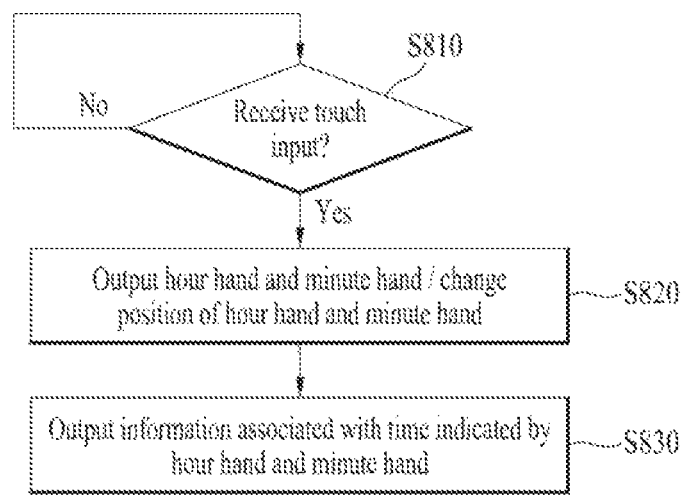
FIG. 8 is a view illustrating an operation flow of a watch type terminal according to the present invention.

For example, FIG. 8 is a view illustrating an operation flow of a watch type terminal according to the present invention.

First of all, if a touch input is received through the display unit 151 (S810), the controller 180 may output the hour hand or the minute hand through the display unit 151 or change the position of the hour hand or the minute hand, which is being output, in response to the touch input (S820).

Afterwards, the controller 180 may output information associated with the time indicated by the hour hand and the minute hand through the display unit 151 (S830).

In this case, the time associated information output through the display unit 151 may include a weather, a missed call record, a schedule, an alarm and a coupon. At this time, the time associated information output through the display unit 151 may be received from other terminal interworking with the watch type terminal, or may be stored in the watch type terminal. For another example, the watch type terminal may output time associated information, which is received from a server, through the display unit 151.

An example that the time associated information indicated by the hour hand and the minute hand will be described in detail with reference to the embodiments which will be described later.

Figure 9:
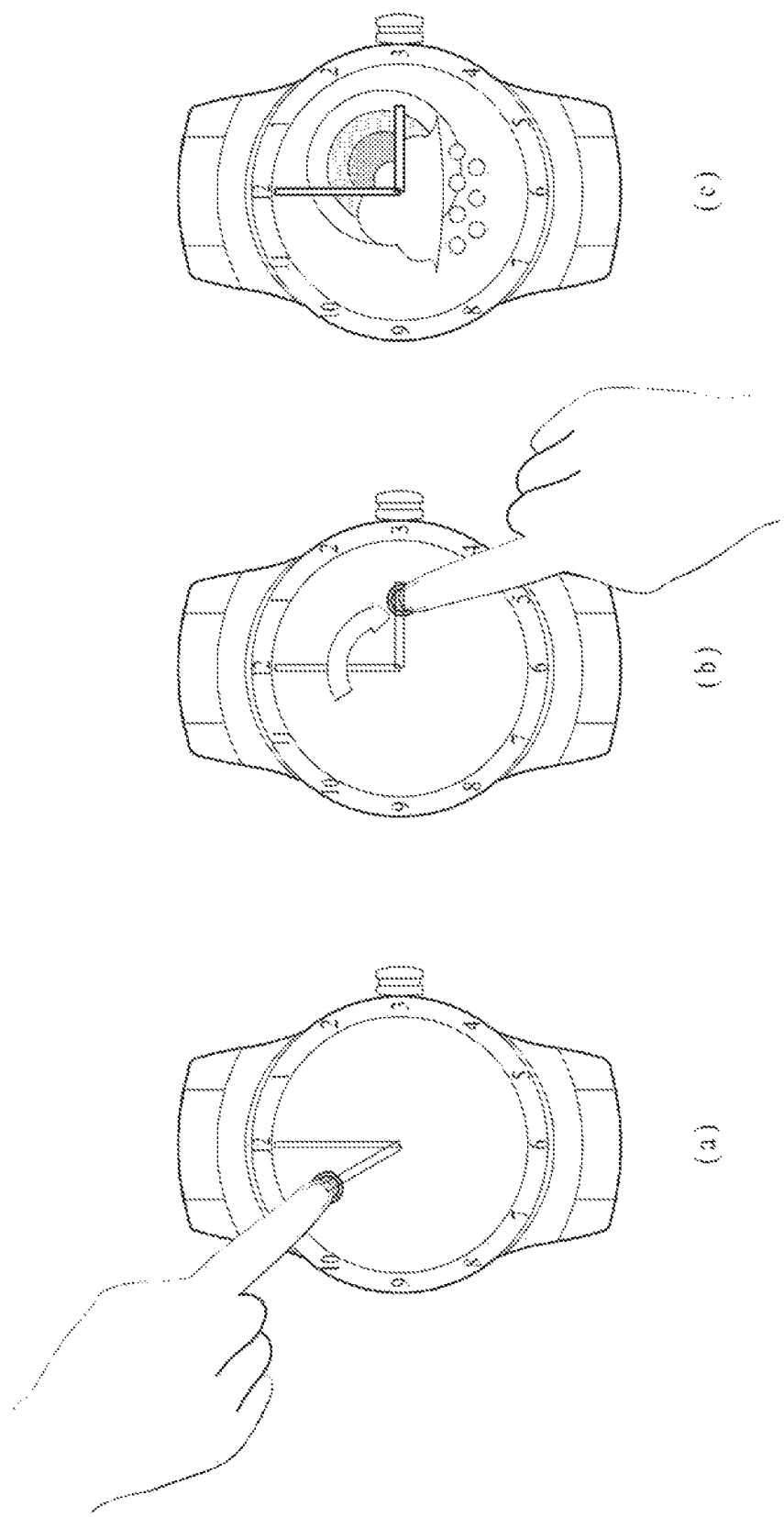
FIG. 9 is a view illustrating an example that weather information corresponding to the time indicated by an hour hand and a minute hand is output.

FIG. 9 is a view illustrating an example that weather information corresponding to the time indicated by an hour hand and a minute hand is output.

In a state that the hour hand and the minute hand are displayed through the display unit 151, if the touch input of the pointer, which has touched the hour hand, for drag-moving clockwise or counterclockwise, is received, the controller 180 may control the output position of the hour hand along the pointer.

For example, as shown in FIG. 9(a), if a user input for drag-moving a pointer, which has touched the hour hand, clockwise, is received, the controller 180 may rotate the hour hand clockwise along the pointer.

If the hour hand is rotated clockwise, the controller 180 may output weather information of a time slot which is indicated as the hour hand moves.

For example, FIGS. 9(a) and (b) illustrate that the hour hand and the minute hand indicating 11 o'clock are changed to indicate 3 o'clock due to movement of the hour hand. As the hour hand and the minute hand are changed to indicate 3 o'clock, the controller 180 may output weather information predicted at 3 o'clock as illustrated in FIG. 9(c).

At this time, the controller 180 may output future weather information compared with the current time if the hour hand is rotated clockwise, and may output past weather information compared with the current time if the hour hand is rotated counterclockwise.

For example, when the hour hand and the minute hand indicate 11 o'clock, a.m., the hour hand is rotated clockwise, whereby the hour hand and the minute hand indicate 3 o'clock. In this case, the controller 180 may output weather information predicted at 3 o'clock, p.m. later than 11 o'clock, a.m. If the hour hand is rotated one round clockwise and then indicate 3 o'clock, the controller 180 may output weather information of 3 o'clock, a.m. next day.

For another example, when the hour hand and the minute hand indicate 11 o'clock, a.m., the hour hand is rotated counterclockwise, whereby the hour hand and the minute hand indicate 3 o'clock. In this case, the controller 180 may output weather information of 3 o'clock, a.m. prior to 11 o'clock, a.m. If the hour hand is rotated one round counterclockwise and then indicate 3 o'clock, the controller 180 may output weather information of 3 o'clock, p.m. corresponding to a previous day.

Even in the case that the minute hand moves clockwise or counterclockwise as well as the case that the hour hand moves clockwise or counterclockwise, weather information corresponding to the time indicated by the changed hour hand and minute hand may be output.

Figure 10:
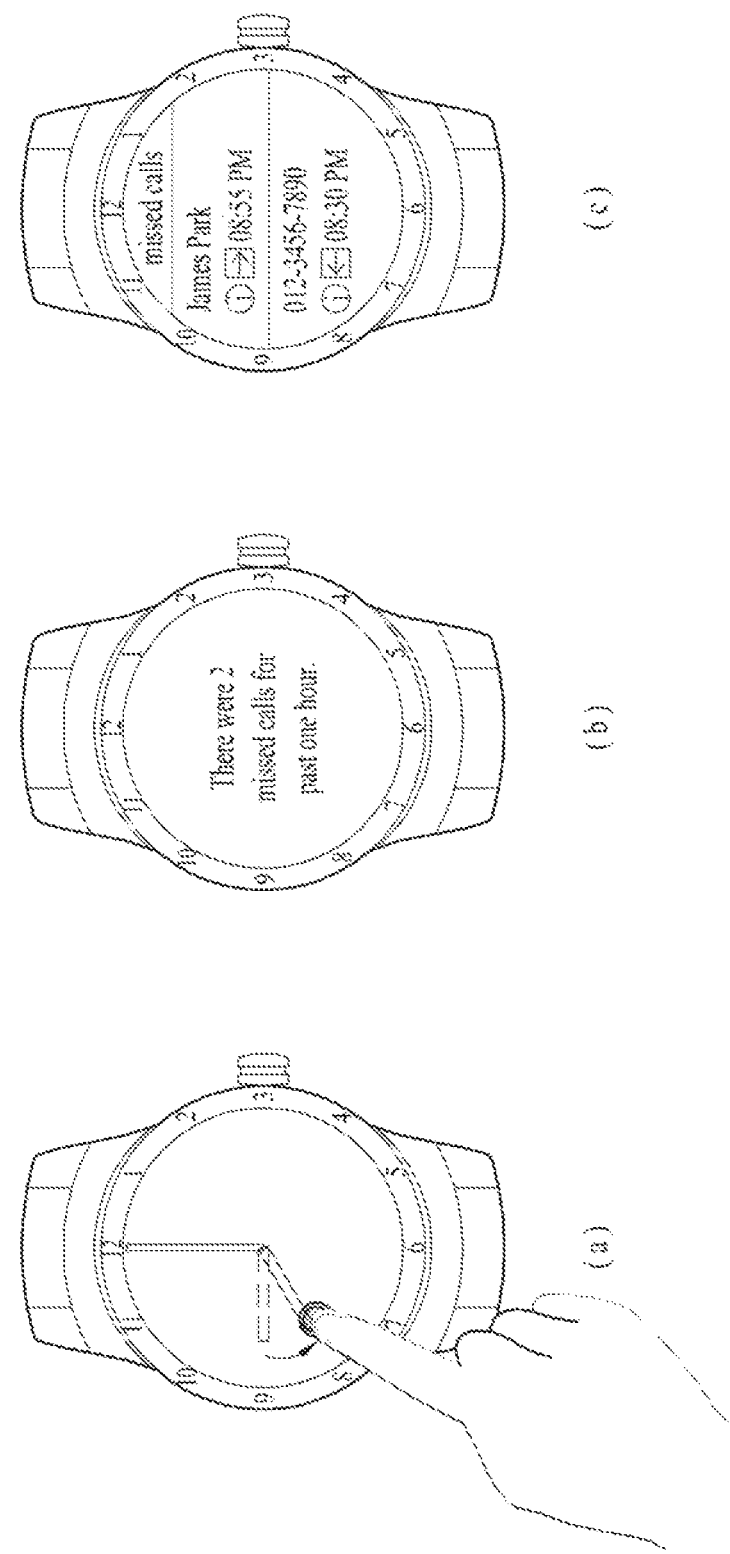
FIG. 10 is a view illustrating an example that a missed call record is output as an hour hand and a minute hand move.

FIG. 10 is a view illustrating an example that a missed call record is output as an hour hand and a minute hand move.

In a state that the hour hand and the minute hand are output, if the touch input of the pointer, which has touched the hour hand, for drag-moving counterclockwise, is received, the controller 180 may output a missed call record from the current time to the past time indicated by movement of the hour hand.

For example, as shown in FIG. 10(a), if a user input for drag-moving a pointer, which has touched the hour hand, counterclockwise, is received, the controller 180 may control the output position of the hour hand along the pointer. For example, in FIG. 10(a), as the pointer which has touched the hour hand indicating 9 o'clock drag-moves to the position indicating 8 o'clock, the hour hand and the minute hand are changed to indicate 8 o'clock.

Then, the controller 180 may output the missed call record between the current time (that is, 9 o'clock) and the past time (that is, 8 o'clock) indicated by the hour hand and the minute hand.

In FIGS. 10(b) and (c), a message indicating the number of missed calls between the current time and the past time is output and then detailed information of the missed calls is output.

Even in the case that the minute hand drag-moves counterclockwise as well as the case that the hour hand moves counterclockwise, a missed call record between a first time indicated by an initial hour hand and an initial minute hand and a second time indicated a changed hour hand and a changed minute hand may be output.

In addition to the missed call record, an outgoing call record, an incoming call record, an outgoing message record (for example, text message, instant message, email, etc.) and an incoming message record between the first time and the second time may be output.

Figure 11:
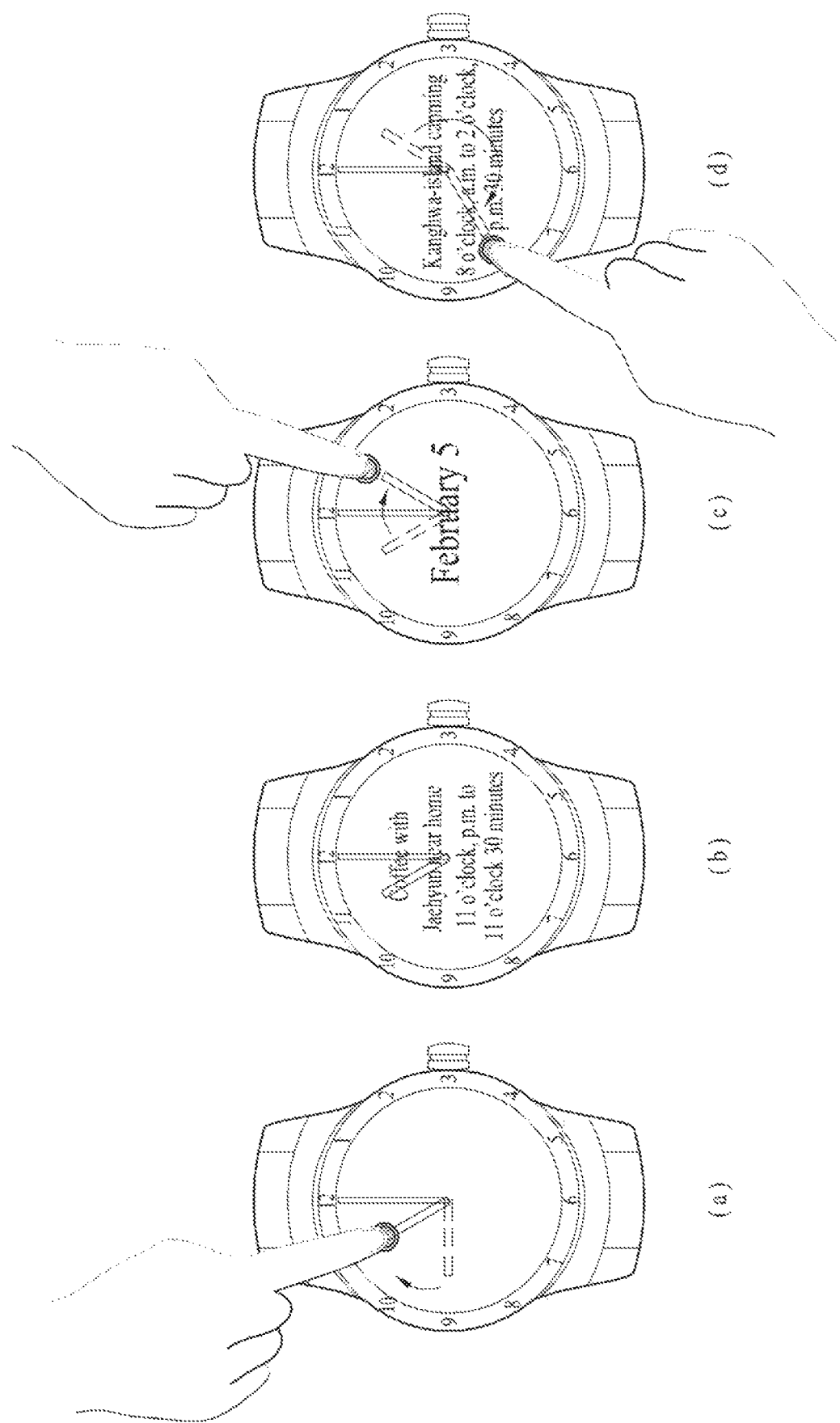
FIG. 11 is a view illustrating an example that schedule information is output as an hour hand and a minute hand move.

FIG. 11 is a view illustrating an example that schedule information is output as an hour hand and a minute hand move.

If the hour hand or the minute hand drag-moves clockwise or counterclockwise, the controller 180 may output schedule information corresponding to the changed time through the display unit 151.

For example, as shown in FIG. 11(a), as the pointer which has touched the hour hand drag-moves clockwise, if the hour hand and the minute hand indicate 11 o'clock, the controller 180 may output schedule information registered in 11 o'clock, p.m. corresponding to a future timing point compared with the time (it is assumed as 9 o'clock, p.m.) indicated by the initial hour hand and the initial minute hand as shown in FIG. 11(b).

As the hour hand or the minute hand drag-moves, if the time indicated by the minute hand and the hour hand passes 12 o'clock, a.m., the controller 180 may output date information indicating that the current date has been changed to new date, through the display unit 151. For example, in the example shown in FIG. 11(b), if the pointer which has touched the hour hand indicating 11 o'clock drag-moves clockwise and passes 12 o'clock, the controller 180 may output date information indicating a timing point that has passed one day from the date indicated by the hour hand and the minute hand, as illustrated in FIG. 11(c). Afterwards, if the hour hand is more rotated clockwise to indicate 8 o'clock, a.m., the controller 180 may output schedule information registered in 8 o'clock, a.m., next day as shown in FIG. 11(d).

Although not shown, if the hour hand is rotated counterclockwise, the controller 180 may output schedule information of the past compared with the current time. Also, even in the case that the minute hand moves clockwise or counterclockwise as well as the case that the hour hand moves, schedule information registered at the time indicated by the hour hand and the minute hand may be output.

Figure 12:
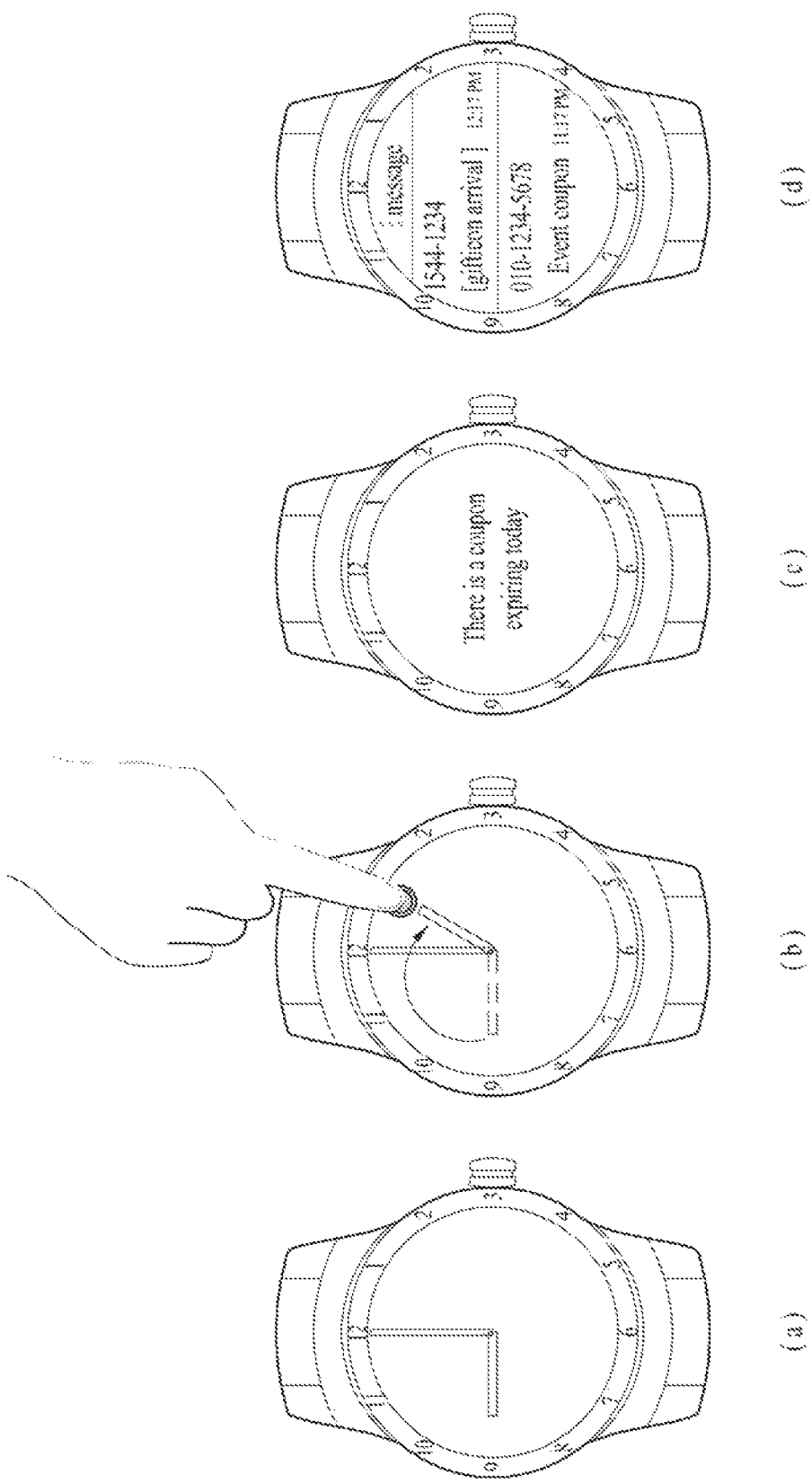
FIG. 12 is a view illustrating an example that available coupon information is output as an hour hand and a minute hand move.

FIG. 12 is a view illustrating an example that available coupon information is output as an hour hand and a minute hand move.

As the hour hand or the minute hand drag-moves clockwise or counterclockwise, if the time indicated by the hour hand and the minute hand before change and the time indicated by the hour hand and the minute hand after change indicate their respective dates different from each other, the controller 180 may output coupon information (or coupon information expiring within a predetermined day) expiring at the date before change.

Referring to FIG. 12, first of all, in the example shown in FIG. 12(a), it is assumed that the hour hand and the minute hand indicate 6 o'clock, p.m. In this state, if the pointer which has touched the hour hand passes 12 o'clock while drag-moving clockwise, the hour hand and the minute hand will indicate the time, a.m., next day.

That is, as illustrated in FIG. 12(b), if the hour hand and the minute hand are changed to indicate the time, a.m., next day, the controller 180 may output coupon information expiring at the date before change, through the display unit 151.

In FIGS. 12(c) and (d), after a message indicating the coupon expiring at the date before change of FIG. 12 is output, a list of coupons scheduled to expire is output.

Unlike the example shown in FIG. 12, the controller 180 may output a list of coupons expiring at the date after change. Also, FIG. 12 illustrates that a list of coupons is list if the time indicated by the hour hand and the minute hand after change indicates a date different from that indicated by the time indicated by the hour hand and the minute hand before change. However, a list of coupons may be output if the time indicated by the hour hand and the minute hand after change is a predetermined time or more from the time indicated by the hour hand and the minute hand before change.

In the aforementioned embodiments, if the position of the hour hand or the minute hand is changed by the touch input, weather information, missed call information, schedule information or coupon information are output.

For another example, if a predetermined touch input is received in an off-state of the display unit 151, the controller 180 may output schedule information, weather information or missed call record corresponding to the time indicated by the hour hand and the minute hand while outputting the hour hand and the minute hand.

Figure 13:
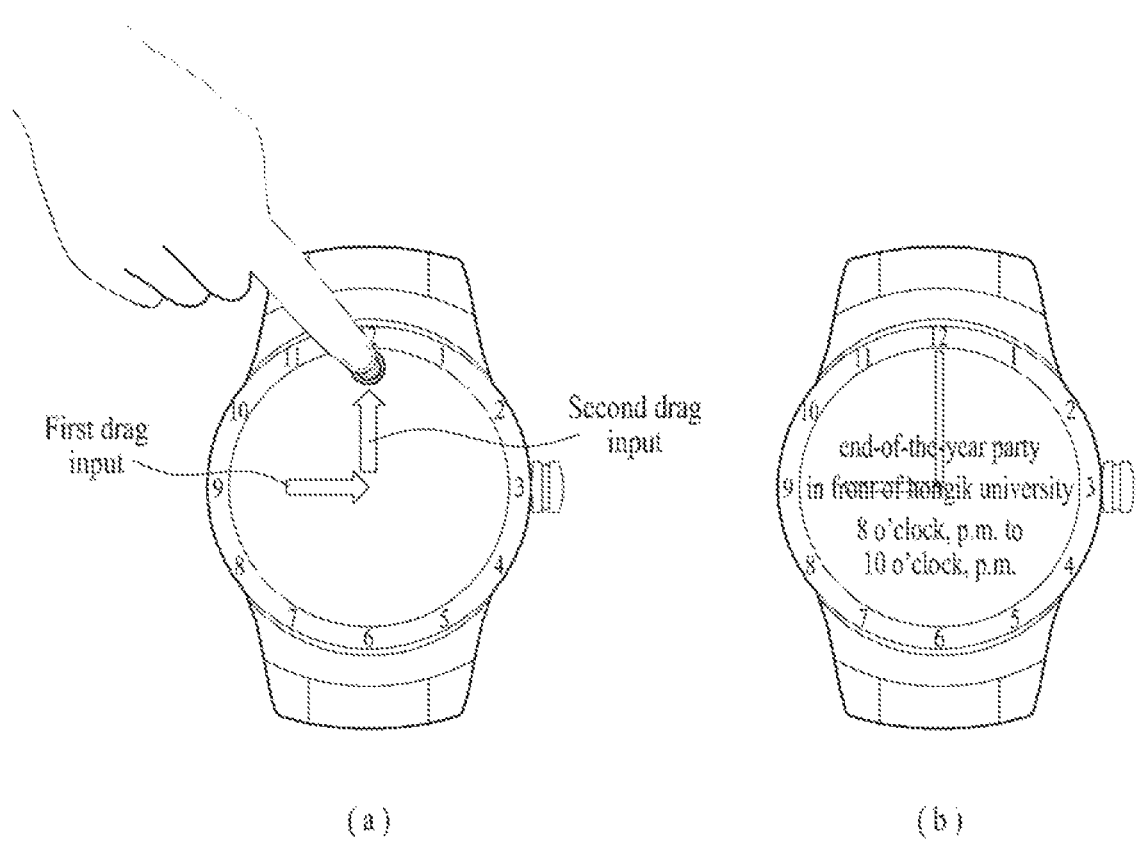
FIG. 13 is a view illustrating another example that schedule information indicated by an hour hand and a minute hand is output.

For example, FIG. 13 is a view illustrating another example that schedule information indicated by an hour hand and a minute hand is output.

If a predetermined touch input for outputting the hour hand and the minute hand is received in an off-state of the display unit 151, the controller 180 may output the hour hand and the minute hand on the basis of the touch input.

For example, as illustrated in FIG. 13(a), if a first drag input from a 9 o'clock direction to the center of the display unit 151 and a second drag input from the center of the display unit 151 to a 12 o'clock direction are received, the controller 180 may output the hour hand headed for 9 o'clock and the minute hand headed for 12 o'clock as illustrated in FIG. 13(b).

Then, as illustrated in FIG. 13(c), the controller 180 may output a schedule registered at 9 o'clock indicated by the hour hand and the minute hand. Considering that the user's preference for a future schedule is generally higher than the past schedule, the controller 180 may output a schedule registered at a future time slot indicated by the hour hand and the minute hand compared with the current time.

At this time, the controller 180 may determine whether the time indicated by the hour hand and the minute hand indicates a.m. or p.m., on the basis of a residual time from the current time. For example, when the current time is 10 o'clock, a.m., if the hour hand and the minute hand, which indicate 3 o'clock, are output, since the residual time to 3 o'clock, p.m. is shorter than 3 o'clock, a.m. corresponding to the future time, the controller 180 may determine that the minute hand and the hour hand indicate 3 o'clock, p.m.

As described with reference to FIG. 11, if a touch input for clockwise or counterclockwise drag-moving the pointer which has touched at least one of the hour hand and the minute hand output based on the touch input of the user is received, schedule information corresponding to the changed hour hand and minute hand may be output.

Although FIG. 13 illustrates that schedule information registered at the time indicated by the hour hand and the minute hand is output, weather information corresponding to the time indicated by the hour hand and the minute hand or missed call record between the current time and the time indicated by the hour hand and the minute hand may be output instead of the schedule information.

When the scheduling information is output, if another schedule starting or expiring within a predetermined time from the schedule information which is currently output exists, the controller 180 may output a search button for searching for a previous or next schedule, through the display unit 151.

Figure 14:
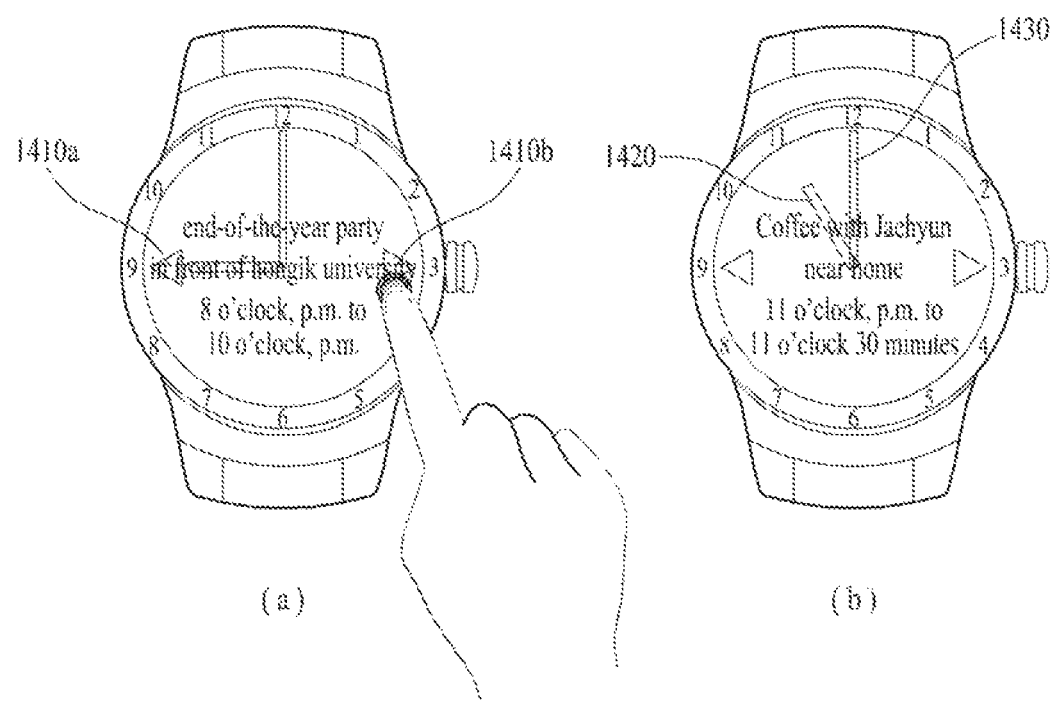
FIG. 14 is a view illustrating an example that a search button is output.

For example, FIG. 14 is a view illustrating an example that a search button is output. In a state that a schedule registered at the time indicated by the hour hand and the minute hand is output, when a previous schedule expiring within a predetermined time from a starting point of the schedule information which is output or a next schedule starting within a predetermined time from an end point of the schedule information which is output exists, the controller 180 may output search buttons 1410a and 1410b for searching for the previous schedule or the next schedule as illustrated in FIG. 14(a). In FIG. 14(a), the button 1410a displayed at a left side of the display unit 151 may be intended to search for the previous schedule compared with the schedule which is currently output, and the button 1410b displayed at a right side of the display unit 151 may be intended to search for the next schedule compared with the schedule which is currently output.

If the previous button is output, the previous schedule compared with the schedule which is currently output may be output, and if the next button is output, the next schedule compared with the schedule which is currently output may be output.

At this time, the controller 180 may automatically change the position of the hour hand and the minute hand to indicate a starting time of the previous schedule or the next schedule, an ending time of the previous schedule or the next schedule, or a random position between a starting time or an ending time of the previous schedule or the next schedule.

For example, if the search button 1410b for searching for the next schedule of the schedule (a schedule starting from 8 o'clock and ending at 10 o'clock is illustrated in FIG. 14(a)) which is currently output is touched, the controller 180 may output next schedule as illustrated in FIG. 14(b). At this time, the controller 180 may control the hour hand and the minute hand to indicate the starting time of the next schedule, the ending time of the next schedule, or a random position between the starting time or the ending time.

For example, in FIG. 14(b), the positions of the hour hand 1420 and the minute hand 1430 are controlled to be matched with a starting time (illustrated at 11 o'clock) of the next schedule.

In a state that schedule information is output, if a predetermined touch input is received, the controller 180 may enter an editing mode for editing the schedule information which is currently output. In a state that the controller 180 enters the editing mode, if the user controls the positions of the hour hand and the minute hand, the controller 180 may change the starting time or the ending time of the schedule to be matched with the positions of the changed hour hand and the changed minute hand.

Figure 15:
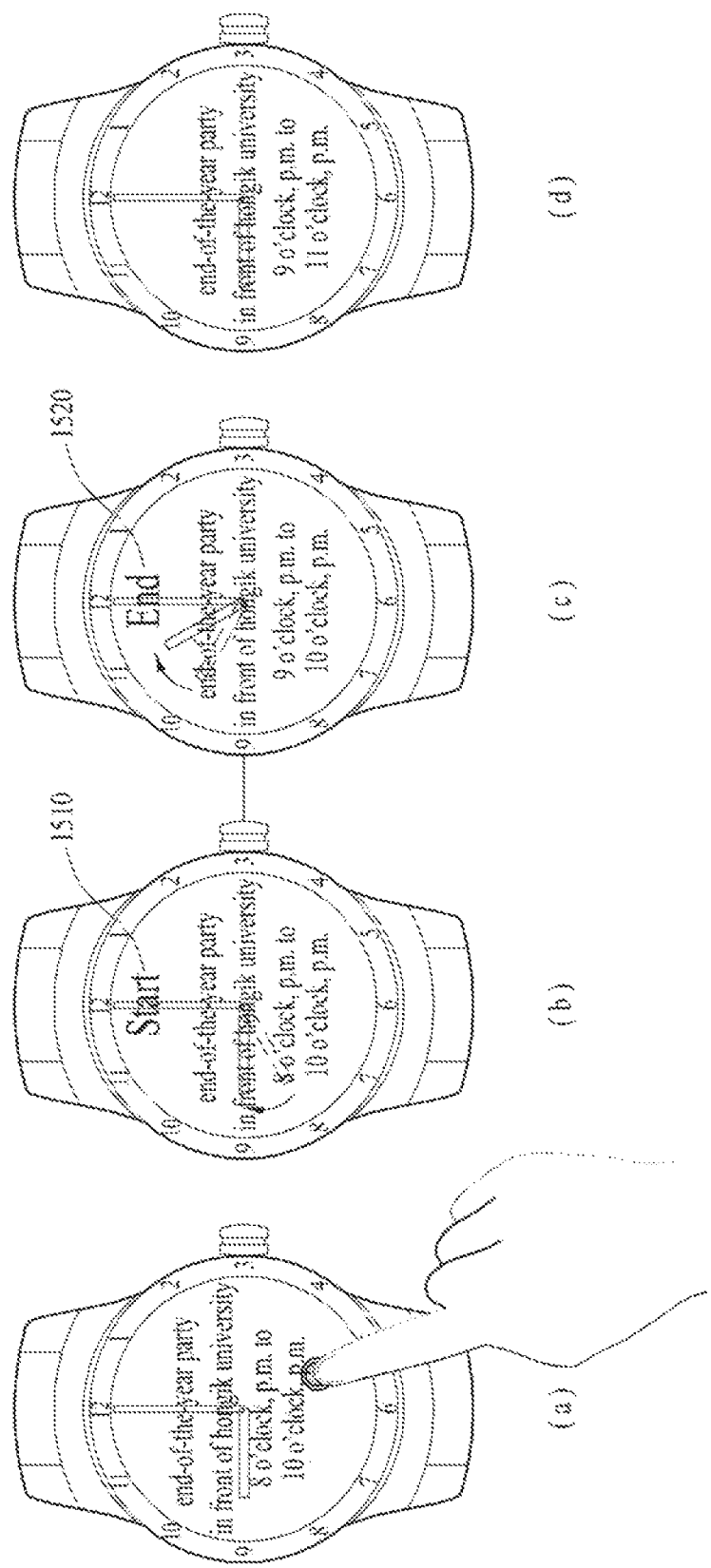
FIG. 15 is a view illustrating an operation of a watch type terminal under an editing mode.

For example, FIG. 15 is a view illustrating an operation of a watch type terminal under an editing mode.

As illustrated in FIG. 15(a), when schedule information is output, if a predetermined touch input (for example, a long touch input for touching an empty space where schedule information is not displayed, for a predetermined time or more) is received, the controller 180 may control the watch type terminal to enter the editing mode.

If the watch type terminal enters the editing mode, the controller 180 may control a starting time of a schedule which is currently output, to be a state that may be changed. If the starting time becomes a state that may be changed, the controller 180 may control the hour hand and the minute hand to indicate the starting time of the schedule. For example, since the starting time of the schedule before change is 8 o'clock, the controller 180 may display the hour hand and the minute hand to be respectively headed for 8 o'clock and 12 o'clock.

In a state that the starting time may be changed, after a position of at least one of the hour hand and the minute hand is changed, if a complete button (for example, starting button 1510 shown in FIG. 15(b)) is touched, the controller 180 may change the starting time of the schedule to the time indicated by the position of the changed hour hand and minute hand. For example, in FIG. 15(b), since the hour hand and the minute hand indicate 9 o'clock, the starting time of the schedule will be changed to 9 o'clock.

If change of the starting time is completed, the controller 180 may control the ending time of the schedule to be a state that may be changed. If the ending time becomes a state that may be changed, the controller 180 may control the hour hand and the minute hand to indicate the ending time of the schedule. For example, since the ending time of the schedule before change is 10 o'clock, the controller 180 may display the hour hand and the minute hand to be respectively headed for 10 o'clock and 12 o'clock.

In a state that the ending time may be changed, after a position of at least one of the hour hand and the minute hand is changed, if a complete button (for example, ending button 1520 shown in FIG. 15(c)) is touched, the controller 180 may change the ending time of the schedule to the time indicated by the position of the changed hour hand and minute hand. For example, in FIG. 15(c), since the hour hand and the minute hand indicate 11 o'clock, the ending time of the schedule will be changed to 11 o'clock.

FIG. 15(d) illustrates that the starting time of the schedule is changed to 9 o'clock and the ending time of the schedule is changed to 11 o'clock as a result of editing the schedule.

If a predetermined touch input is received, the controller 180 may display residual time information remaining from the current time to the time indicated by the hour hand and the minute hand while outputting the hour hand and the minute hand.

Figure 16:
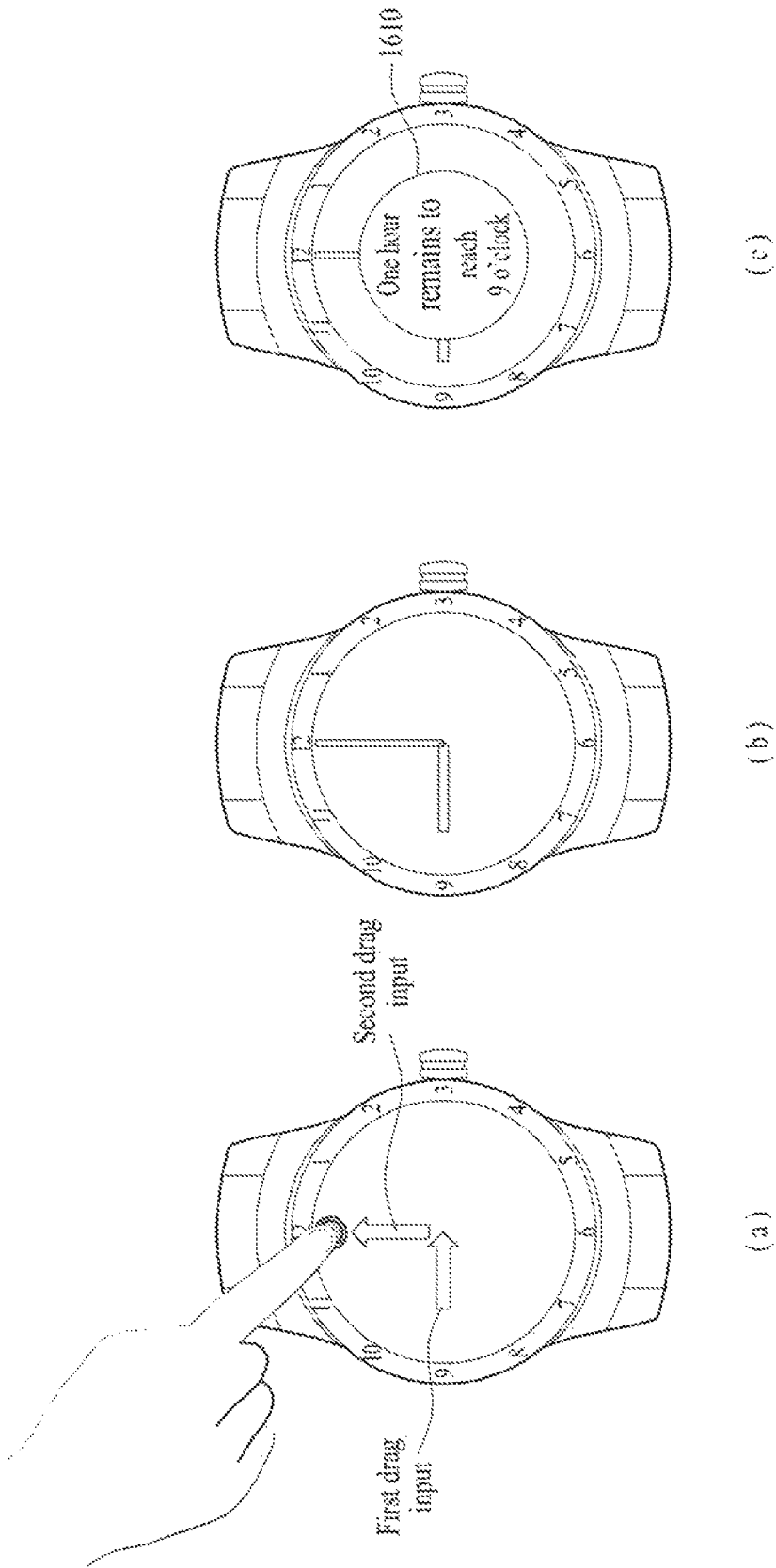
FIG. 16 is a view illustrating an example that residual time information is output.

For example, FIG. 16 is a view illustrating an example that residual time information is output.

In a state that the display unit 151 is turned off, if a predetermined touch input for outputting the hour hand and the minute hand is received, the controller 180 may control the hour hand and the minute hand to be output on the basis of the touch input.

For example, as illustrated in FIG. 16(a), if a first drag input headed from a 9 o'clock direction to the center of the display unit 151 and a second drag input headed from the center of the display unit 151 to a 12 o'clock direction are input, the controller 180 may control the hour hand headed for 9 o'clock and the minute hand headed for 12 o'clock to be output as illustrated in FIG. 16(b).

Then, as illustrated in FIG. 16(c), the controller 180 may control residual time information from the current time to the time indicated by the hour hand and the minute hand to be output. For example, when the current time is 8 o'clock, the controller 180 may control the residual time information 1610, which indicates that one hour remains to reach the time indicated by the hour hand and the minute hand, to be output.

In the same manner as the examples shown in the drawings, time associated information may be output by being overlaid on the hour hand and the minute hand. The controller 180 may control the output of the hour hand and the minute hand to be stopped if a predetermined time passes after the time associated information is output. For another example, the controller 180 may stop the output of the hour hand and the minute hand if a touch input for touching the display unit 151 is received in a state that time associated information is output, and may resume the output of the hour hand and the minute hand if a touch input for retouching the display unit 151 is received in a state that the output of the hour hand and the minute hand is stopped.

<Addition of Setup Related to Time>

If a predetermined touch input is received while an hour hand and a minute hand are being output, the controller 180 may add setup related to the time indicated by the hour hand and the minute hand.

Figure 17:
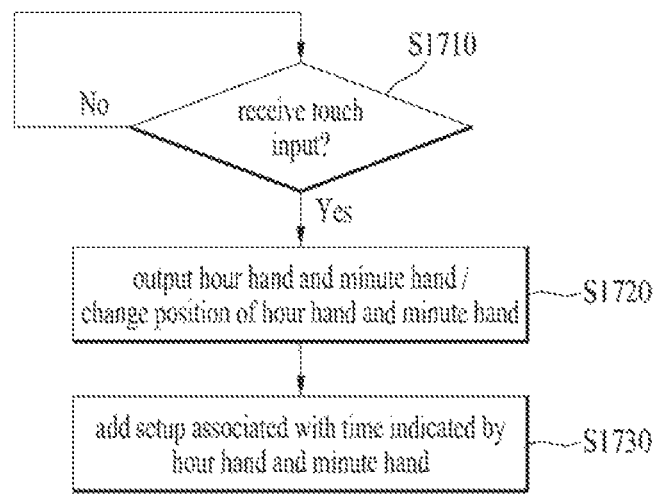
FIG. 17 is a view illustrating an operation flow of a watch type terminal according to the present invention.

For example, FIG. 17 is a view illustrating an operation flow of a watch type terminal according to the present invention.

First of all, if a touch input is received through the display unit 151 (S1710), the controller 180 may output the hour hand or the minute hand through the display unit 151 or change the position of the hour hand or the minute hand, which is being output, in response to the touch input (S1720).

Afterwards, the controller 180 may add setup associated with the time indicated by the hour hand and the minute hand through the display unit 151 (S1730).

In this case, the time associated setup may include a timer, a do-not-disturb mode, an alarm, a schedule or an application ending time. An example that setup associated with the time indicated by the hour hand and the minute hand will be described in detail with reference to the drawings which will be described later.

Figure 18:
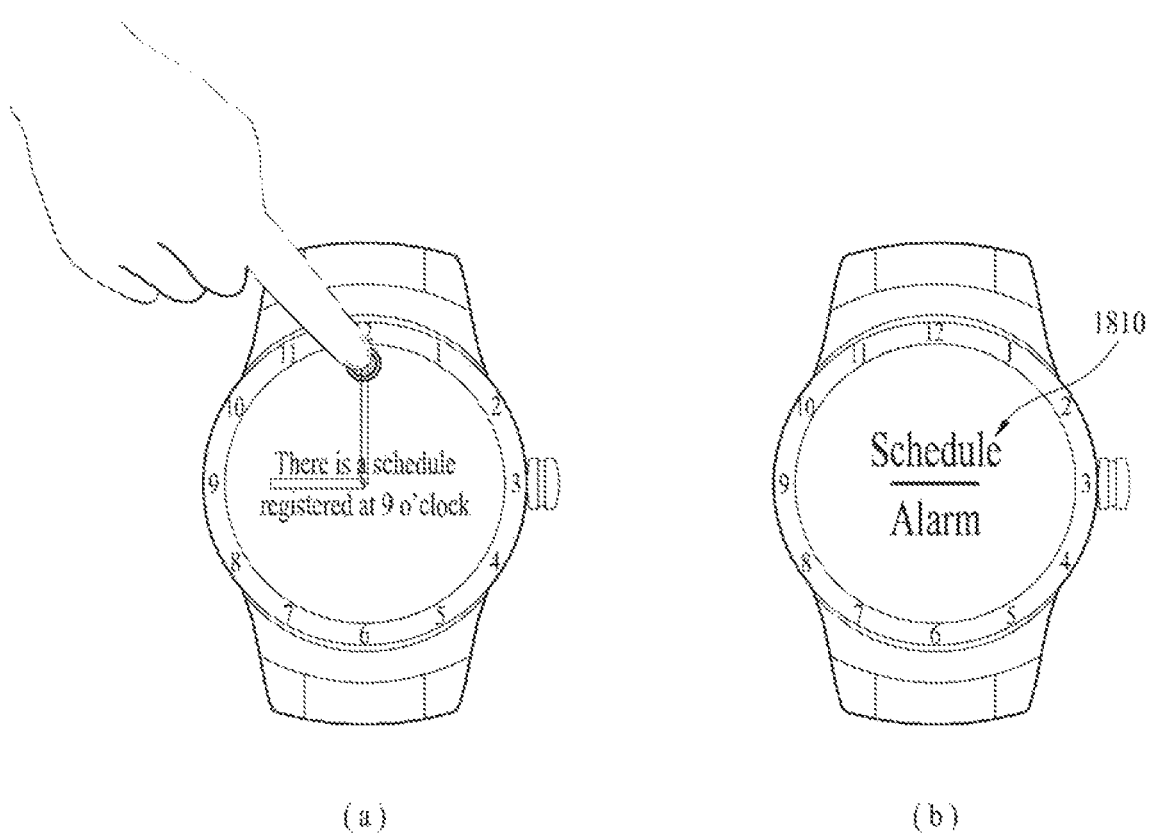
FIG. 18 is a view illustrating an example that a schedule or alarm corresponding to the time indicated by an hour hand and a minute hand is added.

FIG. 18 is a view illustrating an example that a schedule or alarm corresponding to the time indicated by an hour hand and a minute hand is added.

FIGS. 11 and 13 illustrate that schedule information registered at the time indicated by the hour hand and the minute hand is output. If the schedule registered at the time indicated by the hour hand and the minute hand does not exist, no schedule will be output onto the display unit 151.

For example, FIG. 18(a) illustrates that a message indicating there is no schedule registered at the time indicated by the hour hand and the minute hand is output onto the display unit 151. In this state, if a touch input (for example, a long touch input for touching any one of the hour hand and the minute hand for a predetermined time or more) for touching any one of the hour hand and the minute hand is received, the controller 180 may add a new schedule or alarm to the time indicated by the hour hand and the minute hand.

For example, as illustrated in FIG. 18(a), if a touch input for touching the minute hand is received, the controller 180 may output a selection menu 1810 for selecting alarm or schedule to be added as illustrated in FIG. 18(b).

If an alarm item of the selection menu 1810 is touched, the controller 180 may add an alarm at the time indicated by the hour hand and the minute hand.

If a schedule item of the selection menu 1810 is touched, the controller 180 may add a schedule having the time indicated by the hour hand and the minute hand as a starting time.

At this time, the controller 180 may set an ending time of the schedule automatically. For example, the controller 180 may set the time in one hour from the starting time as the ending time of the schedule. For another example, the controller 180 may set an ending time of a schedule to be newly registered by the user while adding the schedule having the time indicated by the hour hand and the minute hand as a starting time. In a state that the ending time may be set, if a complete button is touched after a position of at least one of the hour hand and the minute hand is changed, the controller 180 may set the time indicated by the changed position of the hour hand and the minute hand as the ending time of the schedule.

Figure 19:
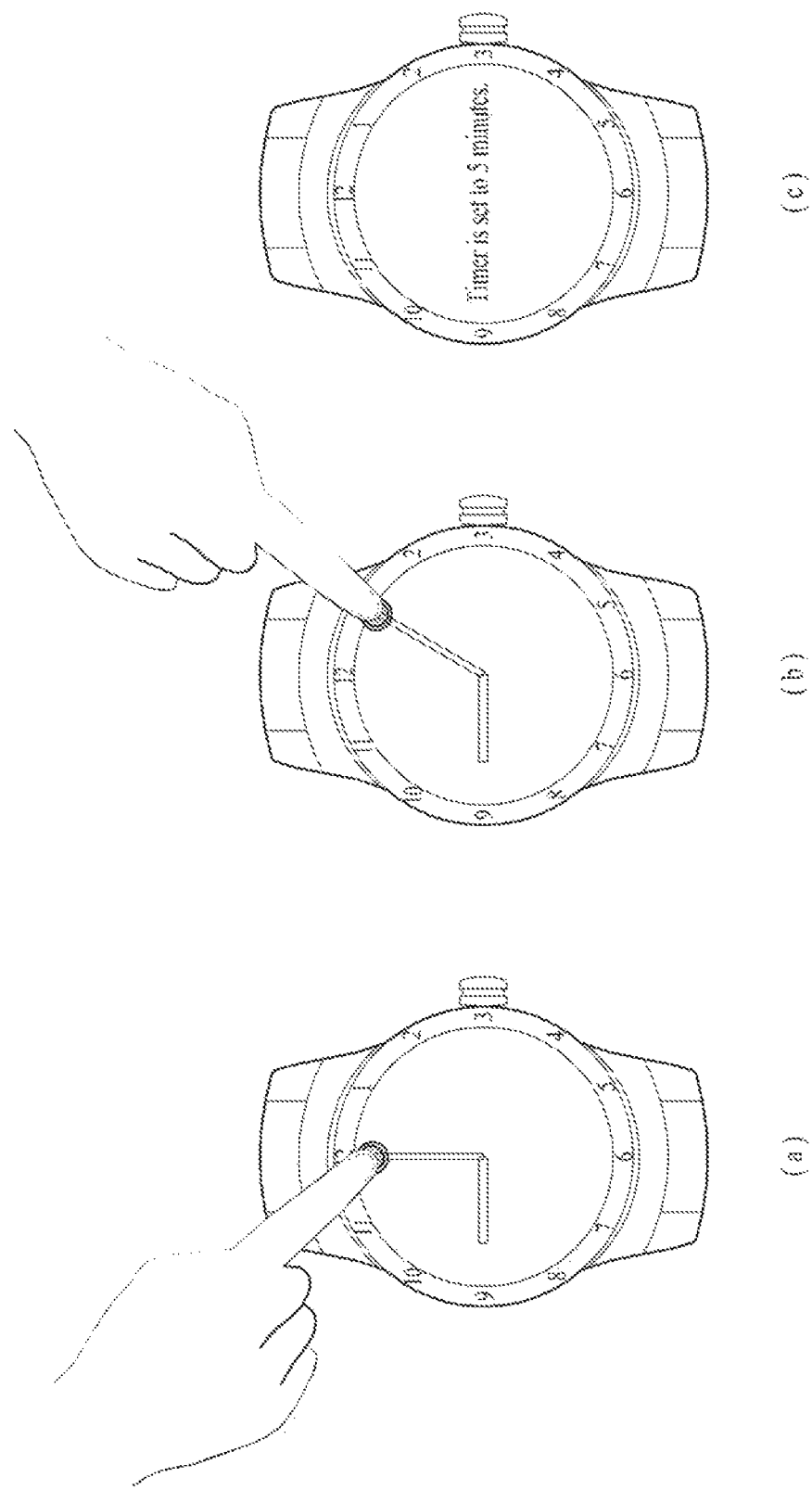
FIG. 19 is a view illustrating an example that a timer which expires at the time indicated by an hour hand and a minute hand starts.

FIG. 19 is a view illustrating an example that a timer which expires at the time indicated by an hour hand and a minute hand starts.

In a state that the hour hand and the minute hand are output, if a touch input of a pointer, which has touched the hour hand or the minute hand, for drag-moving clockwise is received, the controller 180 may change an output position of the hour hand or the minute hand in response to the touch input of the user.

Then, the controller 180 may start a timer starting at the time (or current time) indicated by the hour hand and the minute hand before change and expiring at the time indicated by the hour hand and the minute hand after change.

For example, in FIGS. 19(*a*) to (*c*), a timer expiring after 5 minutes if the minute hand indicating a 12 o'clock direction moves to indicate a 1 o'clock direction is set.

For another example, if a predetermined touch input is received at the off-state of the display unit 151, the controller 180 may display the hour hand and the minute hand at the position indicated by the touch input while turning on the display unit 151. In this case, the controller 180 may start a timer starting at the current time and expiring at the time indicated by the hour hand and the minute hand.

If the timer expires, the controller 180 may output a feedback indicating that the timer has expired. The feedback may be displayed in the form of alarm sound, vibration or message output through the display unit 151.

Figure 20:
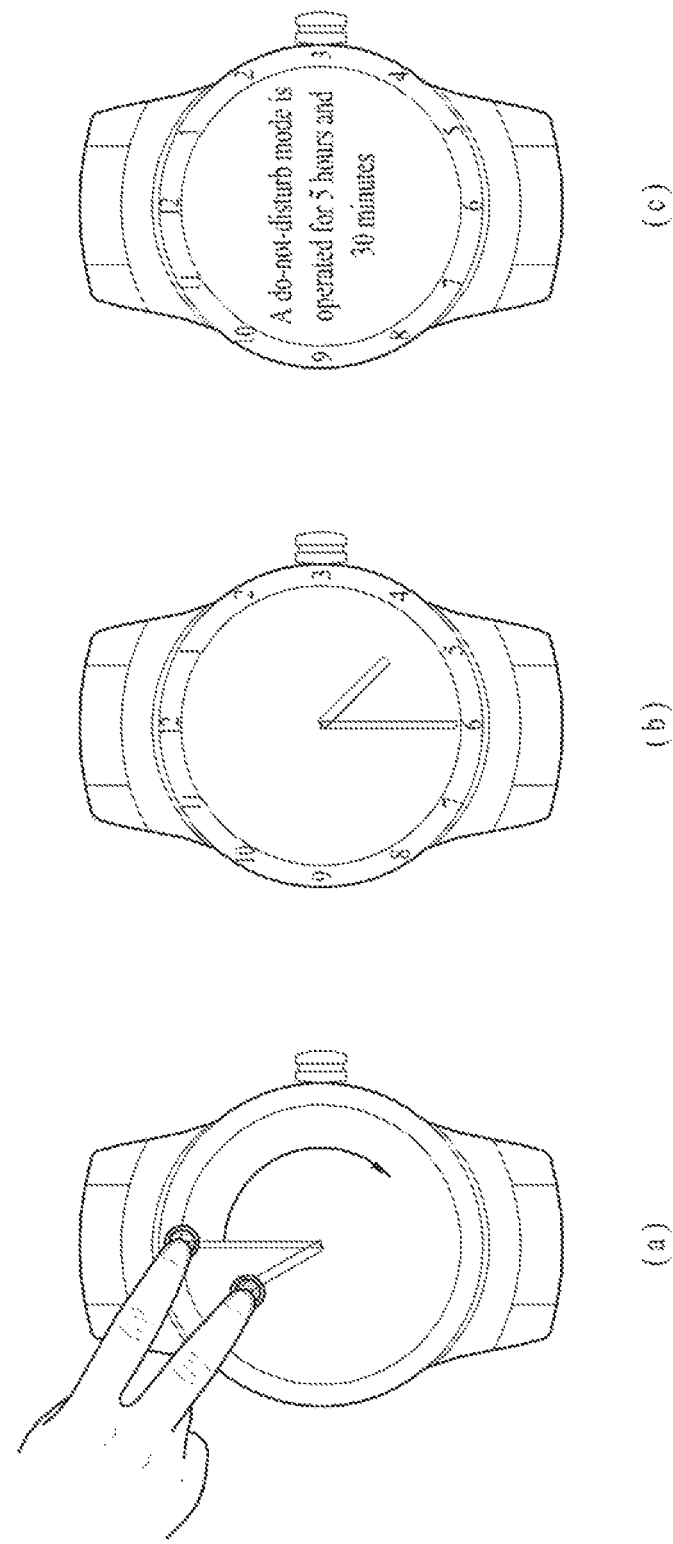
FIG. 20 is a view illustrating an example that a do-not-disturb mode is set until the time indicated by an hour hand and a minute hand.

FIG. 20 is a view illustrating an example that a do-not-disturb mode is set until the time indicated by an hour hand and a minute hand.

If a pointer that has touched at least one of the hour hand and the minute hand drag-moves clockwise, the controller 180 may set a do-not-disturb mode until the time indicated by the hour hand and the minute hand. For example, as illustrated in FIG. 20(*a*), if a drag input of two pointers, which have respectively touched the hour hand and the minute hand, for drag-moving clockwise is received, the controller 180 may control the positions of the hour hand and the minute hand in accordance with movement of the two pointers.

If the positions of the hour hand and the minute hand are changed, the controller 180 may control the mobile terminal to set the do-not-disturb mode until the time indicated by the changed hour hand and minute hand. For example, in FIG. 20(*b*), a message that includes time period information set to the do-not-disturb mode is output.

In this case, the do-not-disturb mode may mean the state that an output for indicating reception such as text message and incoming call is restricted. That is, even though the mobile terminal receives an incoming call, bell sound or vibration may not be output under the do-not-disturb mode.

For another example, if a predetermined touch input is input at the off-state of the display unit 151, the controller 180 may display the hour hand and the minute hand at the position indicated by the touch input while turning on the display unit 151. In this case, the controller 180 may set the mobile terminal to the do-not-disturb mode from the current time to the time indicated by the hour hand and the minute hand.

Afterwards, if the current time exceeds the time indicated by the hour hand and the minute hand, the controller 180 may end the do-not-disturb mode.

In addition to the do-not-disturb mode, the controller 180 may control the mobile terminal to maintain a setup value of the mobile terminal until the time indicated by the hour hand and the minute hand. For example, the controller 180 may set the watch type terminal to a vibration mode or airplane mode from the current time to the time indicated by the hour hand and the minute hand, or may control a communication module such as Wi-Fi, Bluetooth or GPS to maintain an on-state (or off-state) from the current time to the time indicated by the hour hand and the minute hand.

Afterwards, if the current time exceeds the time indicated by the hour hand and the minute hand, the controller 180 may end the vibration mode or airplane mode or control the communication module such as Wi-Fi, Bluetooth or GPS to be switched to an off-state (or on-state).

<Application Control>

If a predetermined touch input is received while an hour hand and a minute hand are being output, the controller 180 may execute a control command for controlling an application which is being executed in a watch type terminal or other terminal interworking with the water type terminal.

Figure 21:
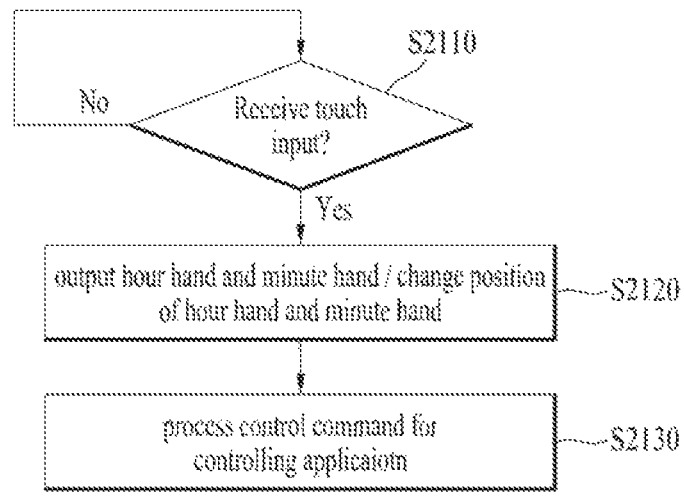
FIG. 21 is a view illustrating an operation flow of a watch type terminal according to the present invention.

For example, FIG. 21 is a view illustrating an operation flow of a watch type terminal according to the present invention.

First of all, it is assumed that a predetermined application is being executed through the watch type terminal or other terminal interworking with the watch type terminal.

If a touch input is received through the display unit 151 (S2110), the controller 180 may output the hour hand or the minute hand through the display unit 151 or change the position of the hour hand or the minute hand, which is being output, in response to the touch input (S2120).

Afterwards, the controller 180 may process a control command for an application, which is being executed through the watch type terminal, on the basis of the touch input for the hour hand or the minute hand, or may transmit a control command for remotely an application, which is being executed through other terminal, to the other terminal (S2130).

Figure 22:
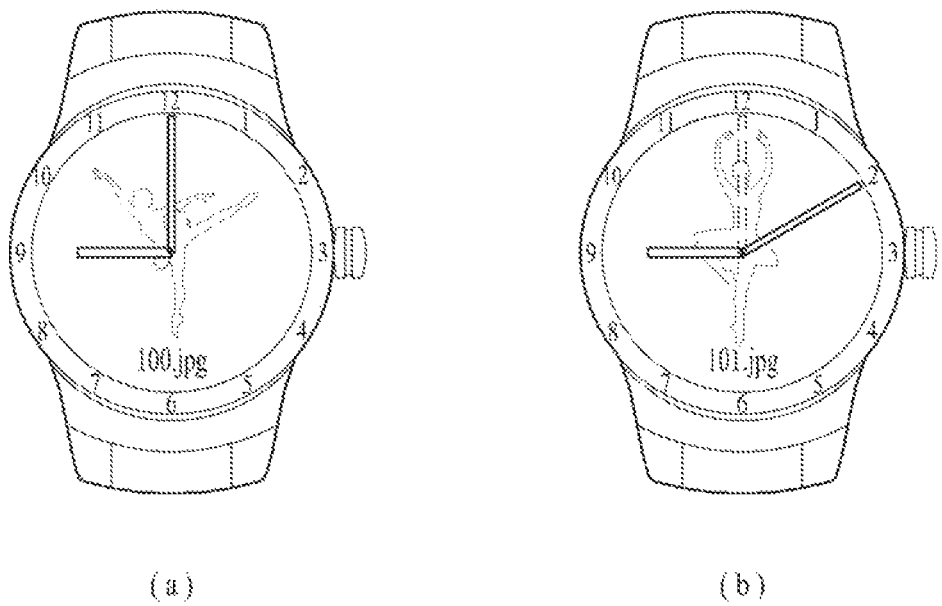
FIG. 22 is a view illustrating an example that a content output by movement of an hour hand or a minute hand is changed.

For example, FIG. 22 is a view illustrating an example that a content output by movement of an hour hand or a minute hand is changed.

If an application is being executed through a watch type terminal or other terminal associated with the watch type terminal, an execution screen of the application may be output through the display unit 151. At this time, the hour hand and the minute hand may be output by being overlaid on the execution screen of the application.

For example, in FIG. 22(*a*), an hour hand 2210 and a minute hand 2220 on a photo are output by being overlaid through a gallery application for photo checking.

In a state that a specific content is output, if the hour hand or the minute hand moves clockwise or counterclockwise by means of a touch input, the controller 180 may output next content or previous content based on a specific content.

For example, as shown in FIG. 22(*b*), if a touch input for drag-moving the minute hour clockwise, the controller 180 may output next photo (or previous photo) based on a photo which is currently output, in response to the touch input.

Although not shown, if a touch input for drag-moving the minute hand counterclockwise is received, the controller 180 may output a previous photo (or next photo) of a photo which is currently output, in response to the touch input.

Although FIG. 22 illustrates that next content or previous content of the content which is currently output may be output in response to the touch input for moving the minute hand, next content or previous content of the content which is currently output may be output in response to the touch input for moving the hour hand.

For another example, the controller 180 may change a storage folder of contents in response to a touch input for rotating any one of the hour hand and the minute hand and change a content in the current folder in response to a touch input for rotating the other one of the hour hand and the minute hand.

For example, if a first folder, a second folder and a third folder, which store photos, exist on a device, the controller may output a content in the second folder or the third folder while outputting a content in the first folder in response to the touch input for rotating the hour hand, and may output next or previous content of the content in the first folder, which is currently output, in response to the touch input for rotating the minute hand.

In this case, the previous content or next content may be determined based on the order when the contents are aligned based on occurrence time, correction time or name.

Although the contents have been described based on the photo content in the example shown in FIG. 22, the present invention may be applied to change of contents such as music, video and text.

The controller 180 may change a background screen in response to the touch input for rotating any one of the hour hand and the minute hand.

Figure 23:
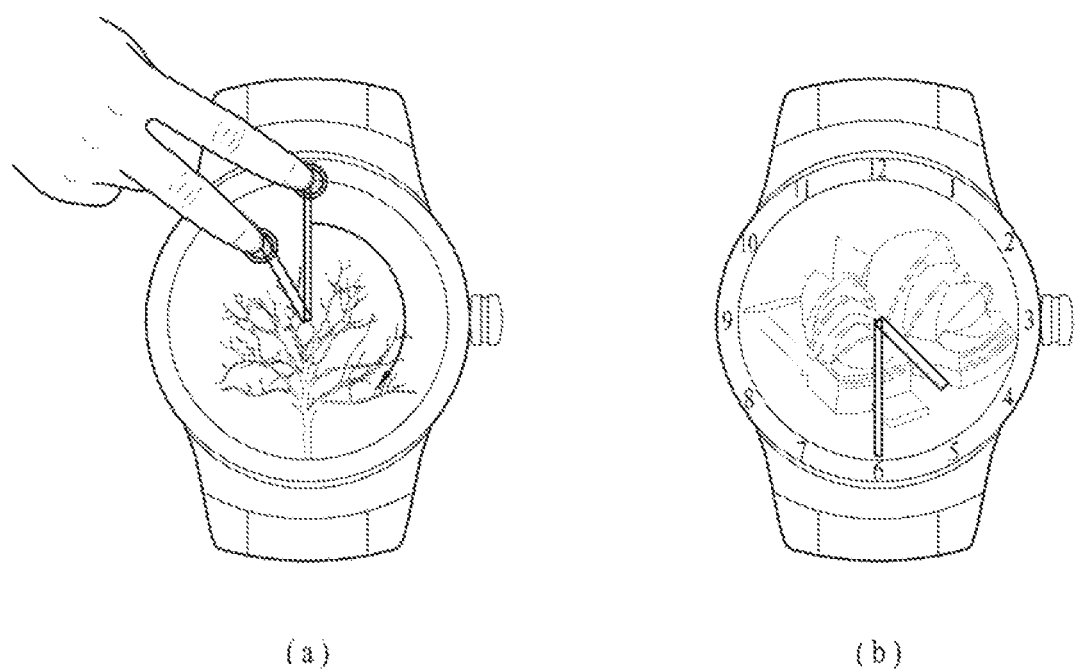
FIG. 23 is a view illustrating an example that a background screen of a watch type terminal is changed.

For example, FIG. 23 is a view illustrating an example that a background screen of a watch type terminal is changed.

As illustrated in FIG. 23(*a*), if a touch input of two pointers, which have respectively touched the hour hand and the minute hand, for drag-moving clockwise or counterclockwise is received, the controller 180 may control the background screen of the display unit 151 to be changed as illustrated in FIG. 23(*b*).

The controller 180 may change a content, which may be played, such as music or video in response to the touch input for rotating any one of the hour hand and the minute hand, and may change a play time of the content, which may be played, in response to a touch input for rotating the other one of the hour hand and the minute hand.

For example, the controller 180 may output a previous or next content of the content which is currently output, in response to a touch input for rotating the hour hand if the touch input is received, whereas the controller 180 may execute fast winding or rewinding of the content which is currently played if a touch input for rotating the minute hand.

In executing fast winding or rewinding, the controller 180 may change the play time of the content as much as the time changed by the hour hand and the minute hand.

Figure 24:
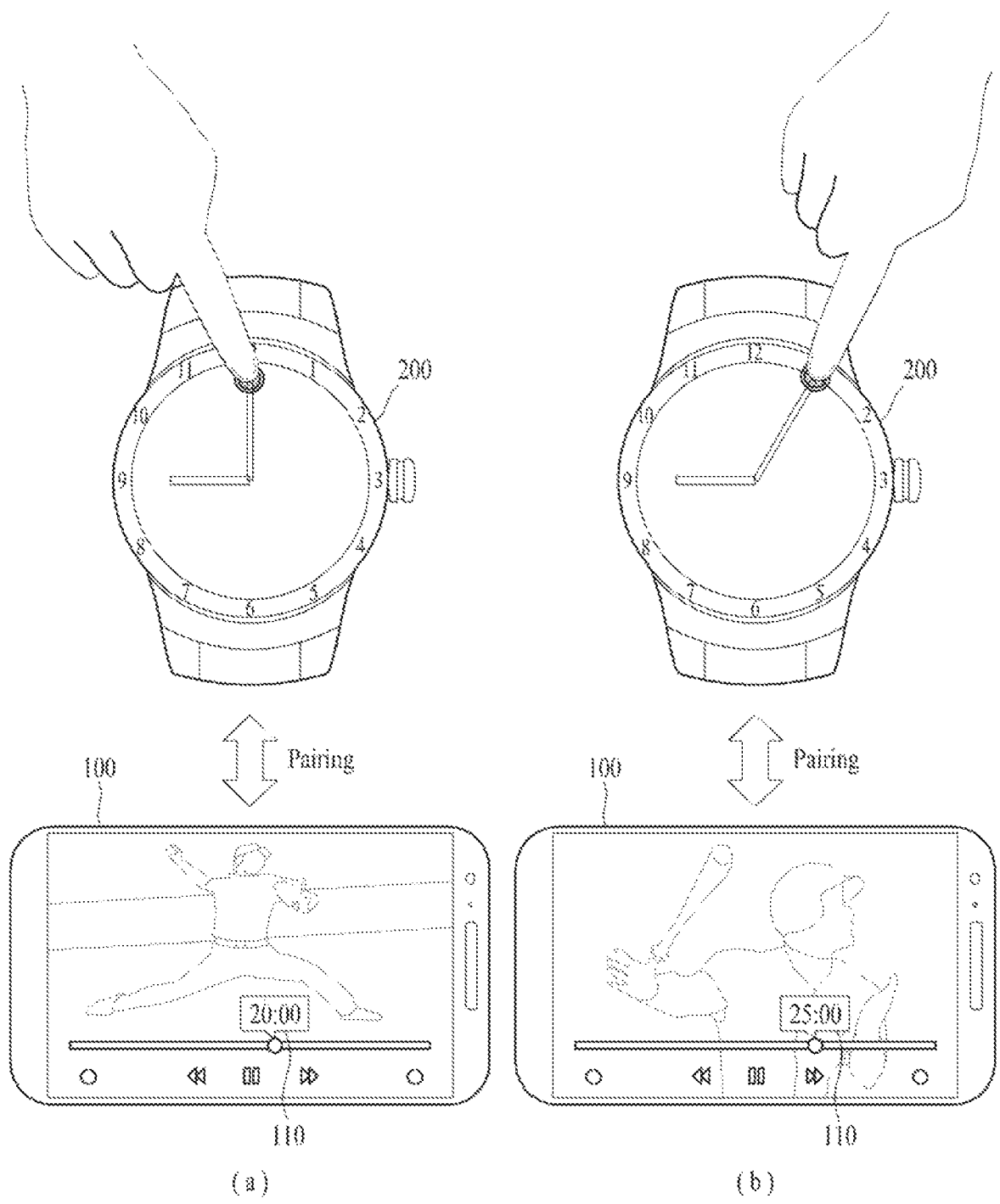
FIG. 24 is a view illustrating an example that a play time of a content that may be played is changed.

For example, FIG. 24 is a view illustrating an example that a play time of a content that may be played is changed.

If a touch input for rotating the minute hand clockwise or counterclockwise is received while the content is being played, the controller 180 may change the play time of the content in response to the touch input. For example, if a touch input for rotating the minute hand clockwise is received, the controller 180 may perform fast winding in response to the touch input, and if a touch input for rotating the minute hand counterclockwise, the controller 180 may perform rewinding in response to the touch input.

At this time, the controller 180 may control the play time to move as much as the time changed by movement of the minute hand.

For example, if the minute hand is rotated clockwise as much as the time corresponding to 5 minutes, the controller 180 may control the play time to move to the time after 5 minutes. In FIGS. 24(*a*) and (*b*), as the minute hand of the watch type terminal 200 is rotated clockwise as much as 5 minutes, a play time 110 of a video which is being played in the bar type terminal 100 is changed to the time after 5 minutes.

In a state that an application is executed through the watch type terminal or other terminal interworking with the watch type terminal, if a touch input for displaying the hour hand and the minute hand is received, the controller 180 may set an ending time such that the application which is being executed ends at the time indicated by the hour hand and the minute hand.

Figure 25:
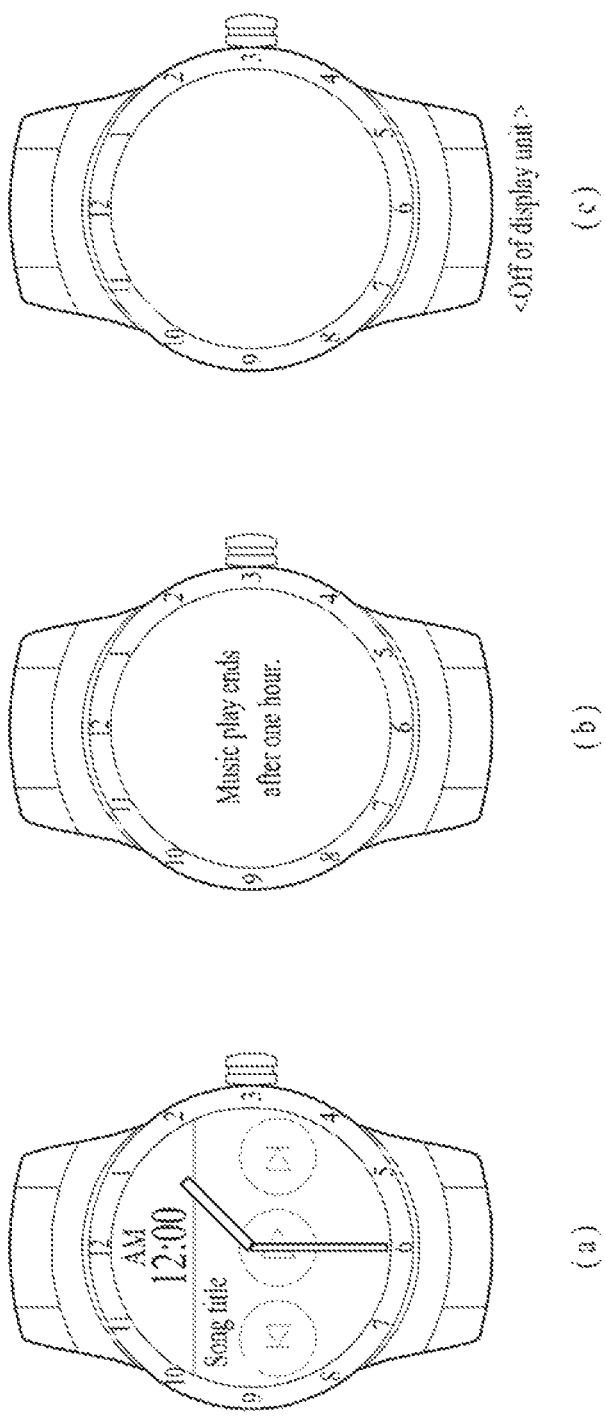
FIG. 25 is a view illustrating an example that an end of an application is reserved at the time indicated by an hour hand and a minute hand.

For example, FIG. 25 is a view illustrating an example that an end of an application is reserved at the time indicated by an hour hand and a minute hand.

In a state that an application is executed through the watch type terminal or other terminal interworking with the watch type terminal, if a touch input for outputting the hour hand and the minute hand is received, the controller 180 may output the hour hand and the minute hand on the execution screen by being overlaid as illustrated in FIG. 25(*a*). For example, as illustrated in FIG. 4, if a first drag input and a second drag input are received, the controller 180 may output the hour hand by means of the first drag input and output the minute hand by means of the second drag input.

If the execution screen of the application is output through the display unit 151, the controller 180 may output the hour hand and the minute hand on the execution screen by being overlaid as illustrated in FIG. 25(*a*).

The controller 180 may set the application to end at the time indicated by the hour hand and the minute hand. For example, since the hour hand and the minute hand indicate 2 o'clock 30 minutes in FIG. 25(*a*), the controller 180 may set the application, which is currently executed, to end at 2 o'clock and 30 minutes.

Also, the controller 180 may output residual time information from the current time to the ending time as illustrated in FIG. 25(*b*). In FIG. 25(*b*), a message for guiding that the application will end after one hour and 30 minutes is output.

Afterwards, if the current time approaches the ending time which is set, the controller 180 may control the application to end. Also, the controller 180 may control the mobile terminal to enter a saving mode while ending the application. If the mobile terminal enters the saving mode, the display unit 151 may be set to an off-state as illustrated in FIG. 25(*c*).

<Remote Control of Application>

Figure 26:
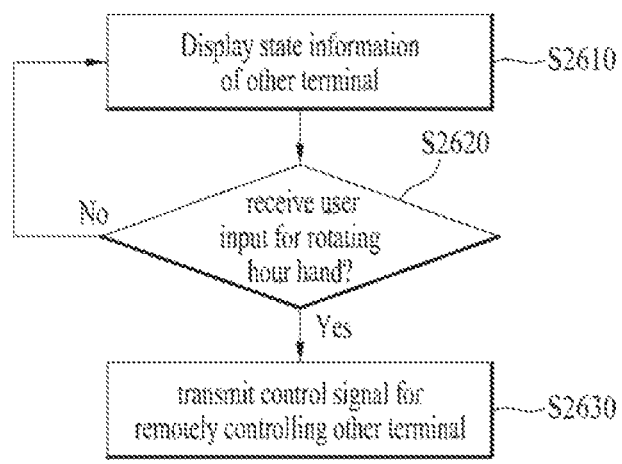
FIG. 26 is a view illustrating an operation flow of a watch type terminal according to the present invention.

FIG. 26 is a view illustrating an operation flow of a watch type terminal according to the present invention. First of all, it is assumed that the watch type terminal is connected with the terminal through communication technology such as Bluetooth, Wi-Fi direct, Zigbee, and WLAN.

The controller 180 may receive state information from the other terminal and display the received state information on the display unit 151 (S2610). In this case, the state information of the other terminal may include at least one of identification information of the other terminal, type information of the other terminal and application information which is being executed in the other terminal.

In a state that the state information of the other terminal is output, if a user input for rotating any one of an hour hand, a minute hand and a second hand clockwise or counterclockwise is received (S2620), the controller 180 may transmit a control signal for remotely controlling the other terminal to the other terminal in response to the user input.

An example that the watch type terminal remotely controls the other terminal will be described with reference to the following drawings. Also, it is assumed that the other terminal interworking with the watch type terminal is a device such as a smart phone, a tablet, notebook, or desktop, of which function may be enlarged through application.

Figure 27:
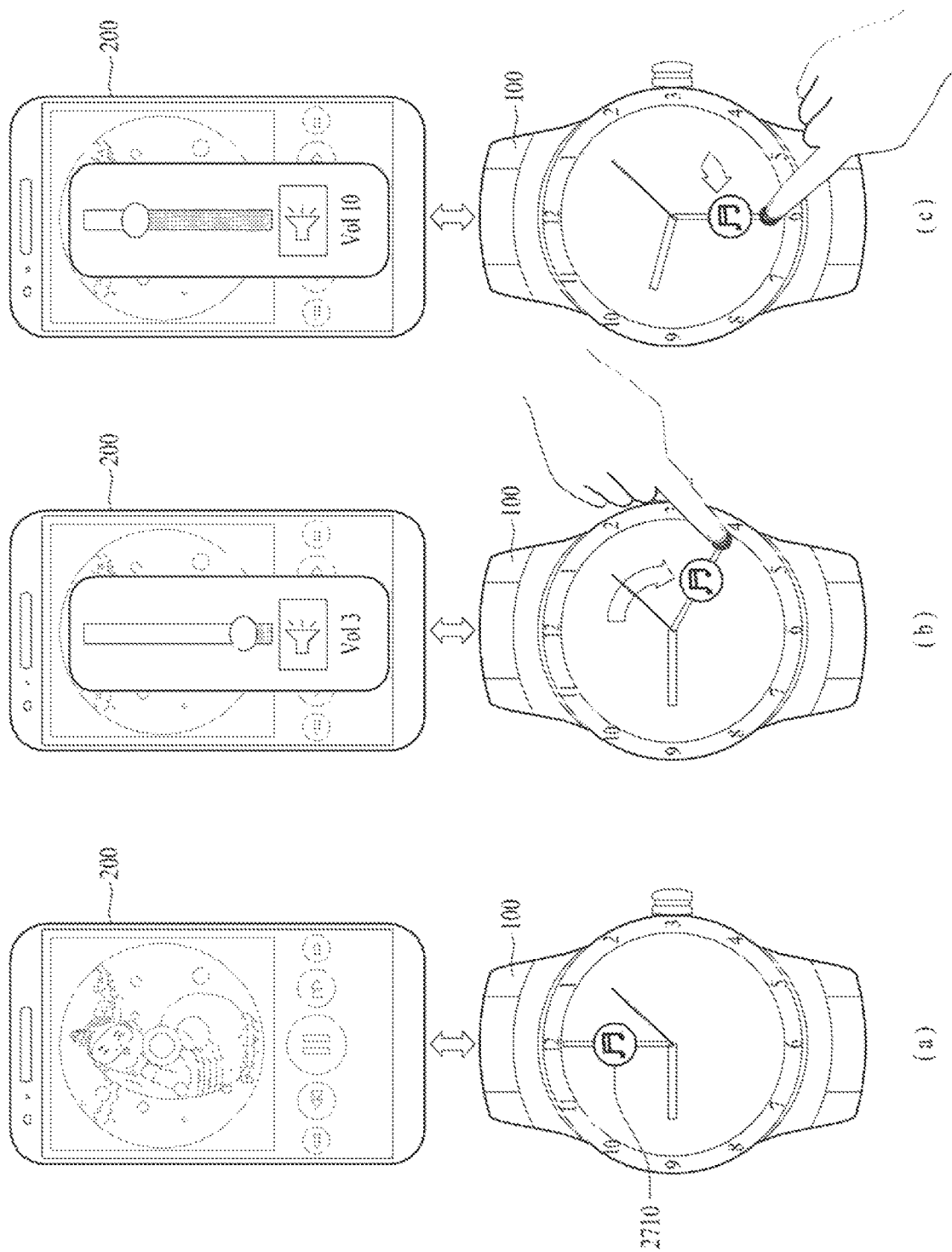
FIG. 27 is a view illustrating an example that a music application executed by other terminal is remotely controlled by a watch type terminal.

FIG. 27 is a view illustrating an example that a music application executed by other terminal is remotely controlled by a watch type terminal.

If a music application is being executed in a terminal such as a smart phone, which may drive various applications, the controller 180 may output an icon representative of a music application on the display unit 151 after receiving application information, which is being executed in other terminal, from the other terminal.

At this time, the controller 180 may output the icon to the center of a clock face output through the display unit 151 and output the icon on at least one of the hour hand, the minute hand and the second hand.

For example, FIG. 27(*a*) illustrates that an icon 2710 of a music application is output to the minute hand.

In a state that the icon 2710 of the music application is output, if a user input for rotating any one of the hour hand, the minute hand and the second hand clockwise or counterclockwise is received, the controller 180 may transmit a control signal for remotely controlling the music application, which is being executed in the other terminal, to the other terminal.

An operation to be remotely controlled may be controlled depending on which one of the hour hand, the minute hand and the second hand has been selected.

For example, if the user input for rotating the hour hand is received, the controller 180 may play next music file or previous music file of the music file which is currently executed. Clockwise rotation of the hour hand may be intended to play the next music file of the music file which is currently played, and counterclockwise rotation of the hour hand may be intended to play the previous music file of the music file which is currently played.

If the user input for rotating the minute hand is received, the controller 180 may change the current play time of the music file. For example, clockwise rotation of the minute hand may be intended to increase volume, and counterclockwise rotation of the hour hand may be intended to reduce volume.

If the user input for rotating the second hand is received, the controller 180 may change the current play time of the music file. For example, clockwise rotation of the second hand may be intended to forward the play time of the music file, and counterclockwise rotation of the second hand may be intended to backward the play time of the music file. At this time, as the second hand is rotated, the controller 180 may change the play time of the music file as much as the changed time. For example, if the second hand is rotated clockwise as much as 180 degrees, the controller 180 may forward the play time of the music file as much as 30 seconds.

FIGS. 27(*b*) and (*c*) illustrate that volume of the other terminal is increased as the minute hand is rotated clockwise.

The embodiment described with reference to FIG. 27 may be applied to an application for processing a content, such as video, which may be played, as well the music application.

Figure 28:
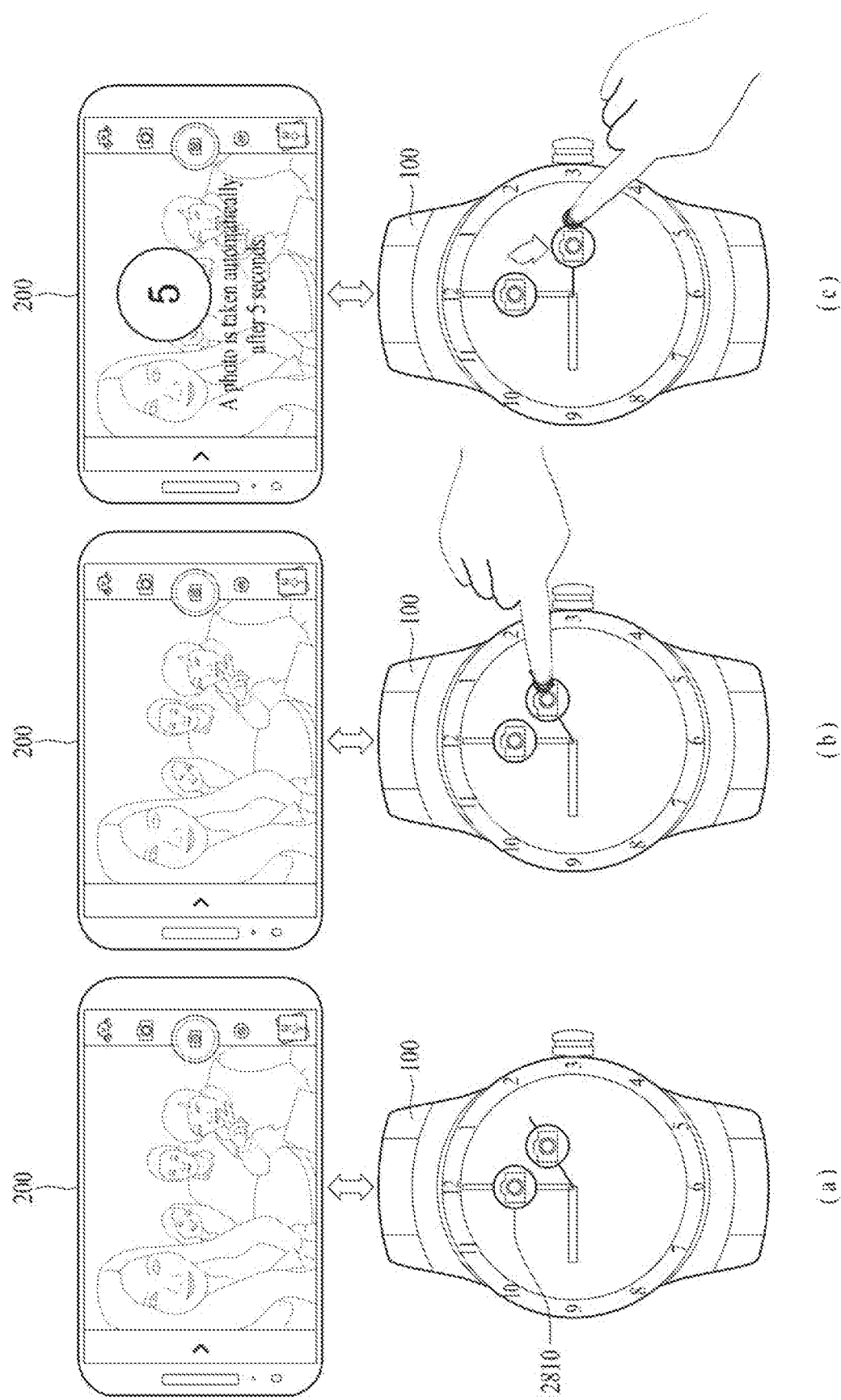
FIG. 28 is a view illustrating an example that a camera application executed by other terminal is remotely controlled by a watch type terminal.

FIG. 28 is a view illustrating an example that a camera application executed by other terminal is remotely controlled by a watch type terminal.

If a camera application is being executed in a terminal such as a smart phone, which may drive various applications, the controller 180 may output an icon 2810 representative of a camera application on the display unit 151 after receiving application information, which is being executed in other terminal, from the other terminal.

For example, FIG. 28(*a*) illustrates that the icon 2810 of the camera application is output to the minute hand and the second hand.

In a state that the icon 2810 of the camera application is output, if a user input for rotating any one of the hour hand, the minute hand and the second hand clockwise or counterclockwise is received, the controller 180 may transmit a control signal for remotely controlling the camera application, which is being executed in the other terminal, to the other terminal.

For example, if the user input for rotating the hour hand is received, the controller 180 may control an exposed value of a camera. Clockwise rotation of the hour hand may be intended to increase the exposed value, and counterclockwise rotation of the hour hand may be intended to reduce the exposed value.

If the user input for rotating the minute hand is received, the controller 180 may control white balance setup values. The controller 180 may control the white balance setup values in due order in accordance with a user input for rotating the minute hand clockwise or counterclockwise.

If the user input for rotating the second hand is received, the controller 180 may set a photographing standby time. For example, if the second hand is rotated clockwise or counterclockwise, the controller 180 may set the photographing standby time, whereby the other terminal may take a photo after the photographing standby time passes. At this time, the controller 180 may set the photographing standby time as much as the time changed as the second hand is rotated. For example, if the second hand is rotated as much as 5 seconds, the controller 180 may set the photographing standby time of 5 seconds.

In the examples shown in FIGS. 28(*b*) and (*c*), a photographing standby time of 5 seconds is set in the other terminal as the second hand is rotated as much as 5 seconds. The other terminal may take a photo automatically if 5 seconds pass.

Figure 29:
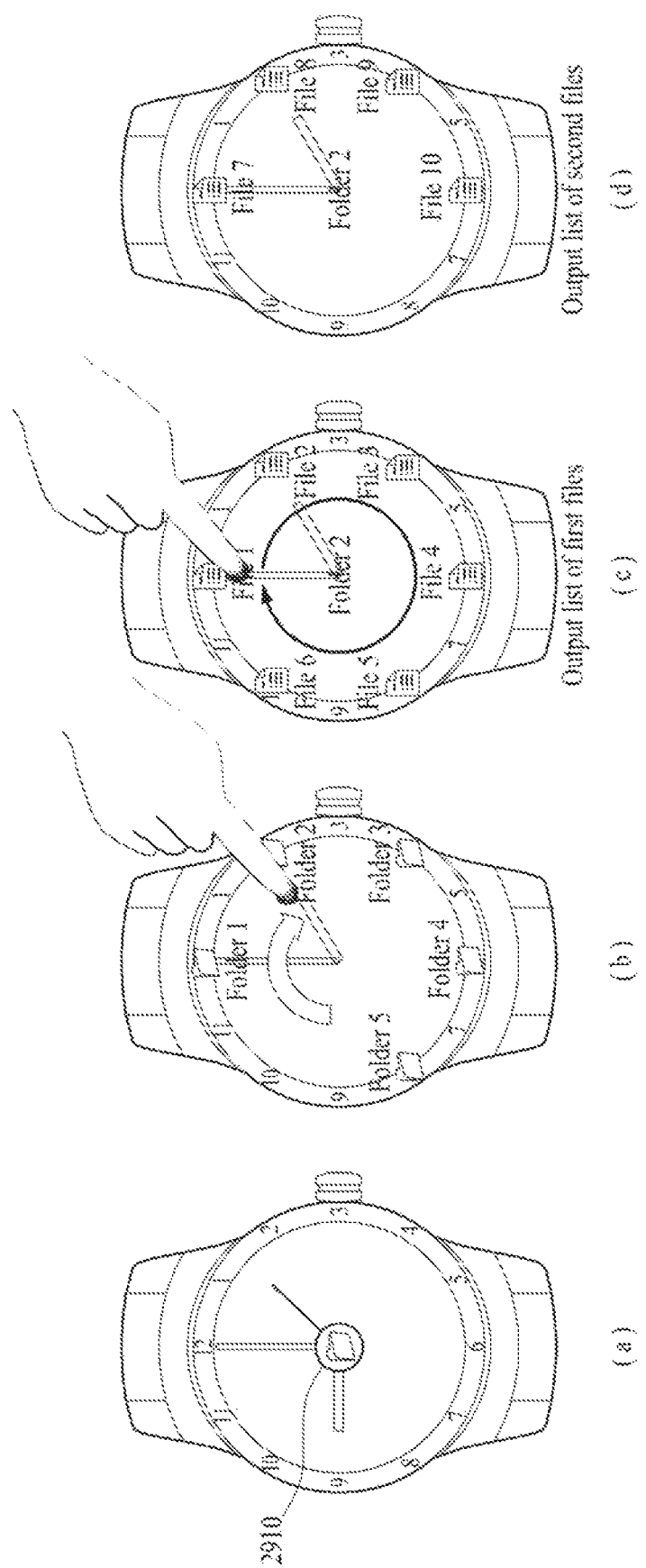
FIG. 29 is a view illustrating an example that a file search application executed by other terminal is remotely controlled by a watch type terminal.

FIG. 29 is a view illustrating an example that a file search application executed by other terminal is remotely controlled by a watch type terminal.

If a file search application is being executed in a terminal such as a smart phone, which may drive various applications, the controller 180 may output an icon 2910 representative of a camera application on the display unit 151 after receiving application information, which is being executed in other terminal, from the other terminal.

For example, FIG. 29(*a*) illustrates that the icon 2910 of the file search application is output to the center of the clock face.

In a state that the icon 2910 of the file search application is output, if a user input for rotating any one of the hour hand, the minute hand and the second hand clockwise or counterclockwise is received, the controller 180 may transmit a control signal for remotely controlling the file search application, which is being executed in the other terminal, to the other terminal.

For example, if the user input for touching the hour hand is received, the controller 180 may output a folder list. In FIG. 29(*b*), the folder list includes a plurality of icons 2910 arranged at the edge of the display unit 151.

The user may select a desired folder by rotating the hour hand. For example, as illustrated in FIG. 29(*b*), if the hour hand touched by the pointer drag-moves to a folder 2 and then its touch is released, the controller 180 may transmit a control signal, which indicates that the folder 2 has been selected, to the other terminal.

If the folder 2 is selected, a file list included in the folder 2 may be output to the display unit 151. In FIG. 29(*c*), the folder list includes a plurality of icons 2910 arranged at the edge of the display unit 151.

The user may select a desired file by rotating the minute hand. For example, as illustrated in FIG. 29(*c*), if the minute hand touched by the pointer drag-moves to a file 4 and then its touch is released, the controller 180 may transmit a control signal, which indicates that the file 4 has been selected, to the other terminal.

If a specific file is selected, the controller 180 may receive an execution screen of the selected file from the other terminal and output the received screen. Therefore, the execution screen of the file 4 may be output through the display unit 151.

If all items cannot be displayed on the display unit 151 due to a large number of items constituting the folder list and the file list, the controller 180 may output next or previous item in accordance with a user input for rotating the hour hand or the minute hand one round after outputting some items only.

For example, it is assumed that a file list output through FIG. 29(*c*) is a first sub list which is a part of the file list of the other terminal. In this case, if the minute hand is rotated clockwise 360 degrees, the controller 180 may output a second sub list through the display unit 151 as illustrated in FIG. 29(*d*). Although not shown, if a touch input for rotating the minute hand counterclockwise 360 degrees is received, the controller 180 may output a previous sub list.

As illustrated in FIG. 29, the controller 180 may select a folder on the basis of the touch input for the hour hand and select a predetermined file within a specific folder on the basis of the touch input for the minute hand.

In FIGS. 27 to 29, the method for remotely controlling a music application, a camera application and a file search application, which are being executed in the other terminal, has been described. In addition to the music application, the camera application and the file search application, various types of applications which are being executed in the other terminal may be controlled remotely.

To notify the user that the other terminal may be controlled remotely through the hour hand, the minute hand and the second hand, the controller 180 may output an icon to at least one of the hour hand, the minute hand and the second hand, which may be used to remotely control the other terminal, or may output an object for guiding a control function to the periphery of the hour hand, the minute hand and the second hand.

Figure 30:
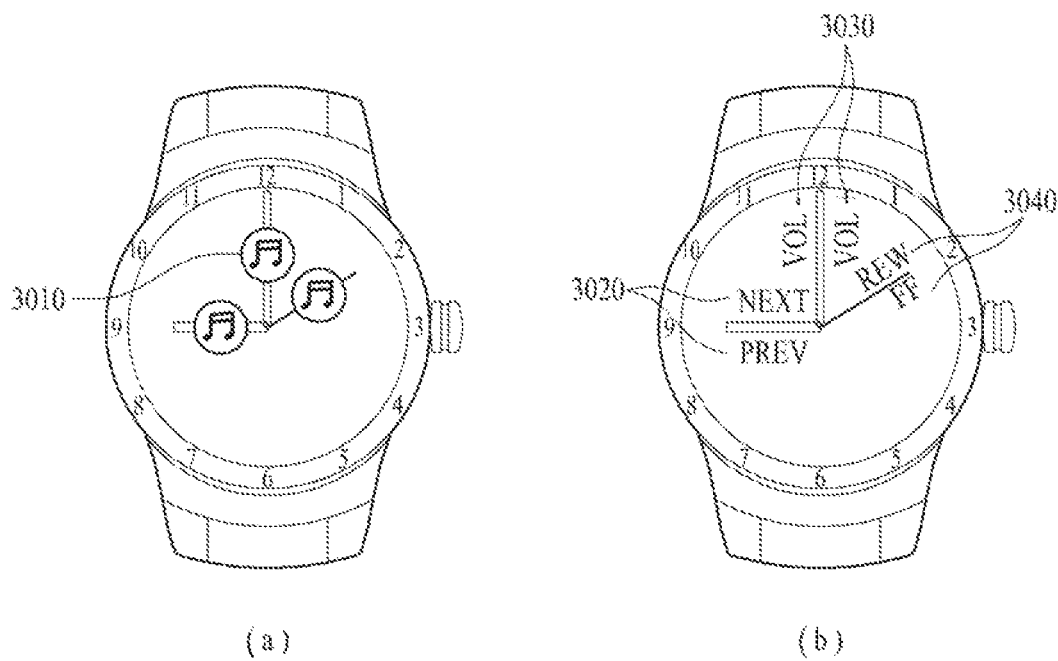
FIG. 30 is a view illustrating an example that an object is output to at least one of an hour hand, a minute hand and a second hand.

For example, FIG. 30 is a view illustrating an example that an object is output to at least one of an hour hand, a minute hand and a second hand.

If a music application is executed through the mobile terminal, the controller 180 may output an icon 3010 representative of the music application onto the display unit 151. At this time, if all of the hour hand, the minute hand and the second hand are used to remotely control the music application, the controller 180 may display the icon 3010 of the music application on the hour hand, the minute hand and the second hand as illustrated in FIG. 30(*a*).

For another example, the controller 180 may output an object for describing a remote control function through each clock hand to the periphery of the hour hand, the minute hand and the second hand while displaying the icon of the music application on the center of the clock face as illustrated in FIG. 30(*b*). In FIG. 30(*b*), an object 3020 (corresponding to next or previous object) indicating that next or previous file may be searched is displayed in the periphery of the hour hand, and an object 3030 (corresponding to volume +, −) indicating that volume may be increased or reduced may be displayed in the periphery of the minute hand. Also, an object 3040 (corresponding to rewind, fast forward) indicating that the play time may move to forward or backward is output to the periphery of the second hand.

If a user input for touching any one of the hour hand, the minute hand the second hand is received, the controller 180 may output an object for describing a remote control function allocated to the touched clock hand. For example, if a user input for touching the hour hand is received, an object for describing a remote control function allocated to the hour hand may be output, and if a user input for touching the minute hand is received, an object for describing a remote control function allocated to the minute hand may be output.

As illustrated in FIGS. 27 to 30, different functions for remotely controlling the other terminal may be allocated to the hour hand, the minute hand and the second hand. For example, as illustrated in FIG. 30, a music file change function may be allocated to the hour hand, a volume control function may be allocated to the minute hand, and a play time change function may be allocated to the second hand.

Figure 31:
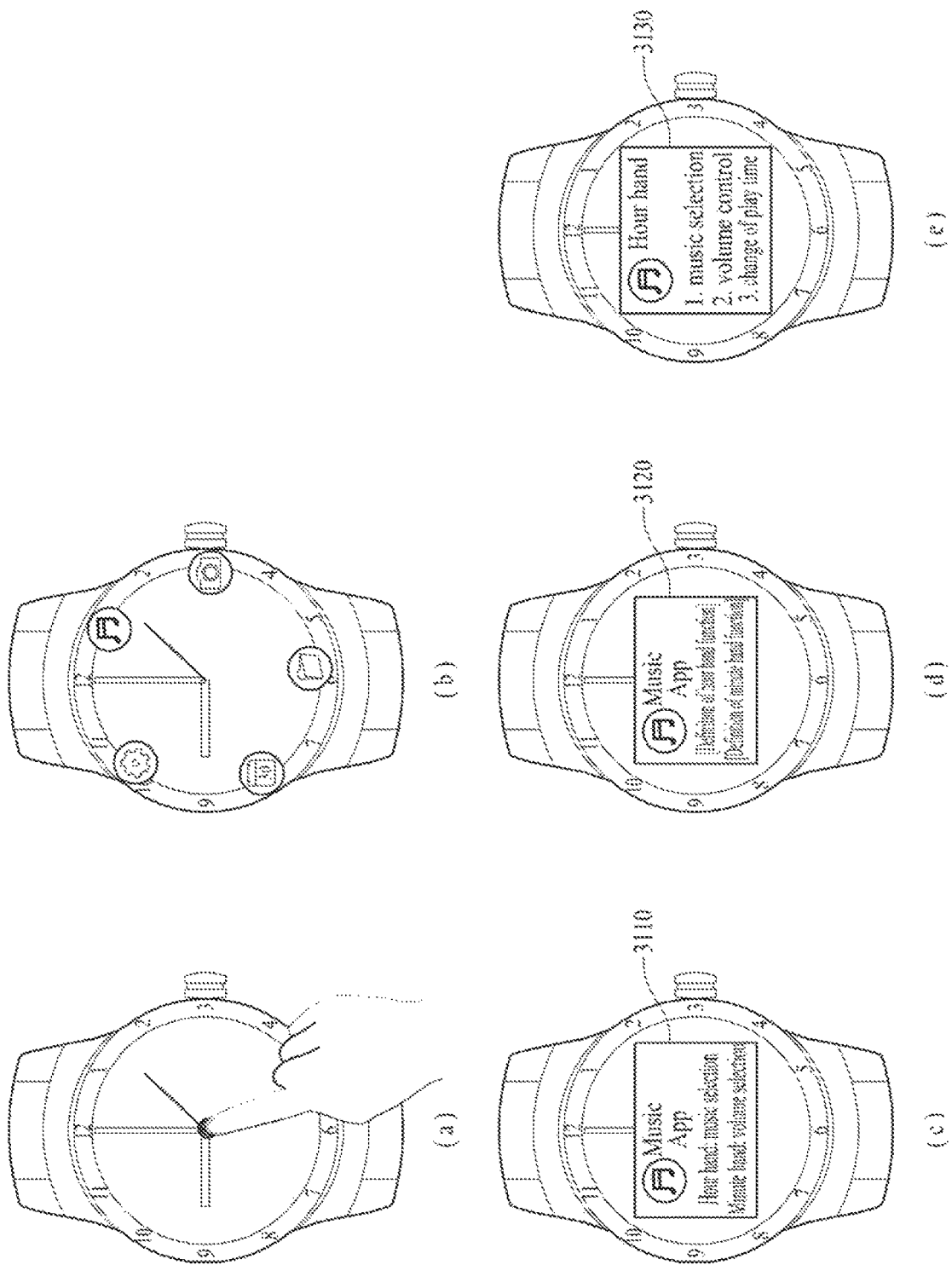
FIG. 31 is a view illustrating an example that different remote control functions are allocated to an hour hand and a minute hand.

For example, FIG. 31 is a view illustrating an example that different remote control functions are allocated to an hour hand and a minute hand.

As illustrated in FIG. 31(*a*), if a touch input (for example, a long touch input for touching the center of the clock face for a predetermined time or more) for touching a predetermined position (for example, the center of clock face) on the clock face output to the display unit 151 is received, the controller 180 may output an application list, which may be remotely controlled by the watch type terminal, as illustrated in FIG. 31(*b*). In FIG. 31(*b*), the application list includes a plurality of icons arranged at the edge of the display unit 151.

If any one of the application list is selected, the controller 180 may output information on a remote control function allocated to the hour hand and the minute hand with respect to the selected application. For example, if a music application icon of the application list is selected, the controller 180 may output a message for guiding a function allocated to the hour hand, the minute hand and the second hand, as illustrated in FIG. 31(*c*).

If a touch input for long-pressing a message or a touch input for long-pressing any one item of the application list is received, the controller 180 may output a selection menu, which may change the function allocated to the hour hand, the minute hand and the second hand, onto the application corresponding to the selected item.

For example, if a touch input for long-pressing a music application icon of the application list is received, the controller 180 may output a selection menu 1320, which may select any one of the hour hand, the minute hand and the second hand, as illustrated in FIG. 31(*d*).

If any one is selected from the selection menu, the controller 180 may output a function list 1330 that may be allocated to the selected clock hand.

For example, if the hour hand is selected from the selection menu, the controller 180 may output a remote control function list 1330, which may be allocated to the hour hand, as illustrated in FIG. 31(*e*). In FIG. 31(*e*), a music selection function, a volume control function and a play time control function are included in the remote control function list.

If any one of the remote control function list is selected, the controller 180 may allocate the selected function to the selected clock hand. For example, if the volume control item of the remote control function list 1330 is selected, the controller 180 may allocate the volume control function to the hour hand. In this case, the user may increase or reduce the volume of the other terminal through the hour hand not the minute hand unlike the example described with reference to FIG. 27.

In FIGS. 27 to 29, the application which is being executed in the other terminal is selected as a remote control target. Unlike the shown example, the controller 180 may select the application selected by the user as a remote control target. To this end, the controller 180 may output an application list installed in the other terminal through the display unit 151.

For example, if a music application of the application list output through the display unit 151 is selected, the controller 180 may use the music application of the other terminal as a remote control target. In this case, the controller 180 may output the icon corresponding to the music application, which is to be remotely controlled through the display unit 151, through the display unit 151. Also, if the music application is not executed in the other terminal at the time when the music application of the application list is selected, the controller 180 may transmit a control signal for triggering execution of the music application to the other terminal.

<Output of History Information>

Figure 32:
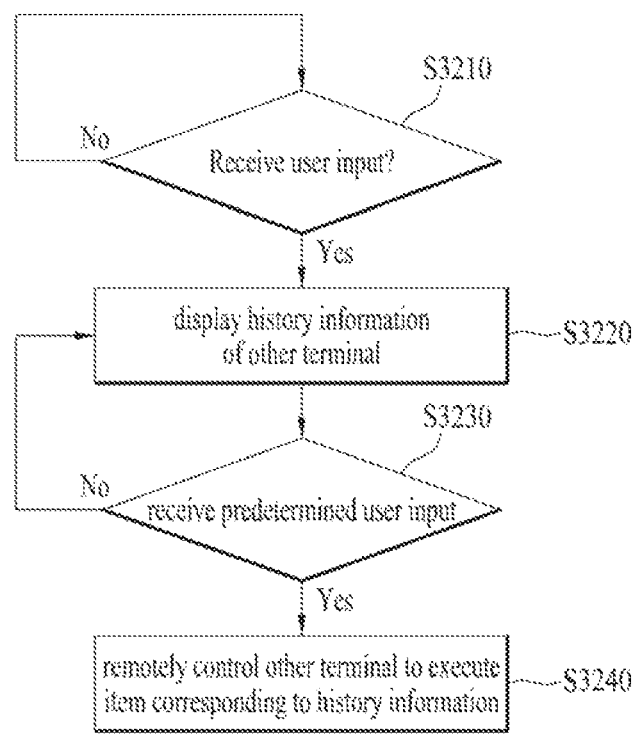
FIG. 32 is a view illustrating an operation flow of a watch type terminal according to the present invention.

FIG. 32 is a view illustrating an operation flow of a watch type terminal according to the present invention.

If a predetermined user input is received on the display unit 151 (S3210), the controller 180 may request the other terminal to provide history information. In this case, the history information may include a recorded information of a recent operation of the other terminal such as application execution record including a call record, a message transmission and reception record, and a web page visit record.

If the history information is received, the controller 180 may display the received history information on the display unit 151 (S3220). In a state that the history information is output, if the predetermined user input is received (S3230), the controller 180 may transmit a control signal to the other terminal, whereby the other terminal may execute an item corresponding to the history information (S3240).

As an example of the call record and the application execution record, this embodiment will be described in detail.

FIG. 33 is a view illustrating an example that call record information is output.

If a predetermined user input is received through the display unit 151, the controller 180 may output the most recent call record information 3310 of the other terminal through the display unit 151. In FIG. 33(*a*), the predetermined touch input is illustrated based on clockwise drag-movement of 360 degrees of the pointer which has touched the minute hand. Even in the case that the pointer which has touched the hour hand or the second hand drag-moves or the pointer which has touched a random point on the clock face drag-moves, the recent call record information may be output.

In FIG. 33(*b*), information 3310 of 'Jane' is output as the recent call record information.

In a state that information 3310 of the recent call party is output, if a user input for selecting a corresponding character is received, the controller 180 may remotely control the other terminal to call the recent call party. For example, in FIG. 33(*c*), as a touch of the pointer which has touched the display unit 151 is released, the watch type terminal 100 remotely controls the other terminal 200 to call Jane.

In FIG. 33, information of the recent call party with the other terminal is output through the display unit 151. Unlike the shown example, the controller 180 may output a recent call list of the other terminal through the display unit 151.

Figure 34:
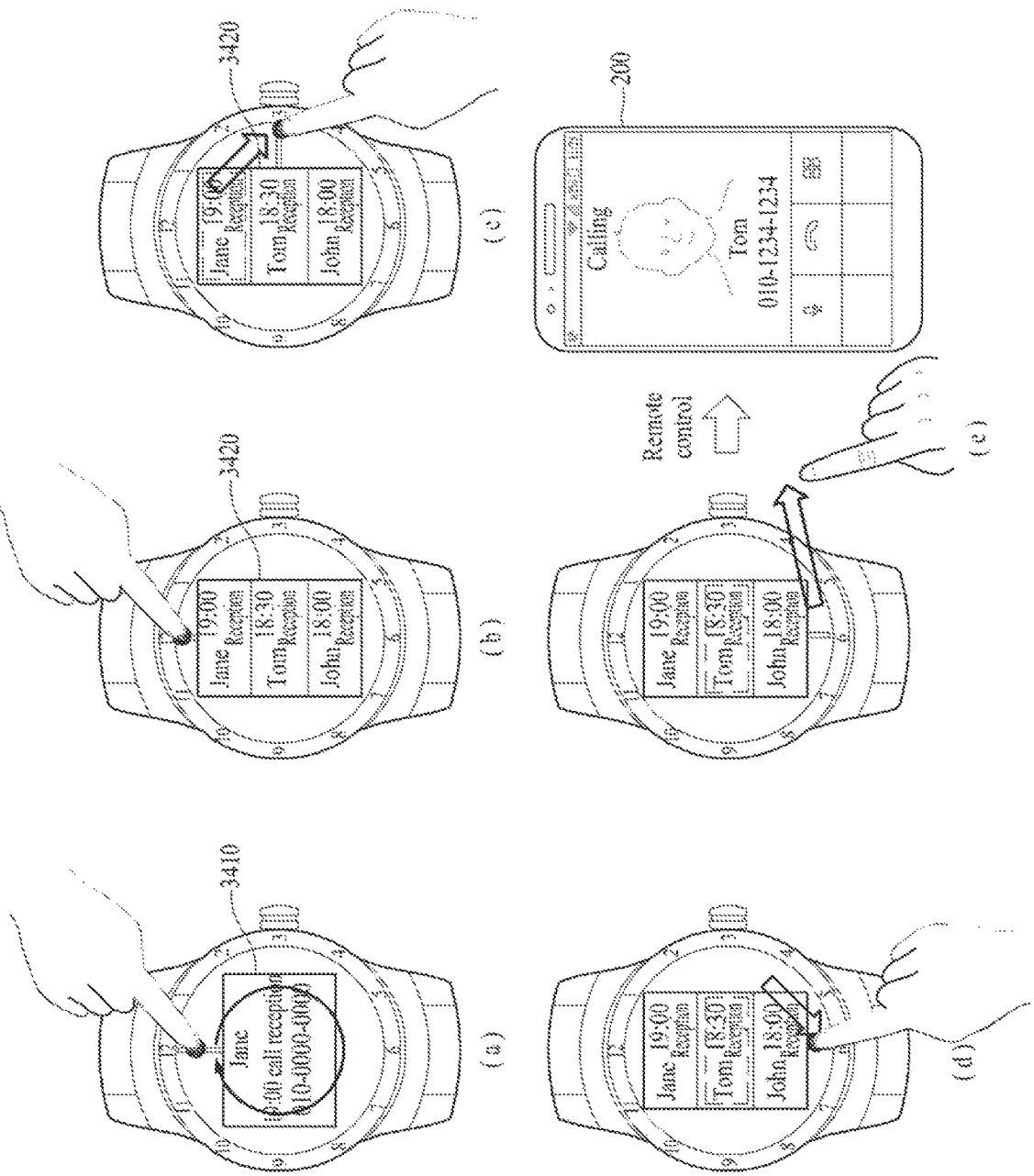
FIG. 34 is a view illustrating another example that call record information is output.

For example, FIG. 34 is a view illustrating another example that call record information is output.

As illustrated in FIG. 34(*a*), in a state that information 3410 of the most recent call party is output, if additional drag input is received through a pointer, the controller 180 may output a recent call list 3420 of the other terminal as illustrated in FIG. 34(*b*).

For example, if a touch input of a pointer, which has touched any one of the hour hand, the minute hand and the second hand or a random point on the clock face, for rotating clockwise once is received, the controller 180 may output information 3410 of the most recent call party as illustrated in FIG. 34(*a*), and may output the recent call list 3420 as illustrated in FIG. 34(*b*) if the pointer is rotated clockwise or counterclockwise once more while the information 3410 of the most recent call party is being output.

For another example, if a pointer, which has touched any one of the hour hand, the minute hand and the second hand or a random point on the clock face, for rotating clockwise (or counterclockwise) is rotated, the controller 180 may output information 3410 of the most recent call party as illustrated in FIG. 33(*b*), and may output the recent call list 3420 as illustrated in FIG. 34(*b*) if the pointer is rotated counterclockwise (or clockwise).

In a state that the recent call list is output, if a user input for dragging the pointer clockwise or counterclockwise is received, the controller 180 may sequentially select items in the call list 3420. For example, if a user input for dragging the pointer clockwise is received, the controller 180 may upwardly change the selected items in the call list 3420 in due order.

For example, if the pointer drag-moves clockwise, the controller 180 may control the first item in the call list as illustrated in FIG. 34(*c*). If the pointer more drag-moves clockwise, the controller 180 may select the second item after releasing the selection of the first item in the call list as illustrated in FIG. 34(*d*).

In a state that any one of the call list is selected, if a predetermined user input is received, the controller 180 may remotely control the other terminal to call the other party corresponding to the selected item. For example, in a state that the second item of the call list is selected, if a user input for releasing the touch of the pointer, which has touched the display unit 15, is received, the controller 180 may control the other terminal to call the other party, Tom, corresponding to the second item as illustrated in FIG. 34(e).

FIG. 35 is a view illustrating an example that application execution information is output.

If a predetermined touch input is received through the display unit 151, the controller 180 may output application information 3510, which is executed most recently in the other terminal, through the display unit 151. In FIG. 35(a), the predetermined touch input is illustrated by counterclockwise rotation of 360 degrees of the pointer which has touched the minute hand. However, even in the case that the pointer which has touched the hour hand or the second hand drag-moves or the pointer which has touched a random point on the clock face drag-moves, application information which is most recently executed may be output.

FIG. 35(b) illustrates that the application most recently executed in the other terminal is a music application.

In a state that the application information 3510 which is most recently executed is output, if a user input for selecting the corresponding application is received, the controller 180 may remotely control the other terminal 200 to re-execute the application which is most recently executed. For example, in FIG. 35(c), as the pointer which has touched the display unit 151 is released, the watch type terminal 100 remotely controls the other terminal 200 to re-execute the music application.

Unlike the example shown in FIG. 35, the controller 180 may output a recent application execution list of the other terminal through the display unit 151.

Figure 36:
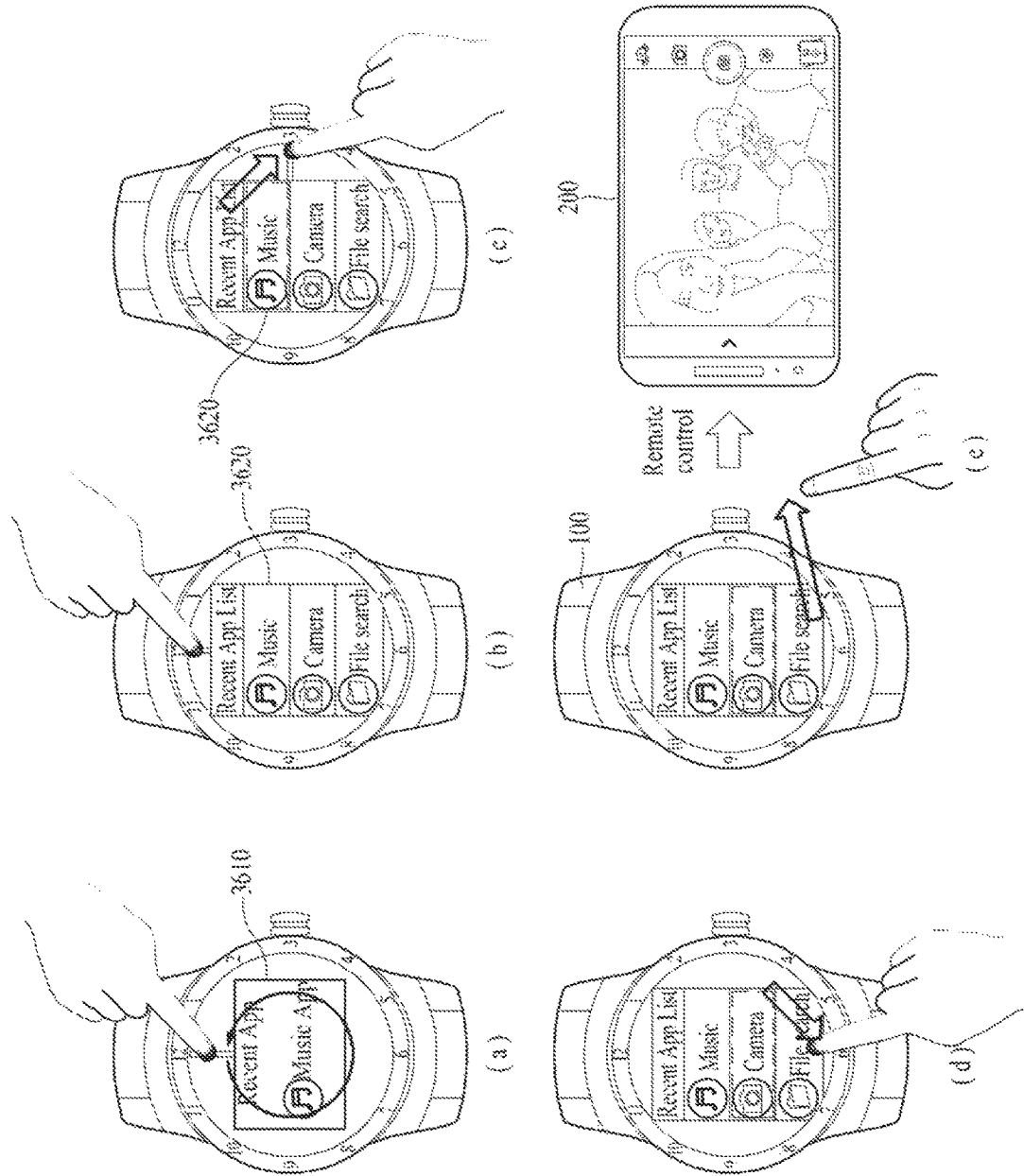
FIG. 36 is a view illustrating another example that application execution information is output.

For example, FIG. 36 is a view illustrating another example that application execution information is output.

As illustrated in FIG. 36(a), in a state that application information 3610 which is most recently executed is output, if additional drag input is received through the pointer, the controller may control the other terminal to output a recent application execution list 3620 as illustrated in FIG. 36(b).

In the same manner as the shown example, if a pointer, which has touched any one of the hour hand, the minute hand and the second hand or a random point on the clock face, is rotated counterclockwise once, the controller 180 may output information 3610 which is most recently executed, as illustrated in FIG. 35(b), and may output the recent application execution list 3620 as illustrated in FIG. 36(b) if the pointer is rotated clockwise or counterclockwise once more.

For another example, if a pointer, which has touched any one of the hour hand, the minute hand and the second hand or a random point on the clock face, is rotated clockwise (or counterclockwise), the controller 180 may output the information 3610, which is most recently executed, as illustrated in FIG. 36(b), and may output the recent application execution list 3620 as illustrated in FIG. 36(b) if the pointer is rotated counterclockwise (or clockwise).

In a state that the application list 3620 is output, if a user input for dragging the pointer clockwise or counterclockwise is received, the controller 180 may sequentially change selected items in the application list. For example, if a user input for dragging the pointer clockwise is received, the controller 180 may downwardly change the selected items in the application list in due order. Unlike this case, if a user input for dragging the pointer counterclockwise is received, the controller 180 may upwardly change the selected items in the application list in due order.

In FIGS. 36(c) and (d), as the pointer is rotated clockwise, selection of the first item on the list is released, and the second item is selected.

In a state that any one of the application list is selected, if a predetermined user input is received, the controller 180 may remotely control the other terminal 200 to execute an application corresponding to the selected item. For example, in a state the second item of the application list is selected, if the pointer which has touched the display unit 151 is released, the controller 180 may remotely control the other terminal 200 to execute the camera application corresponding to the second item as illustrated in FIG. 36(e).

Although not shown, the controller 180 may output a message transmission and reception record of the other terminal or a web page visit record of the other terminal on the basis of the drag input of the pointer which has touched the display unit 151. In a state that the message transmission and reception record of the other terminal is output, if the pointer which has touched the display unit 151 is released, the controller 180 may control the other terminal to call the other party corresponding to the message transmission and reception record or output the screen for drafting the message. Unlike this case, in a state that the web page visit record of the other terminal is output, if the pointer which has touched the display unit 151 is released, the controller 180 may control the other terminal 200 to access URL address corresponding to the web page visit record.

In accordance with the touch input of the user, which type history information will be output may be controlled in accordance with the clock hand touched by the pointer or a drag moving direction of the pointer.

For example, the controller 180 may output call record information if the pointer which has touched the hour hand drag-moves clockwise or counterclockwise, and may output application execution information if the pointer which has touched the minute hand drag-moves clockwise or counterclockwise.

Alternatively, if a touch input for clockwise drag-moving the pointer, which has touched the second hand, is received, the controller 180 may output the message transmission and reception record. If a touch input for counterclockwise drag-moving the pointer, which has touched the second hand, is received, the controller 180 may output the web page visit record.

<Lock Release>

To protect personal information and prevent a touch error input from occurring, a password for lock release may be set to a watch type mobile terminal or other terminal interworking with the watch type mobile terminal. The user cannot use the watch type terminal or the other terminal normally until the password of the watch type terminal or the other terminal is released.

Even though the watch type terminal is in a lock state, clock may be displayed through the watch type terminal. At this time, a number from 1 to 12 or a scale from 1 to 12 may be displayed on the clock face, wherein the user may input the password for releasing the lock state of the watch type terminal or the other terminal through the number or scale displayed on the clock.

Figure 37:
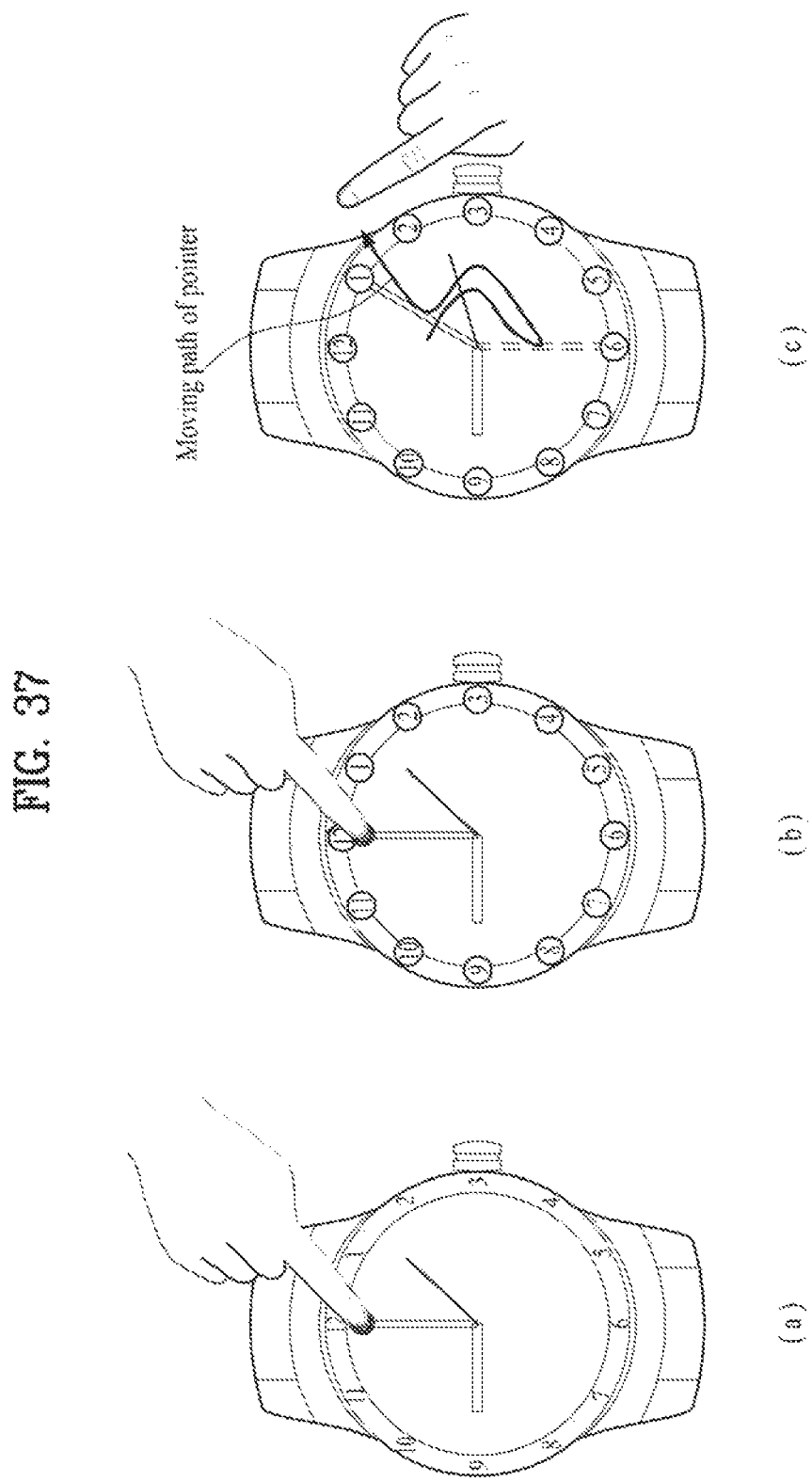
FIG. 37 is a view illustrating an example that a password of a watch type terminal is released.

For example, FIG. 37 is a view illustrating an example that a password of a watch type terminal is released. When the watch type terminal is in the lock state, if a user input for touching any one of the hour hand, the minute hand and the second hand is received, the controller 180 may highlight numbers 1 to 12 on the clock face to indicate that the password for releasing the lock state of the watch type terminal may be input.

For example, in FIGS. 37(a) and (b), as the user input for touching the minute hand is received, texts surrounded by a circle of 1 to 12 may be output additionally, whereby the numbers from 1 to 12 may be highlighted.

Afterwards, if a user input for rotating any one of the hour hand, the minute hand and the second hand is received, the controller 180 may determine that the number indicated by the minute hand is input as a password. At this time, in order that the user may input numbers continuously, the controller 180 may determine that the number indicated by any one of the hour hand, the minute hand and the second hand is input as a password at the time when a rotational direction of any one of the hour hand, the minute hand and the second hand is changed.

For example, referring to FIG. 37(c), the pointer which has touched the minute hand is rotated clockwise, and then its rotational direction is changed to a counterclockwise direction at the position corresponding to number 6. Also, the pointer rotated counterclockwise is released at the position corresponding to number 1.

In this case, the controller 180 may determine that number '1' indicated by the minute hand is input as a password when the rotational direction of the minute hand is changed and number '6' indicated by the minute hand and the pointer are released.

If a password input is completed, the controller 180 may determine whether the input password is matched with a registered password. If the input password is matched with a registered password, the controller 180 may release the lock state of the watch type terminal and output a home screen.

In the example shown in FIG. 37, number used as a password is input whenever the rotational direction of the minute hand is changed. For another example, a user input for inputting a password may mean numbers from 1 to 12 are touched. In this case, the controller 180 may release the lock state of the watch type terminal by determining whether the touched number is matched with the registered password.

If the other terminal interworking with the watch type terminal is in the lock state, the controller 180 may transmit a number input by the watch type terminal to the other terminal. Then, the other terminal may release the lock state by comparing the number received from the watch type terminal with the registered password.

The controller 180 may determine that two digits are input continuously if numbers 10, 11 and 12 of the clock face. For another example, considering that there is no number '0' on the clock face, the controller 180 may determine that number '0' is input if any one of digits from 10 to 12 is selected.

If a password registered in the watch type terminal or the other terminal is a pattern, the controller 180 may output a password input screen for inputting a pattern password on the display unit 151.

Figure 38:
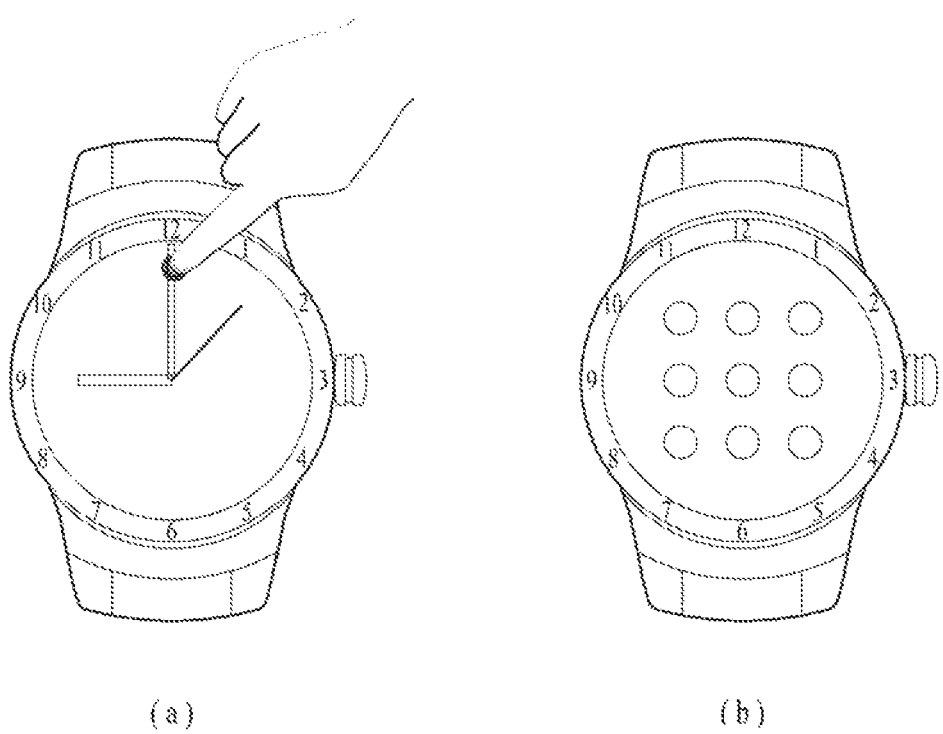
FIG. 38 is a view illustrating an example that a pattern password is input.

For example, FIG. 38 is a view illustrating an example that a pattern password is input. When the watch type terminal is in the lock state, if a user input for touching any one of the hour hand, the minute hand and the second hand is received, the controller 180 may output a password input screen for releasing the lock state of the watch type terminal.

For example, in FIGS. 38(a) and (b), as a user input for touching the minute hand is received, 9 graphic objects are output.

If a pattern for continuously linking a predetermined number of objects of the 9 graphic objects is matched with the registered pattern, the lock state of the watch type terminal may be released.

Also, when the other terminal is in the lock state, the controller 180 may provide information on the input pattern to the other terminal. Then, the other terminal may release the password based on whether the received pattern information is matched with the registered pattern.

<Display of Gauge Information>

The mobile terminal according to the present invention may use the hour hand, the minute hand and the second hand as gauge bars. For example, supposing that a full length of the second hand bar is 100%, information that may be displayed at a percentage may be output through the hour hand. The controller 180 may display various types of state information of the watch type terminal and the other terminal interworking with the watch type terminal through the gauge bars. An example that state information of the watch type terminal and the other terminal is output through the gauge bars will be described.

Figure 39:
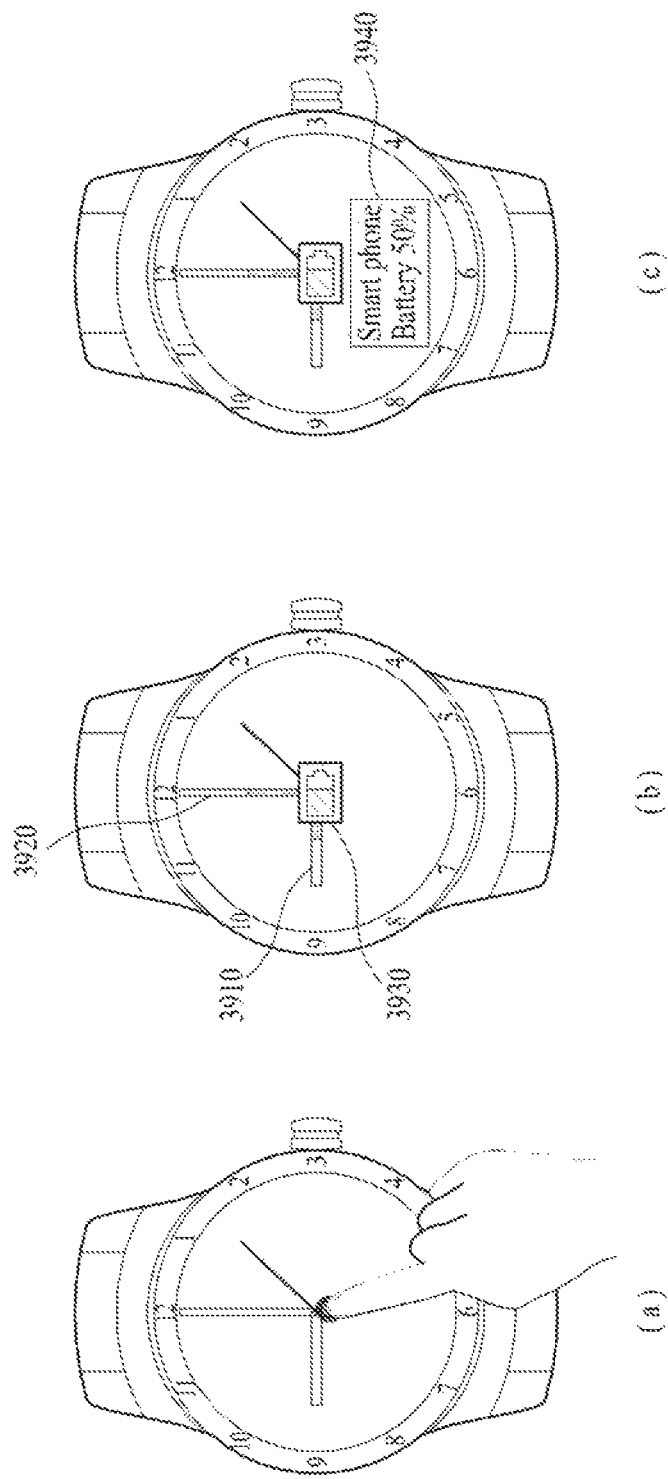
FIG. 39 is a view illustrating an example that battery information is output.

FIG. 39 is a view illustrating an example that battery information is output. The hour hand, the minute hand and the second hand may be used as gauges indicating 0 to 100%. For example, if 50% is indicated through the minute hand, a half of the minute hand is displayed at an empty state (displayed at a first color), and the other half maintains a filled state (displayed at a second color). The controller 180 may set the gauge bar to be gradually filled toward 100%, or may set the gauge bar to be gradually empty toward 100%.

If a predetermined touch input is received through the display unit 151, the controller 180 may output battery information (that is, information on residual power capacity) of the watch type terminal through any one of the hour hand, the minute hand and the second hand. Also, if the watch type terminal is interworking with the other terminal, the controller 180 may further output battery information of the other terminal through nay one of the hour hand, the minute hand and the second hand.

For example, in FIGS. 39(a) and (b), as a touch input for touching the center of the clock face is received, battery information of the other terminal and battery information of the watch type terminal are respectively output through the hour hand 3910 and the minute hand 3920. At this time, the controller 180 may output a battery shaped object 3930 through the display unit 151 as illustrated in FIG. 39(b) to indicate that battery information is displayed.

If the hour hand 3910 or the minute hand 3920 is touched, the controller 180 may output a message 3940 for indicating detailed battery information of the other terminal or the watch type terminal.

For example, if the hour hand 3910 is touched, the controller 180 may output a message 3940 indicating residual power capacity of the other terminal interworking with the watch type terminal as illustrated in FIG. 39(c). Although not shown, if a touch input for touching the minute hand 3920 is received, the controller 180 may output a message 3940 indicating residual power capacity of the watch type terminal.

The hour hand and the minute hand may be used to indicate residual time information until next schedule registered in the watch type terminal or the other terminal. This will be described in detail with reference to FIG. 40.

Figure 40:
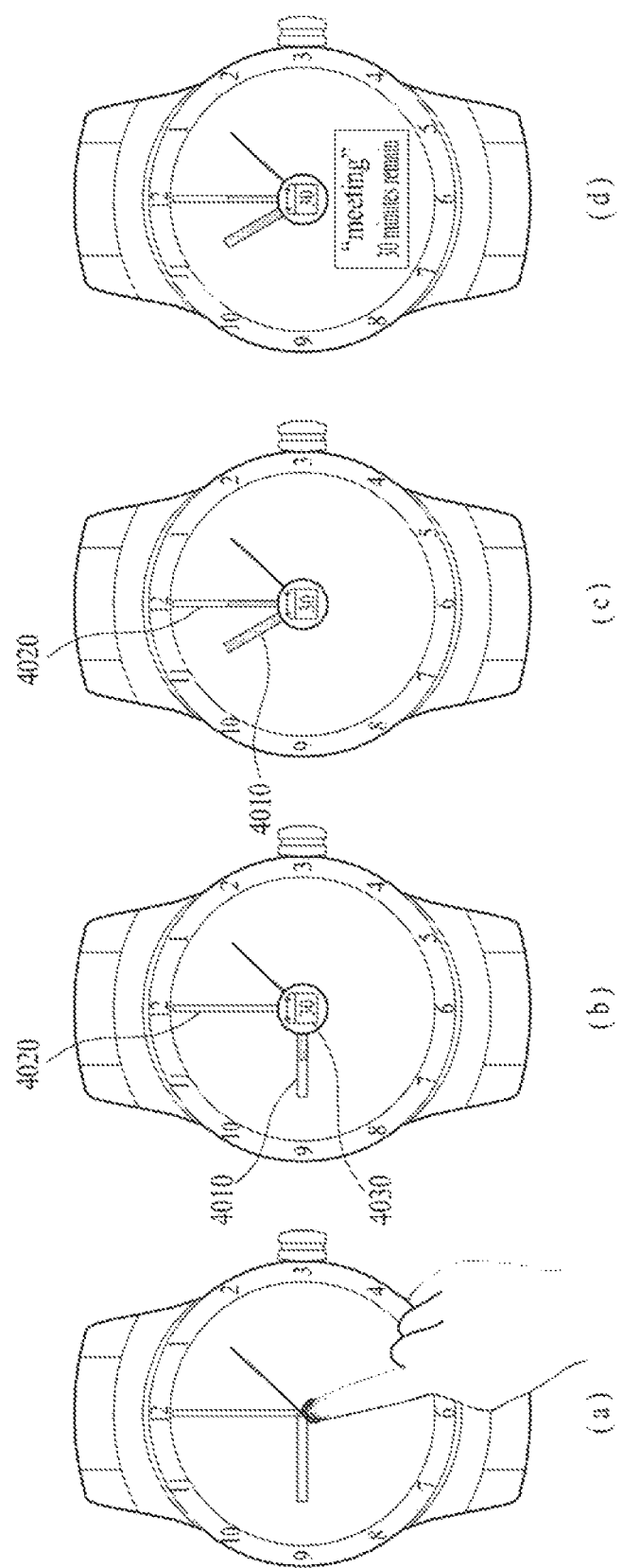
FIG. 40 is a view illustrating an example that residual time information is output.

FIG. 40 is a view illustrating an example that residual time information is output. For convenience of description, it is assumed that the gauge bar is gradually empty toward 100%.

The hour hand and the minute hand may be used as gauge bars indicating residual time. For example, the hour hand may be used as a gauge bar indicating maximum N hours, and the minute hand may be used as a gauge bar indicating maximum 60 minutes. The minute hand will be described as an example. If a residual time of 60 minutes remains to reach a specific schedule, the minute hand will be fully empty, and if the minute hand reaches the specific schedule, the minute hand will be fully filled.

For example, in FIGS. 40(*a*) and (*b*), as a touch input for touching the center of the clock face is received, residual time information until next schedule is output through the hour hand 4010 and the minute hand 4020. At this time, the controller 180 may output an object 4030 corresponding to schedule information through the display unit 151 as illustrated in FIG. 40(*b*) to indicate that the residual time information until next schedule is displayed.

If a residual time of one hour or more remains until next schedule starts, the controller 180 may set the minute hand 4020 to indicate 100% (that is, fully empty state), and may control the hour hand 4010 to output residual time information.

For example, if a residual time of 2 hours and 30 minutes remains until next schedule starts, the controller 180 may set the hour hand 4010 to indicate (2.5/N*100)% (in this case, N is maximum time that may be displayed through the gauge bar of the hour hand 4010).

If time passes, the controller 180 may control the hour hand 4010 toward 0%. Therefore, if a residual time until next schedule is less than one hour, as shown in FIG. 40(*c*), the hour hand 4010 will be filled with 100%.

If a residual time until next schedule is less than one hour, the controller 180 may control the gauge bar of the minute hand 4020 toward 0% as time passes. If the current time reaches a starting time of next schedule or a predetermined time from the starting time of the next schedule, the controller 180 may output a feedback indicating that the next schedule will start. In this case, the feedback output may correspond to output of at least one of vibration, alarm and light (for example, flickering of LED).

If a user input for touching at least one of the hour hand 4010 and the minute hand 4020 is received, the controller 180 may output a message 4040 for guiding a residual time until next schedule.

For example, if a user input for touching the hour hand 4010 or the minute hand 4020 is received, the controller 180 may output a message 4040 that includes name of next schedule and residual time information until next schedule starts, as illustrated in FIG. 40(*d*).

The hour hand and the minute hand may be used to indicate the number of events generated in at least one of the watch type terminal and the other terminal interworking with the watch type terminal. In more detail, the controller 180 may increase gauge of the gauge bar if events generated in the watch type terminal or the other terminal are increased.

Figure 41:
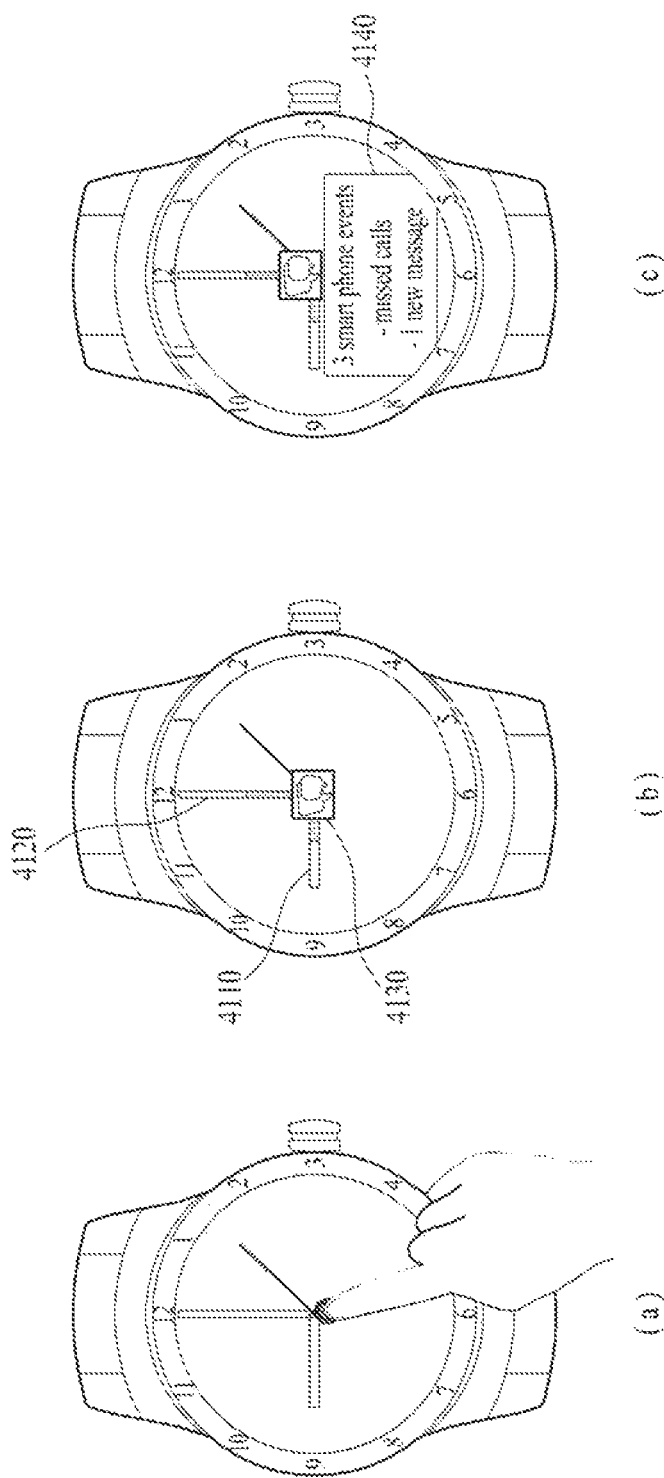
FIG. 41 is a view illustrating an example that information on the number of events generated is output through an hour hand and a minute hand.

For example, FIG. 41 is a view illustrating an example that information on the number of events generated is output through an hour hand and a minute hand.

If a predetermined touch input is received through the display unit 151, the controller 180 may output information on the occurrence number of events of the watch type terminal through any one of the hour hand, the minute hand and the second hand. Also, if the watch type terminal is interworking with the other terminal, the controller 180 may further output information on the occurrence number of events of the other terminal through the other one of the hour hand, the minute hand and the second hand.

In this case, the events may include reception of a push message, a text message and an instant message, occurrence of a missed call, and degradation (or improvement) of a connection state between the mobile terminal and the other terminal.

In FIGS. 41(*a*) and (*b*), as a touch input for touching the center of the clock face is received, information on the occurrence number of events of the other terminal and information on the occurrence number of events of the watch type terminal are respectively output through the hour hand 4110 and the minute hand 4120. At this time, the controller 180 may output an object 4130 corresponding to the information on the occurrence number of events through the display unit 151 as illustrated in FIG. 41(*b*) to indicate that the information on the occurrence number of events is displayed.

If the hour hand 4110 or the minute hand 4120 is touched, the controller 180 may output a message 4140 indicating event information of the other terminal or the watch type terminal.

For example, if the hour hand 4110 is touched, the controller 180 may output a message 4140, which includes the number of events generated in the other terminal interworking with the watch type terminal and details of the generated events, as illustrated in FIG. 41(*c*). Although not shown, if a touch input for touching the minute hand 4120 is received, the controller 180 may output a message 4140 indicating event information of the watch type terminal.

The hour hand and the minute hand may be used to display information such as a spaced distance between the watch type terminal and the other terminal interworking with the watch type terminal and communication sensitivity. In more detail, the controller 180 may increase gauge of the gauge bar if the distance between the watch type terminal and the other terminal is increased or increase the gauge bar if communication sensitivity between the watch type terminal and the other terminal is increased.

Figure 42:
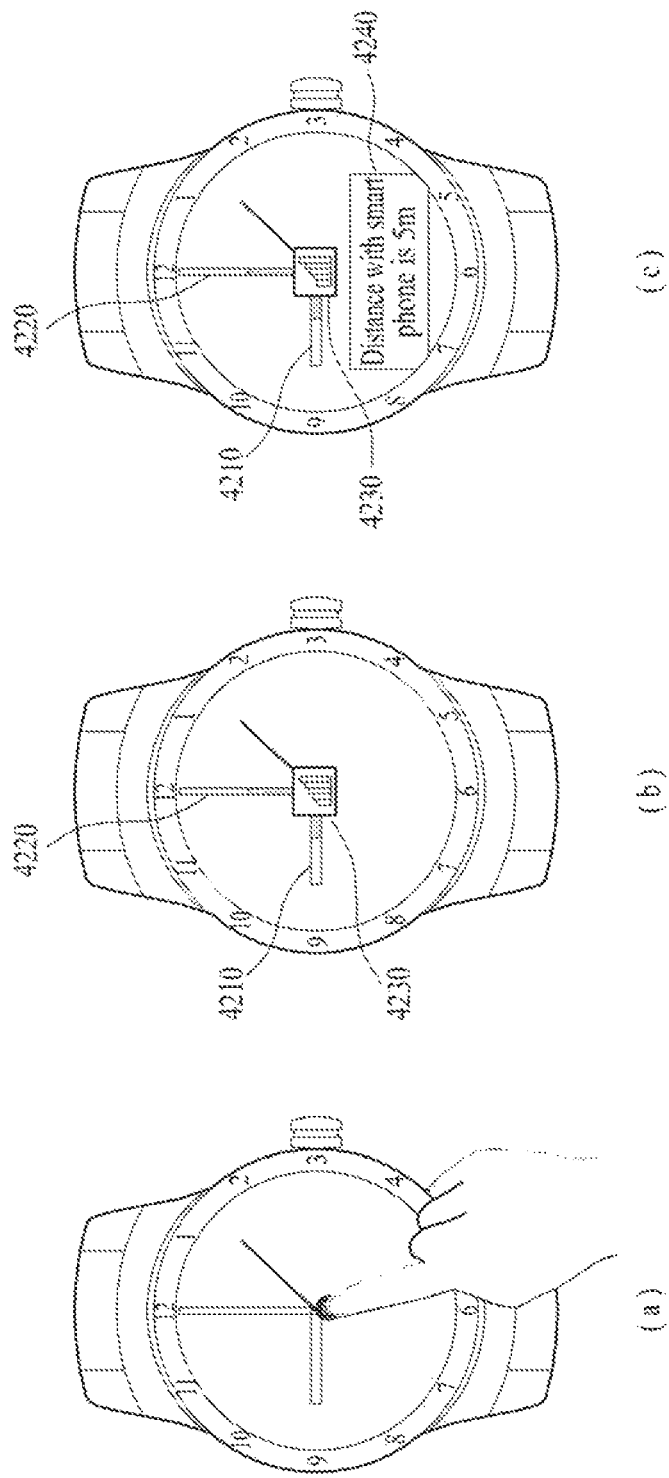
FIG. 42 is a view illustrating an example that spaced distance information and communication sensitivity information are output through an hour hand and a minute hand.

For example, FIG. 42 is a view illustrating an example that spaced distance information and communication sensitivity information are output through an hour hand and a minute hand.

If a predetermined touch input is received through the display unit 151, the controller 180 may output spaced distance information through any one of the hour hand 4210, the minute hand 4220 and the second hand and output communication sensitivity information through the other one.

In FIGS. 42(*a*) and (*b*), as a touch input for touching the center of the clock face is received, the spaced distance information and the communication sensitivity information are respectively output through the hour hand 4210 and the minute hand 4220. At this time, the controller 180 may output an object 4230 corresponding to the spaced distance information and the communication sensitivity information through the display unit 151 as illustrated in FIG. 42(*b*) to indicate that the spaced distance information and the communication sensitivity information are displayed.

If the hour hand 4210 or the minute hand 4220 is touched, the controller 180 may output a message 4240 indicating a spaced distance or a message indicating 4240 indicating communication sensitivity.

For example, if the hour hand 4210 is touched, the controller 180 may output the message 4240 indicating the spaced distance between the watch type terminal and the other terminal, as illustrated in FIG. 42(*c*).

The hour hand and the minute hand may be used to display goal achievement for set activity information. In more detail, if a daily goal activity (for example, the number of walks) of a user is set, the controller 180 may output a predicted achievement rate for goal activity computed based on the number of average walks up to now or a current achievement rate compared with goal activity computed based on the number of walks up to now through the hour hand and the minute hand.

Figure 43:
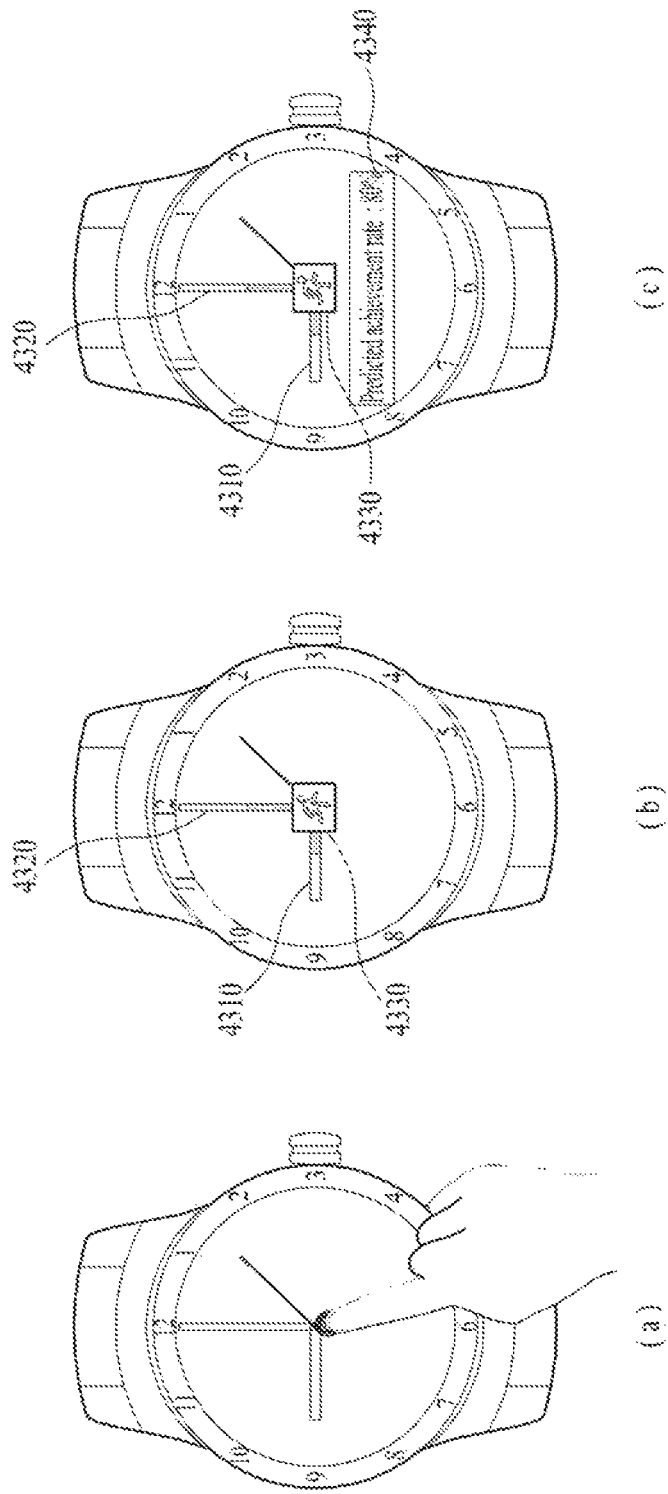
FIG. 43 is a view illustrating an example that activity information is output through an hour hand and a minute hand.

For example, FIG. 43 is a view illustrating an example that activity information is output through an hour hand and a minute hand.

If a predetermined touch input is received through the display unit 151, the controller 180 may output activity information through any one of the hour hand, the minute hand and the second hand.

In FIGS. 43(a) and (b), as a touch input for touching the center of the clock face is received, a predicted achievement rate and a current achievement rate are respectively output through the hour hand 4310 and the minute hand 4320. Gauge of the hour hand 4310 may move toward 100% if the predicted achievement rate is high, and gauge of the minute hand 4320 may move toward 100% if the current achievement rate is high.

In computation of the predicted achievement rate, a usual walking pattern of a user may be considered. For example, if there are a lot of walks in the morning time but 50% of goal walks is only achieved in the morning time, the predicted achievement rate may indicate a numerical value lower than 100%. On the contrary, if there are a lot of walks in the afternoon, the predicted achievement rate may indicate a numerical value higher than 80% even though 40% of the goal walks in the morning is only achieved.

The controller 180 may output an object 4330 corresponding to achievement information through the display unit 151 as illustrated in FIG. 43(b) to indicate that the activity information is displayed.

If the hour hand 4310 or the minute hand 4320 is touched, the controller 180 may output a message 4340 indicating a predicted achievement rate or a message 4340 indicating a current achievement rate.

For example, if the hour hand 4310 is touched, the controller 180 may output a message 4340 indicating the predicted achievement rate as illustrated in FIG. 43(c). Although not shown, if a touch input for touching the minute hand 4320 is received, the controller 180 may output a message 4340 indicating the current achievement rate.

The controller 180 may measure walks of a user on the basis of movement of the watch type terminal through the sensing unit 140 or receive information on walks of a user from the other terminal.

<Remote Control of Single Purpose Terminal>

In FIGS. 27 to 30, it is assumed that the other terminal that may be controlled by the watch type terminal is a smart phone, a tablet, or notebook computer, of which function may be enlarged through an application. The watch type terminal according to the present invention may be used to remotely control a terminal used for single purpose, such as TV, audio player, video player (blue ray or DVD player), a lamp device, a camera, and an air conditioner.

In this case, the controller 180 may output an object corresponding to a type of the other terminal to be remotely controlled through the display unit 151. For example, if the watch type terminal desires to remotely control TV, an icon corresponding to TV may be output, and if the watch type terminal desires to remotely control an audio player, an icon corresponding to the audio player may be output.

As described with reference to FIGS. 27 and 28, the controller 180 may remotely control the other terminal through the hour hand, the minute hand and the second hand. For example, the controller 180 may perform remote control such as play file change of the audio or video player, volume control and play time control on the basis of the touch input for the hour hand, the minute hand and the second hand. Also, the controller 180 may perform remote control such as exposure control, white balance control and photographing standby time setup with respect to a camera on the basis of the touch input for the hour hand, the minute hand and the second hand.

The watch type terminal may remote control such as channel change or volume control with respect to TV or set-top box.

Figure 44:
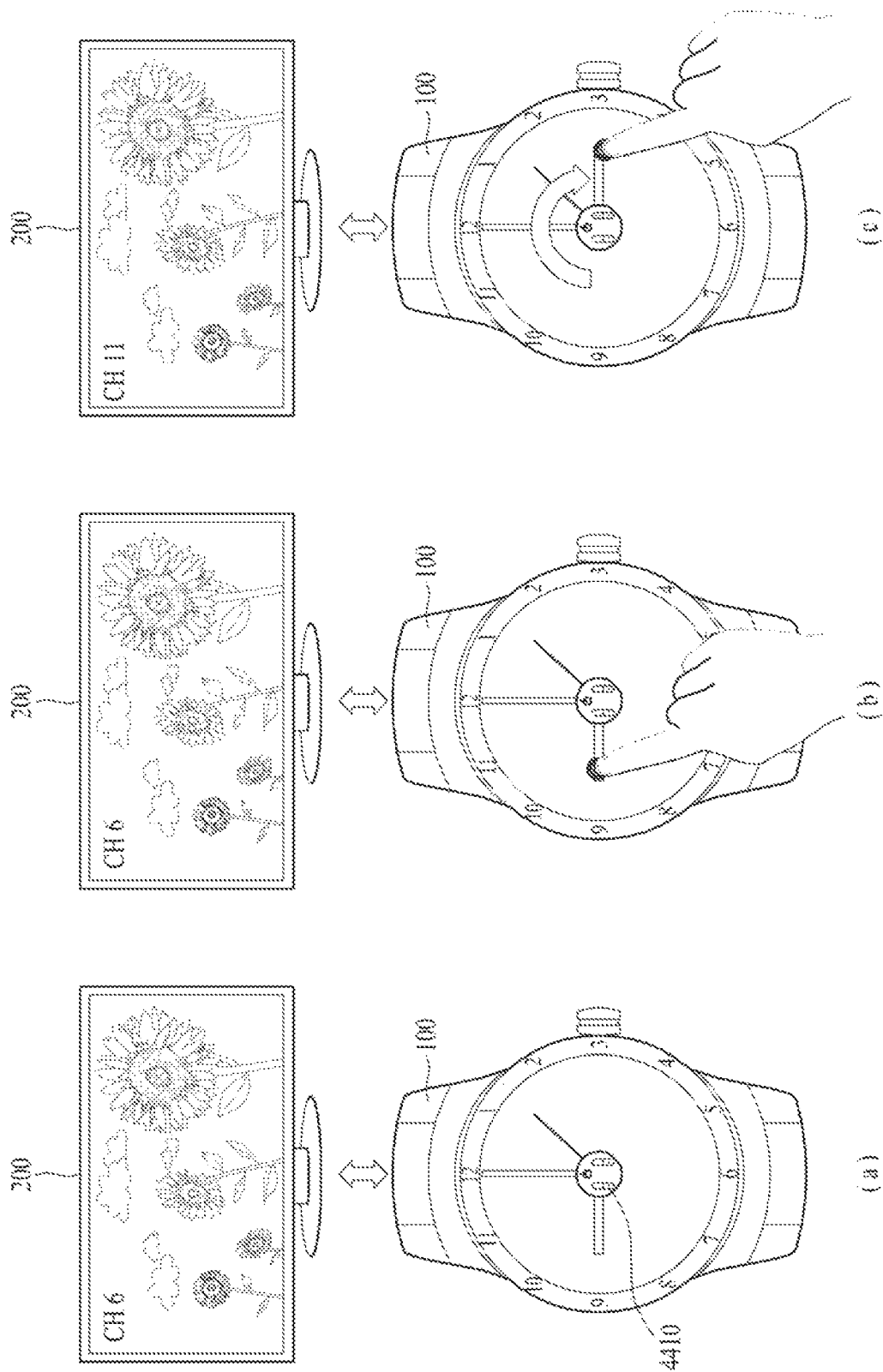
FIG. 44 is a view illustrating an example that remote control of a TV is performed.

For example, FIG. 44 is a view illustrating an example that remote control of a TV is performed.

If the watch type terminal is interworking with a TV, the controller 180 may output an object indicating that the TV may be controlled remotely, as illustrated in FIG. 44(a). In FIG. 44(a), a remote controller shaped icon 4410 is output to the center of the display unit 151.

If a user input for rotating at least one of the hour hand, the minute hand and the second hand clockwise or counterclockwise is received, the controller 180 may transmit a control signal for controlling a channel or volume of the TV to the TV.

For example, if a touch input for clockwise drag-moving the pointer, which has touched the hour hand, is received, the controller 180 may control the TV to select next channel of a channel which is currently output. Although not shown, if a touch input for counterclockwise drag-moving the pointer, which has touched the hour hand, is received, the controller 180 may control the TV to select a previous channel of a channel which is currently output.

Although not shown, the controller 180 may determine a channel number which will be selected by the TV through digits from 1 to 12 displayed on the clock. Since the method for selecting digits from 1 to 12 has been described with reference to FIG. 37, its detailed description will be omitted.

If a touch input for clockwise or counterclockwise drag-moving the pointer, which has touched the minute hand, is received, the controller 180 may control the TV to increase or reduce a volume of the TV.

In addition to the aforementioned description, the watch type terminal may remotely control an air-conditioner, a heating device, a lamp device, etc. For example, the controller 180 may remotely control on/off, temperature and wind strength of the air-conditioner or on/off and brightness of the lamp device on the basis of a user input for any one of the hour hand, the minute hand and the second hand.

The remote control function which will be allocated to the hour hand, the minute hand and the second hand may be varied by the user as described with reference to FIG. 31.

<Selection of Control Target Suitable for Status>

The watch type terminal may automatically select an application or device to be controlled, considering its position, its moving speed or a current time.

For example, FIG. 45 is a view illustrating an example that a control target is changed depending on a status.

If the watch type terminal is arranged in a place registered as a company, the controller 180 may select a file search application as a control target. Therefore, as illustrated in FIG. 45(a), an object 4510 indicating that the file search application is selected as a control target may be output through the display unit 151. If a touch input for at least one of the hour hand, the minute hand and the second hand is received, the controller 180 may remotely control the file search application, which is being executed by the other terminal.

If a moving speed of the watch type terminal arranged indoor is a predetermined value or more, or if the number of walks or walking speed of a user is a predetermined reference value or more, the controller 180 may use a music application as a control target. Therefore, as illustrated in FIG. 45(*b*), an object 4520 indicating that the music application is selected as a control target may be output through the display unit 151. If a touch input for at least one of the hour hand, the minute hand and the second hand is received, the controller 180 may remotely control the music application, which is being executed by the other terminal.

If the watch type terminal is arranged in a place registered as a home, the controller 180 may select a TV as a control target. Therefore, as illustrated in FIG. 45(*c*), an object 4530 indicating that the TV is selected as a control target may be output through the display unit 151. If a touch input for at least one of the hour hand, the minute hand and the second hand is received, the controller 180 may remotely control the TV.

If the watch type terminal is arranged in a place registered as a home but the current time reaches a reference time (for example, if the current time reaches midnight), the controller 180 may select a lamp device as a control target. Therefore, as illustrated in FIG. 45(*d*), an object 4540 indicating that the lamp device is selected as a control target may be output through the display unit 151. If a touch input for at least one of the hour hand, the minute hand and the second hand is received, the controller 180 may remotely control the lamp device.

<Output of Schedule Information>

The controller 180 may output schedule information registered in the watch type terminal or the other terminal interworking with the watch type terminal on the clock face.

Figure 46:
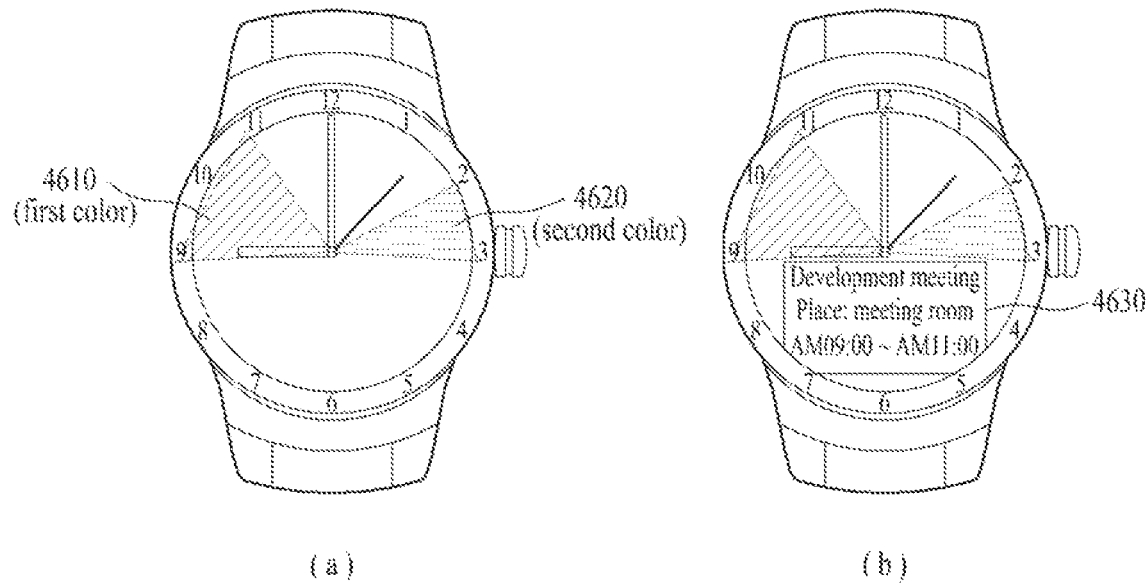
FIG. 46 is a view illustrating an example that schedule information is output.

For example, FIG. 46 is a view illustrating an example that schedule information is output. The controller 180 may output an object, which may identify a starting time and an ending time of a schedule registered in the watch type terminal or the other terminal from each other. For example, one side of triangle objects 4610 and 4620 shown in FIG. 46(*a*) may indicate the starting time of the schedule and the other side may indicate the ending time of the schedule. Therefore, it is noted that a schedule starting from 9 o'clock and ending at 11 o'clock and a schedule starting from 2 o'clock and ending at 3 o'clock are registered in the watch type terminal or the other terminal.

At this time, to identify a morning schedule and an afternoon schedule from each other, the controller 180 may display an object corresponding to a schedule of which starting time (or ending time) corresponds to a morning time may be displayed as a first color, and an object corresponding to a schedule of which starting time (or ending time) corresponds to an afternoon time may be displayed as a second color. In the example shown in FIG. 46(*a*), since the object 4610 corresponding to the schedule starting from 9 o'clock and ending at 11 o'clock has the first color, the user may recognize that the corresponding schedule starts at 9 o'clock in the morning. Also, since the object 4620 corresponding to the schedule starting from 2 o'clock and ending at 3 o'clock has the second color, the user may recognize that the corresponding schedule starts at 2 o'clock, p.m.

If a user input for touching the object is received, the controller 180 may output a message that includes detailed information of the touched object.

For example, if the object 4610 corresponding to the schedule starting from 9 o'clock and ending at 11 o'clock is touched, the controller 180 may output a message 4630 that includes detailed information of the schedule such as name of the schedule, place, a starting time and an ending time, as illustrated in FIG. 46(*b*).

If date is changed, the controller 180 may output schedule information registered in the changed date.

Figure 47:
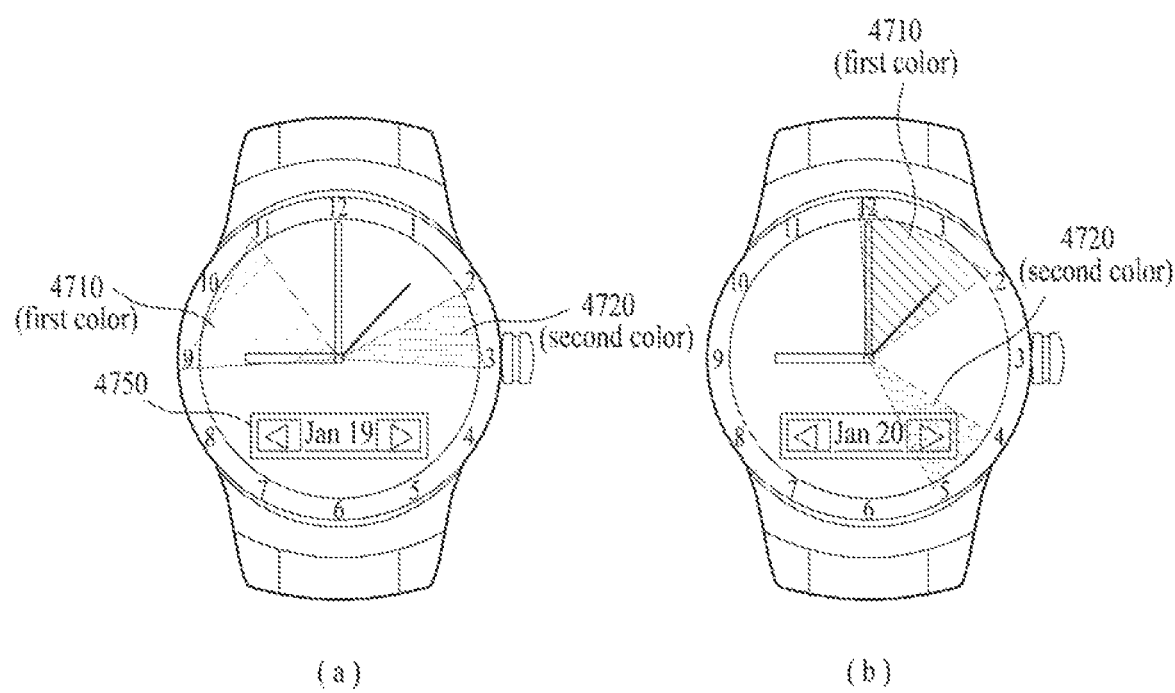
FIG. 47 is a view illustrating an example that a schedule of a changed date is output.

For example, FIG. 47 is a view illustrating an example that a schedule of a changed date is output.

As illustrated in FIG. 47(*a*), the controller 180 may output a date selection window 4750 that may select a date desired to display schedule information. If date is changed by a touch input for touching the date selection window, the controller 180 may output schedule information registered in the changed date.

For example, in FIGS. 47(*a*) and (*b*), as the date is changed, schedule information 4730 and 4740 (a schedule of 12 o'clock to 2 o'clock and a schedule of 4 o'clock to 5 o'clock) of January 20 is output in a state that schedule information 4710 and 4720 (a schedule of 9 o'clock to 11 o'clock and a schedule of 2 o'clock to 3 o'clock) of January 19 is output.

The controller 180 may select a date desired to output a schedule by means of a user input for selecting a number on the clock face. In more detail, as described with reference to FIG. 37, the controller 180 may determine a number input by direction shift of any one of the hour hand, the minute hand and the second hand or a number input by the touch input for touching the number on the clock face.

At this time, a number firstly input among numbers from 1 to 12 may be intended to select month, and numbers input secondly and thirdly may be intended to select day.

For example, FIG. 48 is a view illustrating an example that a schedule corresponding to a number input by a user is output.

As illustrated in FIG. 48(*a*), if numbers selected by the user are '1', '1' and '9' in due order, the controller 180 may process that the number 1 firstly input by the user is intended to select month and the numbers '1' and '9' input secondly and thirdly by the user are intended to select day. Therefore, the controller 180 may output schedule information of January 19, as illustrated in FIG. 48(*b*).

If the number selected secondly by the user is 3 or more, the controller 180 may directly output a schedule of the selected date without waiting for an input of the third number. For example, if the user selects '1' and '4' in due order, the controller 180 may output a schedule of January 4.

If the user selects '1', '2'. or '3' secondly and then does not select a third number within a predetermined time, the controller 180 may process that 1 day, 2 day or 3 day is selected.

If a predetermined user input is received while schedule information is being displayed, the controller 180 may set an alarm for the selected schedule.

For example, FIG. 49 is a view illustrating an example that an alarm is set.

In the example shown in FIG. 49(*a*), if a drag input of a point, which has touched an object corresponding to schedule information starting at 2 o'clock and ending at 3 o'clock, for reciprocating in a predetermined direction is received, the controller 180 may output a selection menu 4910 that may select an alarm for the corresponding schedule as illustrated in FIG. 49(*b*). For example, if 10 minutes is selected from the selection menu 4910, the controller 180 may output alarm such as vibration and alarm sound before 10 minutes from starting of the schedule.

A new schedule may be added in response to a touch input received while the schedule information is being output. In more detail, a new schedule may be added by a first input for setting a starting time of the schedule and a second input for setting an ending time of the schedule.

For example, FIG. 50 is a view illustrating an example that a new schedule is added.

If a user input for outwardly drag-moving a point, which has touched the center of the display unit 151, is received, the controller 180 may set the time for which a drag track is headed, as a starting time of the schedule. For example, in FIG. 50(a), since the pointer has drag-moved toward 5 o'clock, 5 o'clock will be a starting time of the schedule.

Afterwards, if a touch of the pointer is released in the periphery of a predetermined number after dragging, the controller 180 may set a number corresponding to the position where the touch of the pointer is released, as an ending time of the schedule. For example, in FIG. 50(b), since the touch of the pointer is released in the periphery of 7 o'clock, the ending time of the schedule may be set to 7 o'clock.

If the starting time and the ending time of the schedule are set, as illustrated in FIG. 50(c), the controller 180 may output a menu 5010 for selecting morning and afternoon and a keypad 5020 for inputting a name of the schedule. The controller 180 may set whether the schedule starts in the morning or afternoon and also set a name of the schedule on the basis of the user input for the menu 5010 and the keypad 5020.

In FIG. 50, the first input for setting the starting time of the schedule means drag movement of the pointer from the center of the clock face to the outside of the clock face, and the second input for setting the ending time of the schedule means touch release of the pointer.

The starting time and the ending time of the schedule may be set by an input different from the shown example. For example, if a first drag input from the outside of the clock face to the center of the clock face and a second drag input from the center of the clock face to the outside of the clock face are received, the starting time of the schedule may be set based on the track of the first drag input, and the ending time of the schedule may be set based on the track of the second drag input.

The controller 180 may change the starting time or the ending time of the schedule on the basis of the touch input for the object corresponding to the schedule information. In more detail, the controller 180 may change the starting time and the ending time of the schedule in accordance with the changed position if a position of each side constituting the object is changed.

For example, FIG. 51 is a view illustrating an example that a starting time and an ending time of a schedule are changed.

If a touch input of a pointer, which has touched one side of an object indicating a starting time, for drag-moving in a predetermined direction is received, the controller 180 may change the position of the side to the dragged position of the pointer. Then, the controller 180 may change the starting time of the schedule in accordance with the changed position of the side.

In FIGS. 51(a) and (b), since the position of the side indicating the starting time has been changed from 9 o'clock to 10 o'clock, the starting time of the schedule may be changed to 10 o'clock.

If a touch input of a pointer, which has touched one side of an object indicating an ending time, for drag-moving in a predetermined direction is received, the controller 180 may change the position of the side to the dragged position of the pointer. Then, the controller 180 may change the ending time of the schedule in accordance with the changed position of the side.

In FIGS. 51(b) and (c), since the position of the side indicating the ending time has been changed from 11 o'clock to 12 o'clock, the ending time of the schedule may be changed to 12 o'clock.

In the example of the aforementioned embodiments, the terminal to which the present invention may be applied is a watch type. The aforementioned embodiments may be applied to the terminal in addition to the watch type terminal. In more detail, the aforementioned embodiments may be applied to a terminal provided with a display unit that may output an hour hand and a minute hand.

According to one embodiment of the present invention, the above-described method (operation flow chart) may be implemented in a program (or application) or a medium in which a program is recorded, as a code that can be read by a processor. Example of the medium that can be read by a processor include a ROM, a RAM, a CD-ROM, a magnetic tape, a floppy disk, and an optical data storage unit. Also, another example of the recording medium may be implemented in a type of carrier wave (for example, transmission through Internet).

The aforementioned embodiments are not limited to the mobile terminal 100 described as above, and all or some of the aforementioned embodiments may selectively be configured in combination so that various modifications may be made in the aforementioned embodiments.

INDUSTRIAL APPLICABILITY

The present invention may be applied to various types of electronic devices that may display time information.

The invention claimed is:

1. A mobile terminal comprising:
a display for outputting information; and
a controller configured to:
  cause the display to display an hour hand and a minute hand in response to a first touch input received via the display;
  receive a second touch input via the display, the second touch input comprising dragging at least one of the hour hand or the minute hand; and
  output information corresponding to a time indicated by the dragged at least one of the hour hand or the minute hand in response to the second touch input, the information output while the dragged at least one of the hour hand or the minute hand is displayed on the display.

2. The mobile terminal according to claim 1, wherein the first touch input includes a first drag input headed for a center of the display, and a second drag input headed from the center of the display to the outside.

3. The mobile terminal according to claim 2, wherein the controller outputs the hour hand along any one of the first drag input and the second drag input and outputs the minute hand along the other one of the first drag input and the second drag input.

4. The mobile terminal according to claim 3, wherein the controller outputs a selection menu for selecting a number indicated by the hour hand if any one of the hour hand and the minute hand is headed for a portion between a number and another number on a clock face.

5. The mobile terminal according to claim 1, wherein the controller outputs schedule information of the time indicated by the hour hand and the minute hand through the display.

6. The mobile terminal according to claim 5, wherein the controller outputs a chart for registering a new schedule starting at the time indicated by the hour hand and the minute hand if a schedule registered at the time indicated by the hour hand and the minute hand does not exist.

7. The mobile terminal according to claim 5, wherein the controller newly outputs next or previous schedule information of the schedule information if a predetermined user input is received while the schedule information is being output and a time search button prior to the schedule information is touched in response to the user input.

8. The mobile terminal according to claim 7, wherein the controller automatically changes an output position of the hour hand and the minute hand in accordance with the next or previous schedule information which is newly output.

9. The mobile terminal according to claim 5, wherein, if a predetermined user input is received while the schedule information is being output, the controller enters an editing mode that may correct at least one of a starting time and an ending time of the schedule information in response to the user input.

10. The mobile terminal according to claim 9, wherein, if the time indicated by the hour hand and the minute hand is changed under the editing mode, the controller controls any one of the starting time and the ending time to the changed time.

11. The mobile terminal according to claim 1, wherein the controller outputs call record information between current time and the time indicated by the hour hand and the minute hand.

12. The mobile terminal according to claim 1, wherein the controller outputs spaced information between the time indicated by the hour hand and the minute hand and current time, or starts a timer starting from the current time and ending at the time indicated by the hour hand and the minute hand.

13. The mobile terminal according to claim 1, wherein the controller maintains a setup value of the mobile terminal at a predetermined state from the current time to the time indicated by the hour hand and the minute hand.

14. The mobile terminal according to claim 13, wherein the setup value includes at least one of activity or non-activity of a do-not-disturb mode, activity or non-activity of a vibration mode, or on/off of a communication module.

15. The mobile terminal according to claim 1, wherein the controller sets the time indicated the hour hand and the minute hand to an ending time of an application and then automatically ends the application if current time reaches the ending time.

16. The mobile terminal according to claim 1, wherein the controller outputs a new content different from a content which is currently output if at least one of the hour hand and the minute hand drag-moves clockwise or counterclockwise.

17. The mobile terminal according to claim 16, wherein the controller outputs a next content of the content which is currently output if at least one of the hour hand and the minute hand is rotated clockwise, and outputs a previous content of the content which is currently output if at least one of the hour hand and the minute hand is rotated counterclockwise.

18. A control method for a mobile terminal, comprising:
displaying an hour hand and a minute hand on a display in response to a first touch input received via the display; and
receiving a second touch input via the display, the second touch input comprising dragging at least one of the hour hand or the minute hand; and
outputting information corresponding to a time indicated by the dragged at least one of the hour hand or the minute hand in response to the second touch input, the information output while the dragged at least one of the hour hand or the minute hand is displayed on the display.

19. The mobile terminal according to claim 1, wherein the at least one of the hour hand or the minute hand is moved clockwise or counterclockwise in response to the second touch input.

* * * * *